US012654166B2

(12) United States Patent
Kung

(10) Patent No.: US 12,654,166 B2
(45) Date of Patent: Jun. 16, 2026

(54) MICROFLUIDIC CELLULAR DEVICE AND METHODS OF USE THEREOF

(71) Applicant: NanoCav, LLC, Culver City, CA (US)

(72) Inventor: Yu-Chun Kung, Los Angeles, CA (US)

(73) Assignee: NanoCav, LLC, Culver City, CA (US)

( * ) Notice: Subject to any disclaimer, the term of this patent is extended or adjusted under 35 U.S.C. 154(b) by 987 days.

(21) Appl. No.: 17/881,084

(22) Filed: Aug. 4, 2022

(65) Prior Publication Data

US 2022/0371013 A1    Nov. 24, 2022

Related U.S. Application Data

(63) Continuation of application No. 16/244,920, filed on Jan. 10, 2019, now Pat. No. 11,426,724.

(60) Provisional application No. 62/616,126, filed on Jan. 11, 2018.

(51) Int. Cl.
    *B01L 3/00*      (2006.01)
    *G01N 1/40*      (2006.01)
    *G01N 15/02*     (2024.01)

(52) U.S. Cl.
    CPC ... *B01L 3/502707* (2013.01); *B01L 3/502715* (2013.01); *B01L 3/502761* (2013.01); *G01N 1/40* (2013.01); *B01L 3/50273* (2013.01); *B01L 2200/0652* (2013.01); *B01L 2300/0816* (2013.01); *B01L 2300/0864* (2013.01); *B01L 2400/0487* (2013.01); *B01L 2400/086* (2013.01); *G01N 15/0255* (2013.01)

(58) Field of Classification Search
    None
    See application file for complete search history.

(56) References Cited

U.S. PATENT DOCUMENTS

| | | | |
|---|---|---|---|
| 2006/0134599 A1 | 6/2006 | Toner et al. | |
| 2006/0223178 A1 | 10/2006 | Barber et al. | |
| 2011/0269226 A1 | 11/2011 | Van Noort et al. | |
| 2014/0030788 A1 | 1/2014 | Chen et al. | |
| 2014/0227777 A1 | 8/2014 | Choi | |
| 2014/0352382 A1* | 12/2014 | Wang | C12M 1/42 428/209 |

(Continued)

FOREIGN PATENT DOCUMENTS

| | | |
|---|---|---|
| CN | 101653768 A | 2/2010 |
| CN | 105264127 A | 1/2016 |

(Continued)

OTHER PUBLICATIONS

International Search Report for PCT Application No. PCT/US2019/013073 dated May 7, 2019.

(Continued)

*Primary Examiner* — Lore R Jarrett
(74) *Attorney, Agent, or Firm* — Harness Dickey & Pierce P.L.C.

(57) ABSTRACT

Systems and methods for using microfluidic devices to concentrate cells, to perform buffer changes, to sort cells based on size, and/or to isolate particular types of cells in a rapid manner, are presented. Cells flow into a matrix of posts, wherein the posts are distributed along diagonal lines in the chamber. The cells are deflected in a lateral manner, towards a side of a chamber and are collected upon exiting the chamber.

43 Claims, 54 Drawing Sheets

(56) References Cited

U.S. PATENT DOCUMENTS

| | | | | |
|---|---|---|---|---|
| 2016/0047735 A1* | 2/2016 | Grisham | ........... | B01L 3/502753 |
| | | | | 435/7.1 |
| 2017/0291172 A1* | 10/2017 | Kung | ............... | G01N 27/44791 |
| 2019/0210019 A1 | 7/2019 | Kung | | |

FOREIGN PATENT DOCUMENTS

| | | | | |
|---|---|---|---|---|
| CN | 105705659 A | 6/2016 | | |
| CN | 105861297 A | 8/2016 | | |
| EP | 3058316 A1 | 8/2016 | | |
| WO | WO-2015058206 A1 | 4/2015 | | |
| WO | WO-2017035262 A1 | 3/2017 | | |
| WO | WO2017083391 A1 * | 5/2017 | ............. | G01N 33/48 |
| WO | WO-2018018017 A1 | 1/2018 | | |

OTHER PUBLICATIONS

International Written Opinion for PCT Application No. PCT/US2019/013073 dated May 7, 2019.

International Preliminary Report on Patentability for PCT Application No. PCT/US2019/013073 dated May 12, 2020.

European Search Report from corresponding European Application No. 19738792.1 dated Feb. 8, 2021.

Office Action from European Application No. 19738792.1 dated Jun. 28, 2024.

Office Action from Chinese Application No. 202210939371.0 dated Jul. 17, 2025.

Office Action from Chinese Application No. 202210939371.0 dated May 6, 2025.

Office Action from Chinese Application No. 202210939371.0 dated Oct. 30, 2024.

* cited by examiner

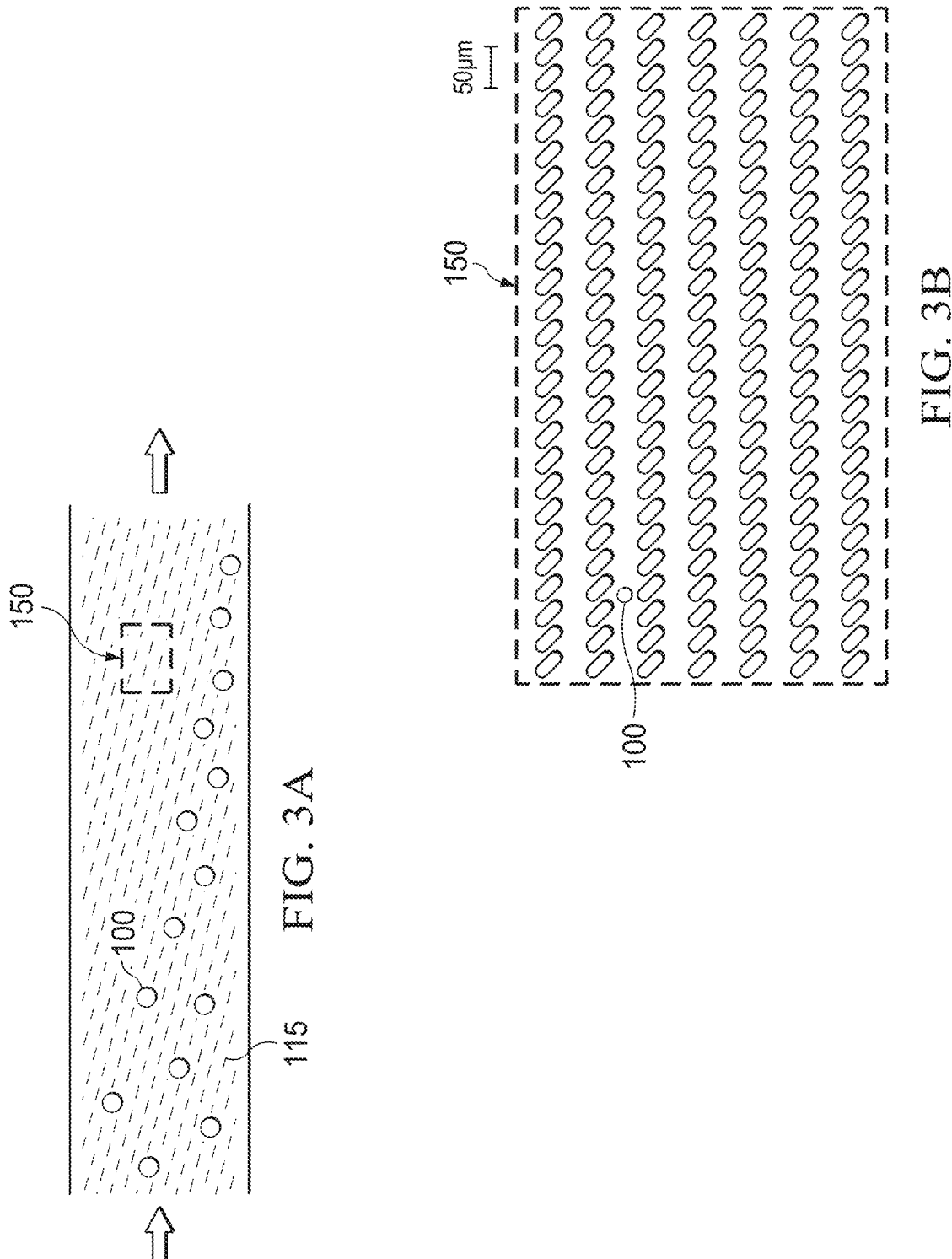

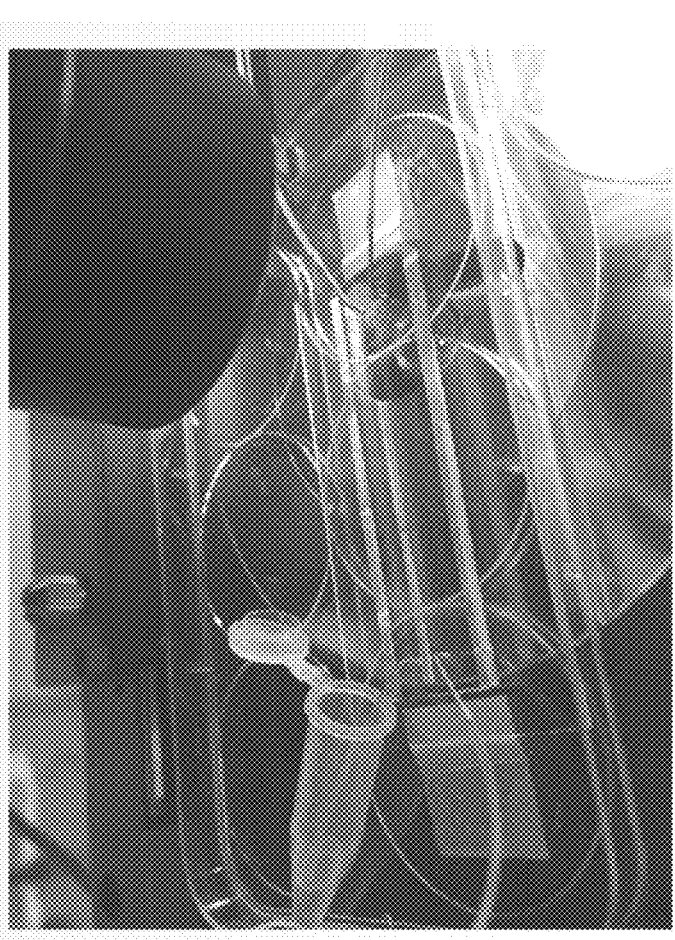
FIG. 10A

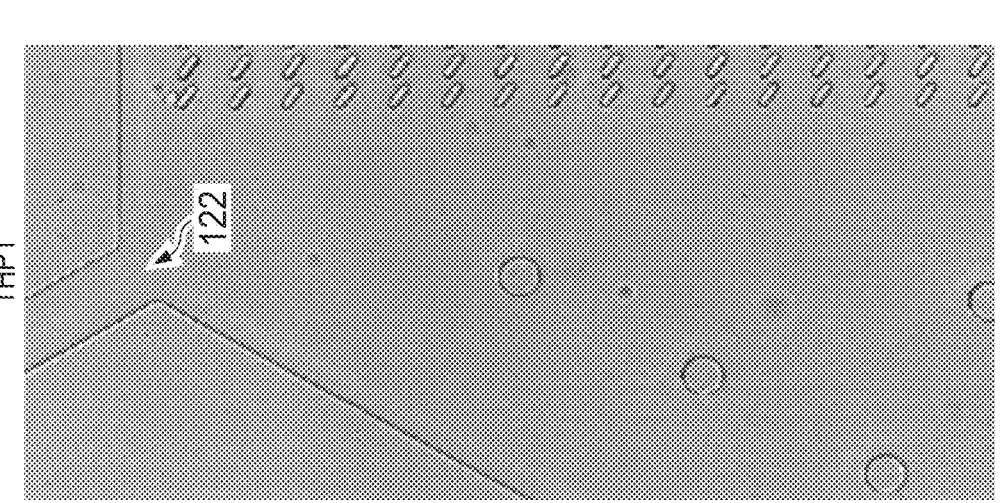
On-Chip Buffer Change
● THP1:
- ● Concentration : $10^5$/mL
- ● Total Flow rate : 20 mL/hr
- ● $Q_{sheath} : Q_{sample} = 1:1$
- ● Complete medium change without ion diffusion
Concentration ratio : 5-6 fold
FIG. 10D

Strategy for sorting antigen-specific, activated T cell - by size
Naive CD4⁺ T-cells activated by anti-CD3 and anti-CD28

T-cell    0 h    12 h    18 h    24 h

10 μm

Z. Guo et al., Nature communcation, 7:10307, 2016

Varying roof tile pillar gap distance to tune cell cut-off size

4μm gap distance
(~8μm cut-off)

FIG. 12A

6μm gap distance
(~10μm cut-off)

FIG. 12B

Varying roof tile pillar gap distance to tune cell cut-off size

HL-60

9µm gap distance
(~13µm cut-off)

Stimulation
with CD3/CD28
worked well

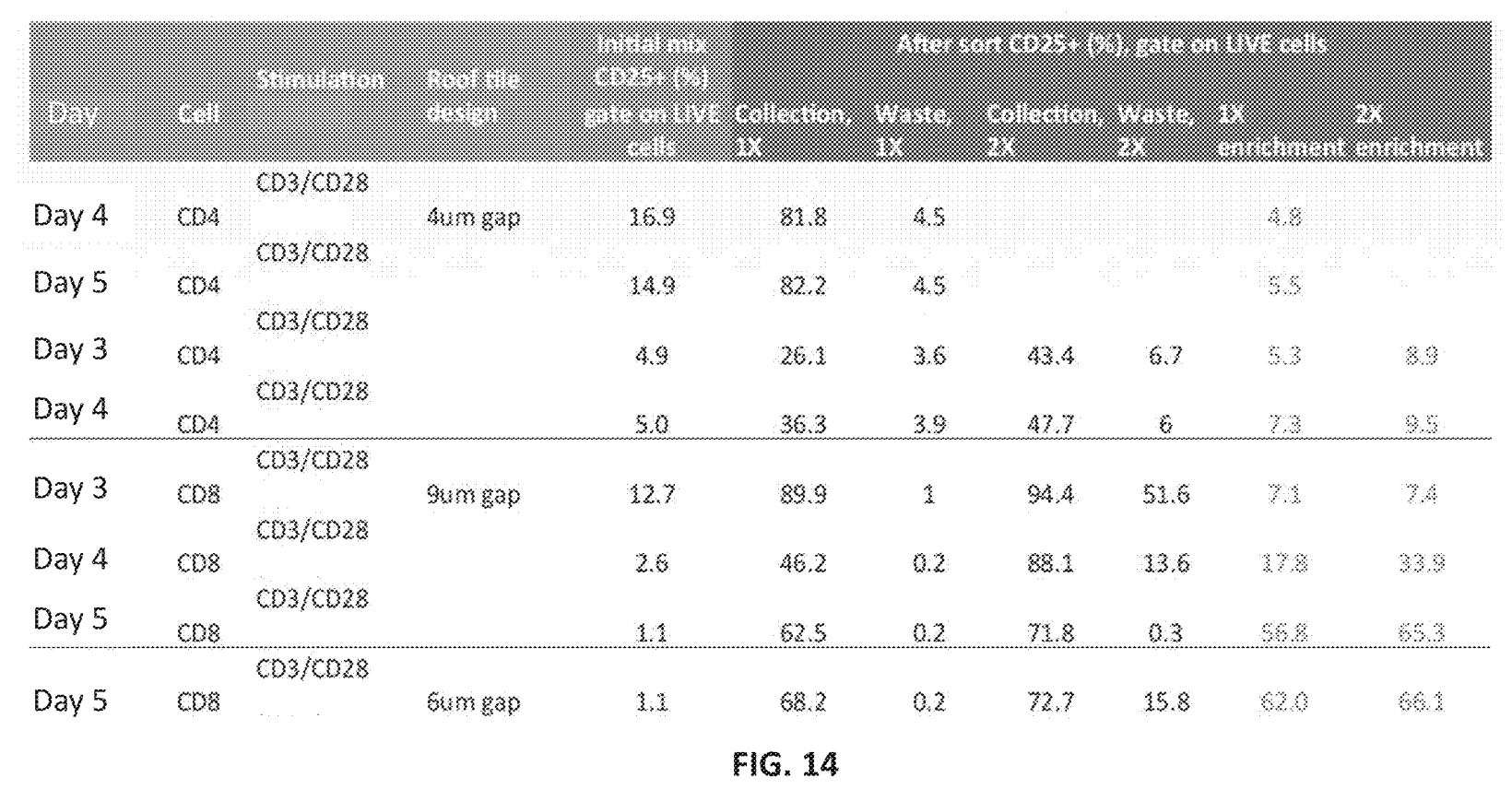

| Day | Cell | Stimulation | Bind/Channel gap | Initial (%) CD3 | Collection 1X | Wash 1X | Collection 2X | Wash 2X | enrichment 2X | enrichment (LIVE cells) 2X |
|---|---|---|---|---|---|---|---|---|---|---|
| Day 4 | CD4 | CD3/CD28 | 4μm gap | 16.9 | 81.8 | 4.5 | | | | 4.9 |
| Day 5 | CD4 | CD3/CD28 | | 14.9 | 82.2 | 4.5 | | | | 5.5 |
| Day 3 | CD4 | CD3/CD28 | | 4.9 | 26.1 | 3.6 | 43.4 | 6.7 | 5.3 | 8.9 |
| Day 4 | CD4 | CD3/CD28 | | 5.0 | 36.3 | 3.9 | 47.7 | 6 | 7.3 | 9.5 |
| Day 3 | CD8 | CD3/CD28 | 9μm gap | 12.7 | 89.9 | 1 | 94.4 | 51.6 | 7.1 | 7.4 |
| Day 4 | CD8 | CD3/CD28 | | 2.6 | 46.2 | 0.2 | 88.1 | 13.6 | 17.8 | 33.9 |
| Day 5 | CD8 | CD3/CD28 | | 1.1 | 62.5 | 0.2 | 71.8 | 0.3 | 56.8 | 65.3 |
| Day 5 | CD8 | CD3/CD28 | 6μm gap | 1.1 | 68.2 | 0.2 | 72.7 | 15.8 | 62.0 | 66.1 |

FIG. 14

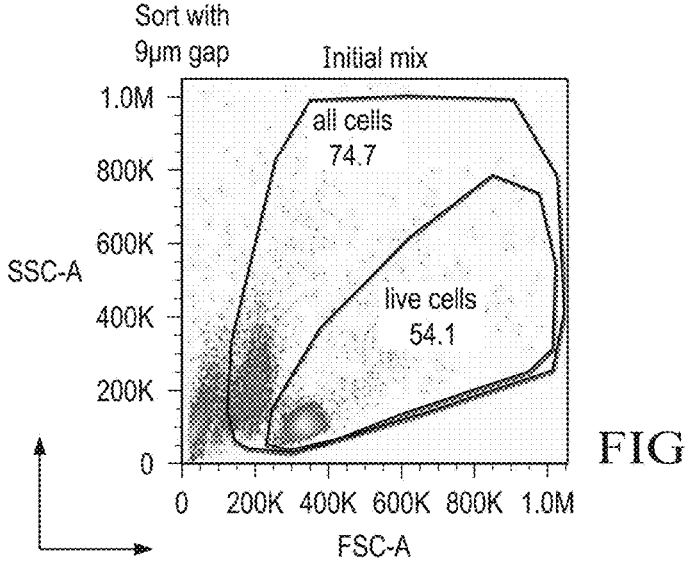
FIG. 15A
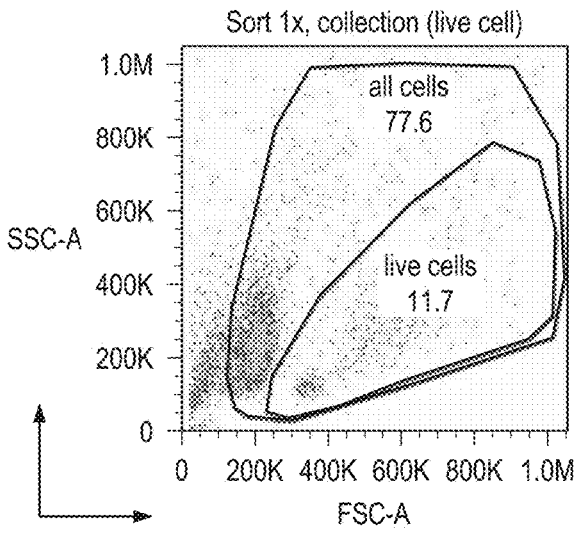
FIG. 15B
FIG. 15C

Compare different pillar gap modules by flow

Before sort all cells
87.0

After sort with 4µm gap, collection all cells
83.1

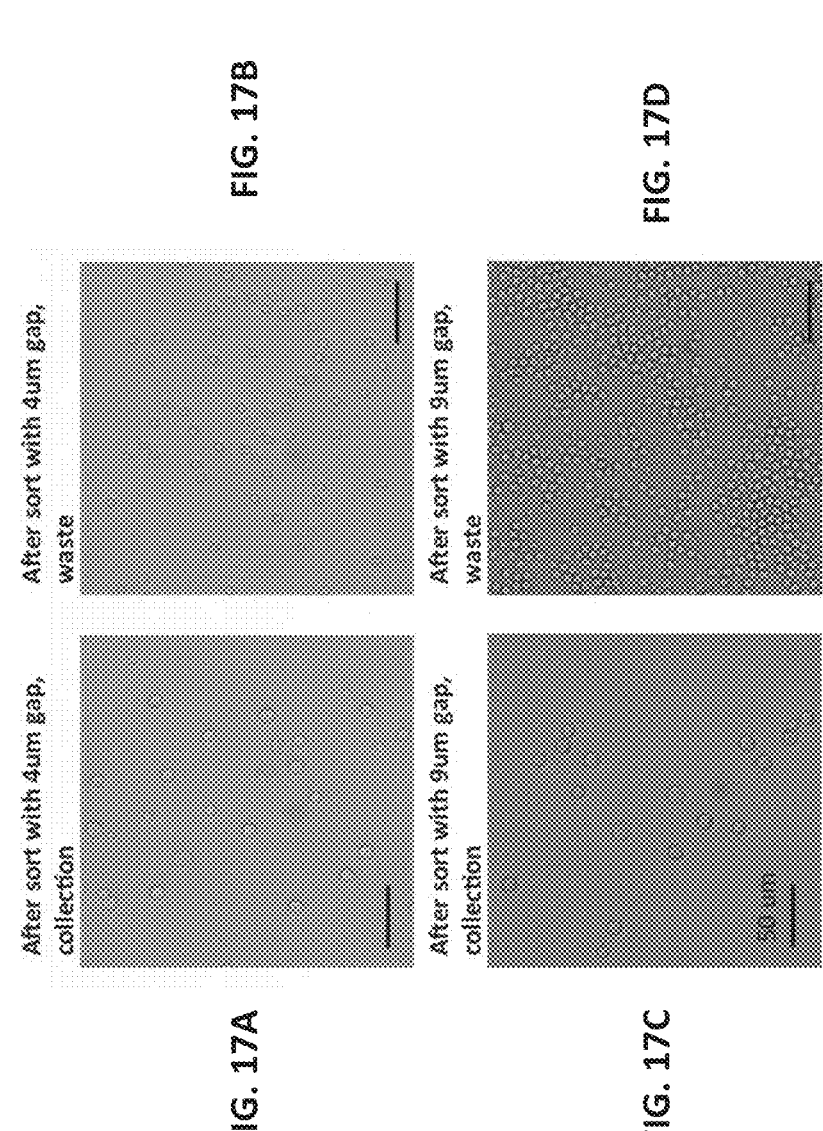

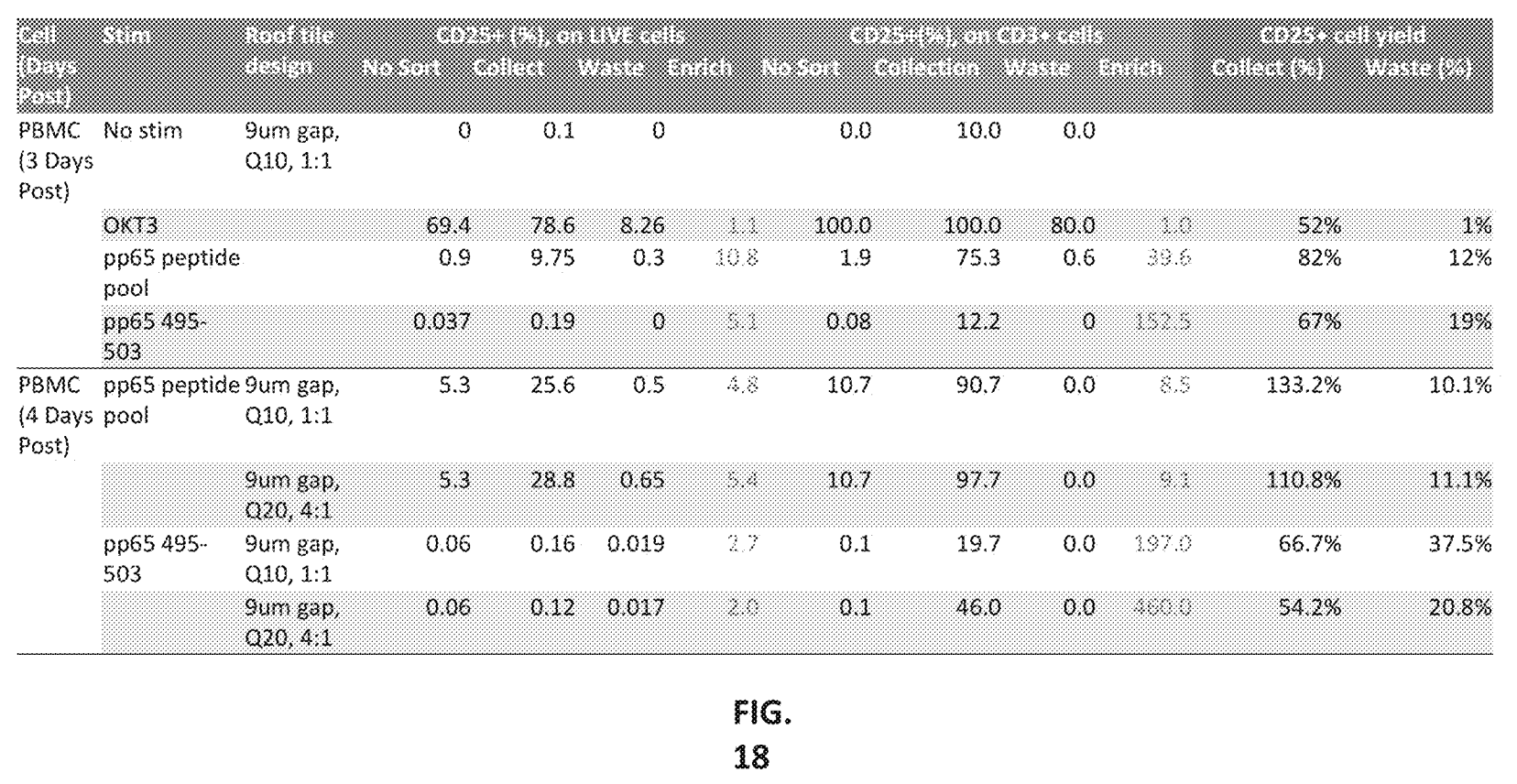

| Cell Source (Days Post) | Stim | ProG Tip device / condition | | | | | | | | | CD137+ cell collection (%) | CD25+ cell yield |
|---|---|---|---|---|---|---|---|---|---|---|---|---|
| PBMC (3 Days Post) | No stim | 9um gap, Q10, 1:1 | 0 | 0.1 | 0 | 0 | 0.0 | 10.0 | 0.0 | | | |
| | OKT3 | | 69.4 | 78.6 | 8.26 | 1.1 | 100.0 | 100.0 | 80.0 | 1.0 | 52% | 1% |
| | pp65 peptide pool | | 0.9 | 9.75 | 0.3 | 10.8 | 1.9 | 75.3 | 0.6 | 39.6 | 82% | 12% |
| | pp65 495-503 | | 0.037 | 0.19 | 0 | 3.1 | 0.08 | 12.2 | 0 | 152.5 | 67% | 19% |
| PBMC (4 Days Post) | pp65 peptide pool | 9um gap, Q10, 1:1 | 5.3 | 25.6 | 0.5 | 4.8 | 10.7 | 90.7 | 0.0 | 8.5 | 133.2% | 10.1% |
| | | 9um gap, Q20, 4:1 | 5.3 | 28.8 | 0.65 | 5.4 | 10.7 | 97.7 | 0.0 | 9.1 | 110.8% | 11.1% |
| | pp65 495-503 | 9um gap, Q10, 1:1 | 0.06 | 0.16 | 0.019 | 2.7 | 0.1 | 19.7 | 0.0 | 197.0 | 66.7% | 37.5% |
| | | 9um gap, Q20, 4:1 | 0.06 | 0.12 | 0.017 | 2.0 | 0.1 | 46.0 | 0.0 | 460.0 | 54.2% | 20.8% |

FIG.
18

(3 Days Post) Sorting using 9um-gap roof tile module: C. pp65 peptide pool stimulated Before Sort live cells
47.0

SSC-A

FSC-A

Sorted, Collection live cells
36.3

SSC-A

FSC-A (3 Days Post) Sorting using 9um-gap roof tile module: D. pp65₄₉₃₋₅₀₃ peptide pool stimulated

MICROFLUIDIC CELLULAR DEVICE AND METHODS OF USE THEREOF

CROSS REFERENCE TO RELATED APPLICATIONS

This application is a continuation of U.S. patent application Ser. No. 16/244,920 filed on Jan. 10, 2019, which claims priority to and the benefit of U.S. Provisional Patent Application Ser. No. 62/616,126, filed Jan. 11, 2018. The entire disclosure of each of the above recited applications are incorporated herein by reference.

FIELD OF THE INVENTION

Microfluidic devices are provided that are useful for, inter alia, concentrating cells and/or separating cells according to size and deformability.

BACKGROUND OF THE INVENTION

The background description includes information that may be useful in understanding the systems and methods described herein. It is not an admission that any of the information provided herein is prior art, or that any publication specifically or implicitly referenced is prior art.

Biological samples obtained from patients contain a variety of different types of cells in a relatively large volume of fluid. Often it is desirable to concentrate cells, change buffers, or concentrate particular types of cells in order to perform various biological assays or otherwise study the cells. However, current techniques for performing these types of processes typically rely on heavy equipment such as centrifuges, utilize time consuming assays involving dialysis or ion-exchange, require multi-step complex processes, or render the cells non-functional for downstream biological assays. Additionally, these approaches often require relatively large sample sizes and have low cell recovery rates.

In some cases, the sample may contain a variety of cell types, including but not limited to, red blood cells, white blood cells, and various other cellular components (e.g., circulating tumor cells (CTCs), metastatic cells, normal cells, etc.). It can be difficult to isolate a particular cell type, e.g., CTCs, especially when these cells occur at a low frequency relative to other, more abundant, cell types. For example, it is estimated that about one CTC is present in a blood sample for every billion normal or blood cells.

Current approaches to separating a population of cells from a blood sample may include techniques such as fluorescence activated cell sorting, magnetic activated cell sorting, or immunomagnetic colloid sorting. These approaches are laborious, require operator expertise, may lead to significant cell loss (poor recovery) and/or are expensive to perform. Other techniques to isolate a population of cells lack separation specificity, for example, charge flow separation. New techniques to rapidly and easily concentrate cells, and isolate cells based on size are needed.

SUMMARY

Various systems and methods for manipulating cells using a microfluidics device are presented herein. The present techniques allow for rapid concentration of cells, for isolating cells based on size or a size range, for buffer exchanges, for adding labels, etc., and these techniques can be integrated into other workflows. The present methods provide novel techniques of changing buffers and achieving a high cell recovery rate. These techniques allow for concentrating cells when the cells are present at a low frequency in a solution, as well as isolating cells of a particular size or a range of sizes from among a sample of heterogeneously sized cells. For example, systems and methods for concentrating cells from a sample can be used to separate tumor cells from a blood sample, while systems and methods for separating cells based on size can be used to separate activated T cells from non-activated T cells. In some aspects, the devices are manually operable. In other aspects, the devices are automated or partially automated.

In one aspect, a microfluidics device is presented, comprising: an input mechanism for introducing a solution comprising cells; a microfluidics chamber in fluid communication with the input mechanism, wherein the microfluidics chamber comprises a plurality of rows of posts, wherein each row comprises a plurality of posts distributed along a line having a slope, wherein the slope is determined relative to a side of the microfluidics chamber; and at least two output mechanisms in fluid communication with the microfluidics chamber. In general, the first output mechanism has a larger cross sectional area than the second output mechanism.

Methods are also provided for introducing a solution comprising cells into a microfluidics chamber via an input mechanism, wherein the chamber is in fluid communication with the input mechanism; applying pressure to cause the cells to flow through the microfluidics chamber, wherein the microfluidics chamber comprises a plurality of rows of posts, wherein each row comprises a plurality of posts distributed along a line having a slope, and wherein the slope is determined relative to a side of the microfluidics chamber; deflecting the cells to a side of the chamber by the rows of posts to deplete cells from the solution exiting a first output mechanism and enrich cells in the solution exiting a second output mechanism, wherein the second output mechanism has a smaller cross sectional area than the first output mechanism.

Thus, in one aspect, pressure is applied to cause cells to flow though the matrix of posts and to be deflected laterally towards a side of the chamber, resulting in a local increase in the concentration of the cells. The concentrated cells exit the chamber through an output mechanism, and are collected. In other aspect, pressure is applied to cause the cells to flow through the matrix of posts, wherein cells larger than a cutoff size are retained in a path while cells smaller than a cutoff size pass into adjacent rows via gaps between the posts. The larger sized cells exit the chamber through an output mechanism and are collected; the smaller sized cells exit the chamber through another output mechanism and may also be collected.

Advantages of present invention embodiments include high throughput, high yield of concentrated cells, flow rate independence, configurability with regard to concentrating or separating cells of varying sizes by varying the gap between posts and/or the slope/rotation of each post and/or the shape/geometry of each post, rotation of the posts, and spacing of the posts, and compatibility with manual or automated operation. In general, the performance of the microfluidics device in the context of concentrating cells and size-based cell separation is independent of the flow rate under normal conditions of laminar flow. The device performance is similar under different flow rates, but may be dependent on a sheath-to-sample flow rate ratio. Accordingly, the cells will be deflected laterally towards a side of the chamber, independently of the rate of fluid flow through the microfluidics device. Additional advantages include the ability to manufacture the microfluidics device for a low cost. In some embodiments, a solution comprising cells may be loaded into a syringe, and the syringe may be connected to an input mechanism of the microfluidics device. An operator of the syringe depresses the plunger manually (e.g., hand injection) to cause the solution containing the cells to flow through the device. Further, the embodiments disclosed herein do not rely on complex technology (e.g., centrifuges, magnetic forces, etc.) in order to achieve cell concentration. In some embodiments, the microfluidic devices are single use devices. In other embodiments, volumes of solutions that are injected into the microfluidics device range from 1 mL to 10 mL or more.

Various objects, features, aspects and advantages of the present subject matter will become more apparent from the following detailed description of preferred embodiments.

DEFINITIONS

As used herein, the term "antibody" generally refers to immunoglobulin molecules and immunologically active portions or fragments thereof of immunoglobulin molecules, i.e., molecules that contain an antigen binding site that immunospecifically binds to an antigen (e.g., on the surface of the cell). Unless the context dictates otherwise, the term "antibody" or "antibodies" includes but is not limited to all isotypes and subtypes of antibodies (e.g., IgA, IgD, IgE, IgG, IgM, etc.), any class (e.g., IgG1, IgG2, IgG3, IgG4, IgA1, and IgA2) or subclass of immunoglobulin molecule, as well as all active fragments (having immunological activity) thereof. It is also understood that any heavy chain (e.g., IgA, IgD, IgE, IgG, IgM) may be paired with any light chain (e.g., kappa or lambda forms).

Antibodies also include, but are not limited to, monoclonal antibodies, polyclonal antibodies, human antibodies, humanized antibodies, murine antibodies, conjugated antibodies (e.g., to a chemotherapeutic agent, to a radionuclide, to another protein, etc.), synthetic antibodies, bi-specific antibodies, chimeric antibodies, single chain antibodies, antibody fragments produced by a Fab expression library, and antibody fragments produced by mRNA display or phage display. Antibodies also include but are not limited to monovalent immunoglobulins (e.g., IgG), and fragments, e.g., $F(ab')_2$, $Fab_2$, Fab', Fab, Fv, single-chain Fv (scFv), scFv-Fc, VhH, disulfide-linked Fvs (sdFv), etc. or any active fragment thereof.

In some embodiments, the antibody is labeled with a colorimetric probe, a fluorescent tag, a chemiluminescent tag, or a radiolabel, and incubated with the solution comprising cells. A variety of techniques are suitable for detecting binding of an antibody to a substrate (https://www.rndsystems.com/resources/protocols/detection-visualization-antibody-binding). Such techniques, including various fluorescently tagged, colorimetric, chemiluminescent, or radiolabeling immunoassays, are well known to a skilled artisan.

As used herein, the term "binding molecule" refers to a molecule capable of specifically binding to a cell, e.g., by binding to a marker on the surface of the cell. A "binding moiety" includes but is not limited to antibodies or fragments thereof, aptamers, protein scaffolds, affimers, small molecules, peptides, proteins, phage display scFvs, mRNA display peptides or mRNA display scFvs, etc.

As used herein, the term "cell" refers to the smallest structural and functional unit of a living organism. Human cells range in size, e.g., provided herein as a volume, from about 30 $\mu m^3$ to about 4,000,000 $\mu m^3$. A typical cell size for a red blood cell is about 100 $\mu m^3$ and for a megakaryocyte is about 30,000 $\mu m^3$.

As used herein, "solution of cells" includes a biological sample comprising a plurality of cells. In some cases, the solution of cells may optionally include additional components, including but not limited to, buffers, preservatives, diluents, and other molecules to facilitate processing by the microfluidics device. As an example, a blood sample may contain a plurality of red blood cells and white blood cells as well as other types of cells, such as CTCs, metastatic cells, and/or normal cells.

As used herein, the term "chamber" refers to a region having an associated length, width and height, e.g., a rectangular component, comprising a matrix of posts. The matrix of posts refers to a configuration, e.g., a grid or grid-like, in which multiple rows of posts are present, with each row having a plurality of posts. Thus, the posts may be described as a plurality of rows, each row containing a plurality of posts (as used herein). Alternatively, the posts may be described as a plurality of columns, each column containing a plurality of posts. In some aspects, each row of the posts or at least a portion of each row of the posts is arranged along a line having a slope, wherein the slope is calculated using standard definitions in mathematics (e.g., $m=(y_2-y_1)/(x_2-x_1)$, and wherein the x,y positions refer to the locations of posts). In this regard, slope is determined relative to a side of the chamber, which has zero slope. Thus, the posts are not arranged in lines that are parallel to the sides of the chamber. The chamber has one or more input mechanisms (e.g., to introduce cells, fluids, binding agents, buffers into the chamber, etc.) and one or more output mechanisms (e.g., to facilitate collection of concentrated cells, to facilitate collection of size separated cells, to connect to another input mechanism, to connect to another chamber for further processing, etc.).

As used herein, the term "path" or "channel" refers to an area between two adjacent rows of posts through which cells pass through (see, FIG. 2A). When the device is configured to concentrate cells, the cells predominantly remain in a particular path until exiting the matrix of posts, and do not typically cross a row of posts to enter another path. Here, cells generally flow within a particular path until exiting the matrix of posts.

When the device is configured to separate cells based on size, the posts are arranged to retain cells larger than a threshold and to permit cells smaller than a threshold to cross one or more rows of posts thereby entering two or more paths. It is noted that the configuration of posts disclosed herein is distinct from systems that employ configurations which result in particles zig-zagging back and forth (e.g., path 1 to path 2, path 2 to path 1) between two or more paths. The present techniques employ directional movement (e.g., path 1 to path 2, path 2 to path 3), to steer the cells towards a side of the chamber for collection. Thus, while the microfluidics device can be used for cell concentration and cell separation, both of which deflect cells laterally toward a side of the chamber, it is understood that in the context of cell concentration, cells predominantly remain in a single path, and in the contact of cell separation, cells above a threshold value of size predominantly remain in a single path.

As used herein, the term "concentration" refers to a measure of an amount of a component in a solution, e.g., how many cells, how many cells of a particular type of cell, etc. are present in a particular volume of a solution.

As used herein, the term "flow rate" refers to a volume of fluid (e.g., a solution comprising cells) that is moving through a given cross sectional area per unit time.

As used herein, the term "in fluid communication with" or "fluidly coupled to/with" refers to two spatial regions being configured such that a liquid may flow between the two spatial regions. In some embodiments, the two spatial regions are in fluid communication through one or more valves, restrictors, mixers or other components, configured to control the flow of a solution comprising cells through the microfluidic device. It is noted that two spatial regions may be in fluid communication even if the fluid is not able to flow freely into the spatial region with which it is in communication with. For example, an input mechanism may be in fluid communication with a chamber, even when a valve is present such that fluid flows into the chamber only upon application of pressure. In other embodiments, an input mechanism may be in fluid communication with a chamber into which a fluid (e.g., a solution comprising cells) may flow freely into.

As used herein, the term "linear" refers to a straight line or substantially a straight line. For example, for posts distributed along a straight line, some posts may be slightly above the line (e.g., within about a 10%, a 5%, a 2%, or a 1% deviation), and other posts may be positioned slightly below the straight line (within about a 10%, a 5%, a 2%, or a 1% deviation). However, taken as a whole, the posts are essentially distributed along a straight line. In other embodiments, the row of posts may be associated with a curvature, to more efficiently direct cells to a side of the microfluidics device.

As used herein, the term "input mechanism" refers to a port or other opening that is in fluid communication with the chamber comprising a matrix of posts. Fluid (e.g., the solution comprising cells) may be introduced into the microfluidics device via the input mechanism. In some embodiments, a syringe or pump (e.g., peristaltic pump, vacuum pump, syringe pump, displacement pump, etc.) may be connected to the input mechanism through tubing, e.g., via a twist screw cap that attaches to the input mechanism of the microfluidics device. Pressure may be applied to drive fluid flow through the microfluidics device. In some embodiments, the input port may be in fluid communication with an optional input chamber (a region without a matrix of posts), which is in fluid communication with the chamber comprising the matrix of posts.

As used herein, the term, "interval" or "spacing" refers to a unit of distance. Interval, in this context, includes both fixed intervals (e.g., the same distance) and varying intervals (e.g., varying distances). Intervals can refer to the distance between successive rows of posts (e.g., a vertical measurement), or the distance between successive posts in a respective row (e.g., a horizontal measurement).

As used herein, the term "microfluidics device" refers to a device designed to control the flow of small volumes of fluid through a 3D structure in order to perform a desired operation. In certain embodiments the microfluidics devices disclosed herein comprise a matrix of posts for concentrating cells, and may also perform other operations such as buffer change and cell type isolation. In still other embodiments, the microfluidics devices disclosed herein may sort cells according to a size or a range of sizes.

As used herein, the term "output mechanism" refers to a port or other opening that is in fluid communication with the chamber comprising a matrix of posts. Fluid (e.g., the solution comprising concentrated cells) may exit the microfluidics device via the output mechanism, into a reservoir. In some embodiments, the reservoir may be connected to the output mechanism through tubing, e.g., via a twist screw cap that attaches to the output mechanism of the microfluidics device. In some embodiments, the output port may be in fluid communication with an optional output chamber (also a region without a matrix of posts), which is in fluid communication with the chamber comprising the matrix of posts.

As used herein, the term "post" refers to a structure within the chamber having an associated in-plane dimension, an out-of-plane dimension, rotational angle, and shape. An in-plane dimension may refer to the length (l) and width (w) of the post, while the out-of-plane dimension may refer to the height (h) of the post. A tilting angle or a rotational angle ($\phi$) refers to the rotation of the post with respect to the chamber. Shape refers to the 3-D characterization of the post, e.g., cylindrical, conical, pyramidal, cubic or cuboid, etc. In general, a post will be positioned such that its axis (out-of-plane dimension) is perpendicular to the surface to which it is affixed. In some embodiments, all posts within the chamber are of the same dimensions. In other embodiments, the dimensions of the posts vary as a function of space. In general, the post may be of any shape, and is not limited to a particular geometric shape presented herein. The post shape may be arbitrary, as shown in FIG. 2F, represented by an axial length (l) and width (w), and a plurality of radii (r4-r12) associated with a curvature, positioned along the axial length, e.g., at a repeating constant interval or a repeating variable interval. Any number of different geometries may be described by the plurality of radii. Additionally, with reference to FIGS. 2F and 2G, one or more sides of the post may be in the shape of a straight line. Accordingly, the posts may have any suitable shape comprised of curves and/or straight lines.

FIG. 2G shows another embodiment of a post geometry. In this embodiment, the posts are configured to concentrate cells in a size independent manner, with the posts densely packed (close) together. Additionally, an overlapping area between the posts has been increased (e.g., by removal of part of the tip of the post), to facilitate flow of cells through the channel, instead of trapping cells between posts. In this embodiment, the distance between posts may be about 3 μm, the upper width may be about 6 μm, and the lower width may be about 15 μm.

Non-activated T cells have a diameter of about 6-8 μm and can be concentrated with this configuration. Cancer cells, occurring at a low frequency within a sample, can be concentrated with this configuration along with similarly sized or larger cells, e.g., including immune cells. Additionally, this configuration is compatible with buffer changes, and other processing steps, e.g., as set forth herein. In general, this type of geometric configuration has an increased overlapping area, a narrow gap, and is not symmetric.

As used herein, "regularly spaced interval" or "fixed interval" refers to an interval having a fixed distance. According to embodiments presented herein, posts may be distributed along a line at a fixed interval, e.g., a post may be positioned along a straight or substantially straight line e.g., at every 5 μm, 10 μm, 15 μm, 20 μm, 25 μm, 30 μm, 35 μm, 40 μm, 45 μm, 50 μm, 55 μm, 60 μm, 65 μm, 70 μm, 75 μm, 85 μm, 90 μm, 95 μm, 100 μm, etc.

As used herein, the term "rotational angle" refers to the degree of rotation of a post with regard to its position in the chamber. In some embodiments, the post has a length that is greater than its width. In this embodiment, a rotational angle of zero means that the length of the post is aligned with an axis perpendicular to a side of the chamber. To describe different rotational angles, the post may be rotated in a clockwise or counter clockwise direction. As an example, the posts in FIGS. 2A-E are rotated about 35 degrees in a counter clockwise motion to arrive at the geometry of the posts shown in these figures.

As used herein, the term "specifically binds" typically refers to non-covalent interactions between a target entity (e.g., a marker on a cell surface) and a binding agent and usually refers to the presence of such an interaction with a particular structural feature (e.g., such as an antigenic determinant) of the target entity with the binding agent. As understood by one of skill in the art, an interaction is considered to be specific if it occurs in the presence of other alternative interactions.

BRIEF DESCRIPTION OF THE DRAWINGS

FIGS. 3A-3B are an illustration and a simulation showing an example microfluidics chamber for concentrating cells, according to embodiments presented herein.

FIGS. 10A-10D show experimental systems comprising a microfluidics chamber for changing buffers, using the devices and methods presented herein.

FIGS. 12A-12D show examples of various post configurations in a microfluidic chamber, with differing gap distances between the posts, using the devices and methods presented herein.

FIG. 14 is a table summarizing various cell sorting studies, using the devices and methods presented herein.

FIGS. 15A-15J show experimental results of sorting activated T cells, using the devices and methods presented herein.

FIGS. 17A-17F show images and histograms of cell sorting activated T cells by varying the distance between the posts, using the devices and methods presented herein.

FIG. 18 is a table summarizing various antigen stimulated cell sorting studies, using the devices and methods presented herein.

FIGS. 22A-22F show experimental results of sorting antigen stimulated (pp65$_{495-503}$) T cells, using the devices and methods presented herein.

The examples presented herein are not intended to be limiting. It is understood that many different variations of these examples are disclosed within the application, and that all such embodiments fall within the scope of the embodiments disclosed herein.

DETAILED DESCRIPTION

Systems and methods of concentrating cells or separating cells based on size from a biological sample (e.g., a bodily fluid) are provided. Bodily fluids may comprise a variety of cells obtained from a patient. Bodily fluids include but are not limited to blood, serum, plasma, saliva, urine, tear, sweat, interstitial fluid, lymph fluid, cerebrospinal fluid, mucosa secretion, peritoneal fluid, or other bodily secretions or exudates.

In some embodiments, the bodily fluid undergoes additional processing, before being brought into contact with the microfluidics device. In other embodiments, it is noted that the present techniques may be used directly with whole blood, or with diluted whole blood. Processing steps may also include adding one or more additional ingredients (e.g., buffers, physiologically acceptable carriers, diluents, excipients, stabilizers, diluents, emulsifiers, preservatives, etc.) to the bodily fluid. Additionally, one or more other ingredients may be added, including but not limited to, antioxidants, bacteriostats, buffers, carbohydrates, chelating agents such as EDTA or glutathione, blocking reagents such as bovine serum albumin, coloring, flavoring and/or aromatic substances, lubricants, pH buffering agents, salts for influencing osmotic pressure, polypeptides (e.g., glycine), proteins, solubilizers, wetting agents, substances to reduce cell adhesion, etc., which do not deleteriously react with the cells. Buffers include but are not limited to saline, neutral buffered saline, phosphate buffered saline, etc. Carbohydrates include but are not limited to dextrans, glucose, mannose, mannitol, sucrose, etc. Thus, the solution comprising cells that is provided to the microfluidics device may comprise the biological fluid as obtained from the patient or the biological fluid that has undergone additional processing. It is presumed that the flow of fluid through the microdevice occurs predominantly as laminar flow.

Figure 1A:
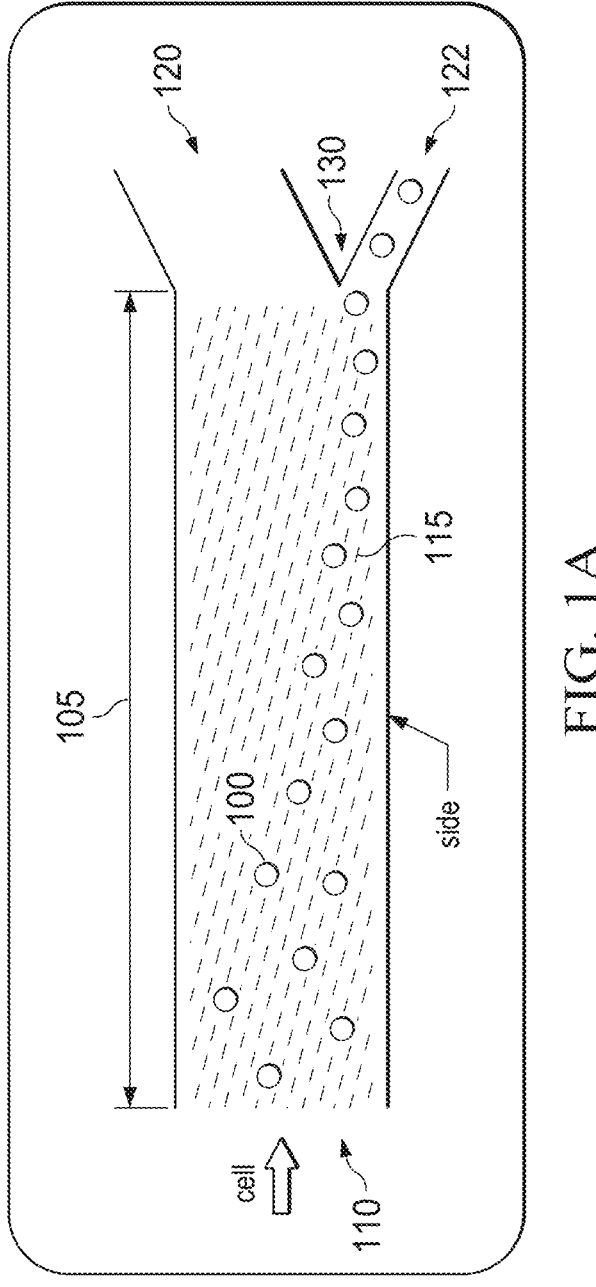
FIGS. 1A-1B are illustrations showing example microfluidics chambers for concentrating cells, according to embodiments presented herein.
Figure 1B:
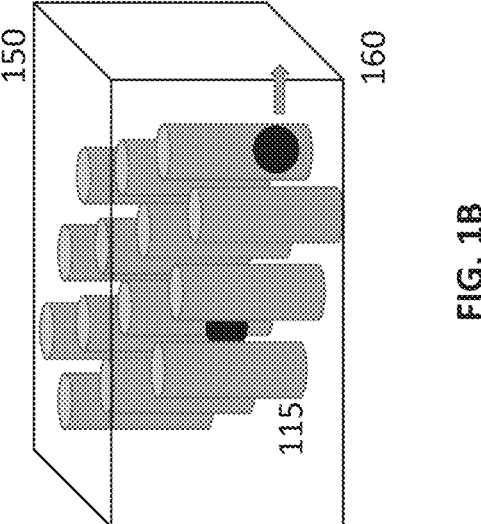

FIG. 1A is an illustration of an example microfluidics device. In this example, a solution comprising cells 100 enters a chamber 105 at input mechanism 110. Cells are illustrated as circles. The cells pass through chamber 105, which comprises a matrix of posts 115, shown here as rectangular structures distributed along a plurality of lines having a slope. As the cells pass in between the diagonally oriented rows of posts in the chamber, the cells are deflected laterally, towards output mechanism 122. A side view of a portion of the chamber is shown in FIG. 1B, wherein the chamber has a floor 160 and optionally has a ceiling 150, which may be of the same material as the posts 115 or a different material. Cells (black circles) are shown flowing through the matrix of posts. It is understood that the rows of posts may also be arranged in a curvilinear manner, which would also result in the cells being directed towards a side of the chamber.

In this example, two output mechanisms are shown for the chamber. The solution that exits the chamber via output mechanism 120 is depleted of cells, while the solution that exits the chamber via output mechanism 122 is enriched in cells. Depletion refers to a state in which the concentration of cells in the solution exiting the chamber via output mechanism 120 has been reduced by 50%, 60%, 70%, 80%, 90%, 95%, 96%, 97%, 98%, or 99% as compared to the concentration of cells in the solution entering the chamber at input mechanism 110. Enrichment or concentration refers to a state in which the concentration of cells in the solution exiting the chamber via output mechanism 122 has been increased by 50%, 100%, 200%, 300%, 400%, 500%, 600%, 700%, 800%, 900%, 1000% or more as compared to the concentration of cells in the solution entering the chamber at input mechanism 110. For the cells to be directed to output mechanism 122, the deflection point 130 of the chamber should be situated such that exiting cells are routed to output mechanism 122 (and not output mechanism 120). In general, output mechanism 122 is configured to have a larger cross sectional area than output mechanism 120. In general, the output mechanisms will have a cross sectional area large enough for fluid flow at the flow rates described herein, without producing high pressures which would damage the cells or the device.

In some embodiments, the width of output mechanism 120 is greater than the width of output mechanism 122. For example, the width of output mechanism 120 is 1.5×, 2×, 2.5×, 3×, 3.5×, 4×, 4.5×, 5×, 5.5×, 6×, 6.5×, 7×, 7.5×, 8×, 8.5×, 9×, 9.5× the width of output mechanism 122. In other embodiments, the sum of the cross-sectional areas of the output mechanisms may be equal to or greater than the sum of the cross-sectional areas of the input mechanisms.

In some embodiments, the microfluidics device is configured to allow a standard pump or a syringe or the like to be connected to the microfluidics device to flow a solution comprising cells through the device. Parameters that can influence the flow of a solution though a device include the dimensions of the chamber 105, the in plane and out of plane dimensions of the posts 115, the spacing of the posts within a row (dx), the rotation of the posts (φ), the distance between rows of posts (dy), the diameter of the input mechanism, and the diameters of the output mechanisms (see, FIGS. 2A-2E below). In some embodiments, dimensions of these parameters are selected to be compatible with applied pressure from manual operation of syringes or standard pumps (e.g., peristaltic pumps, diaphragm pumps, syringe pumps, lobe pumps, etc.) that drive flow of the solution through the device. A range of pressures are permitted, provided that the pressure does not damage the microfluidics device or the cells.

In general, cells may flow into the microfluidic device in a series (one at a time and into a particular path) or in multiples (multiple cells that flow into multiple paths).

Figure 2A:
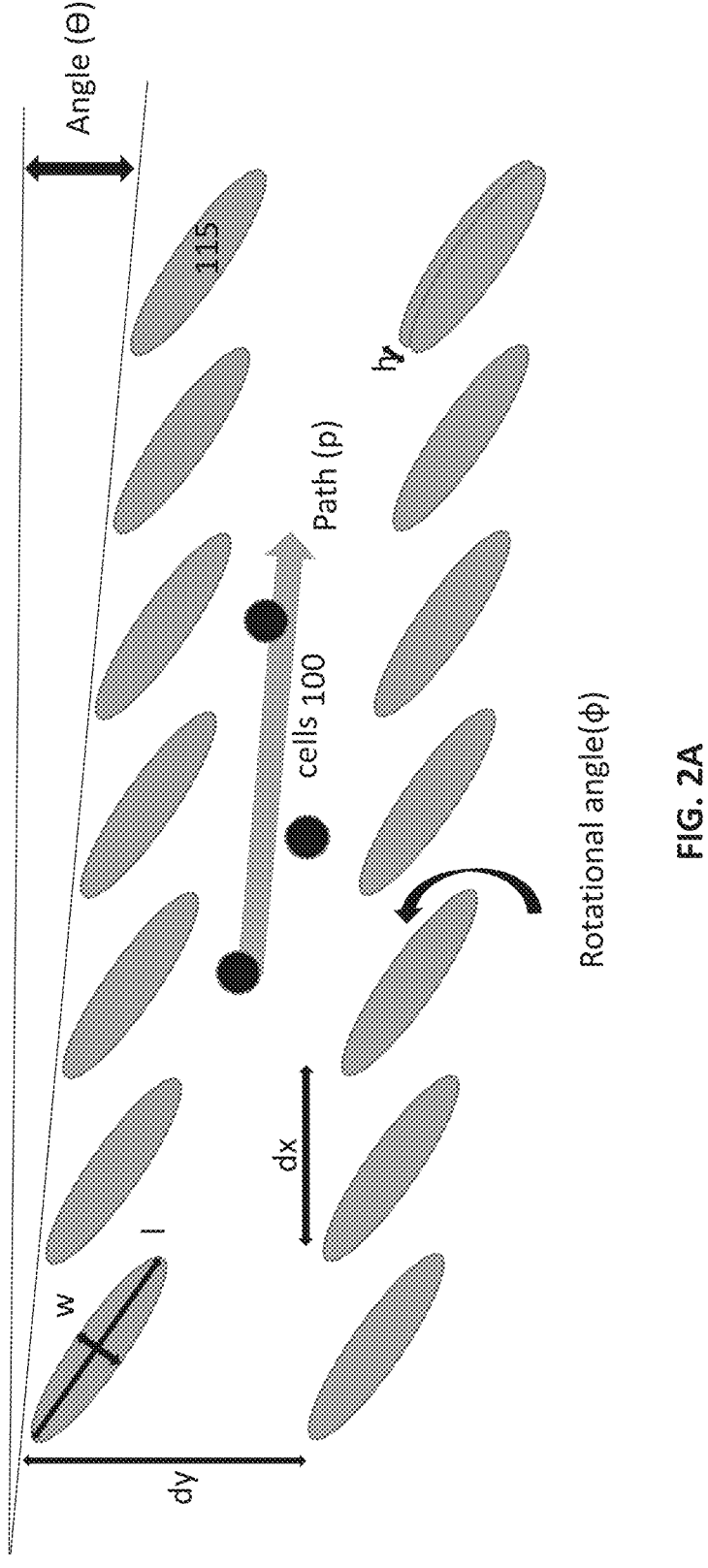
FIGS. 2A-2G are illustrations showing various aspects of the geometry and positioning of posts within the chamber, according to embodiments presented herein.

FIG. 2A is an illustration of a top-down view of a section of chamber 105, wherein the section includes two rows of seven posts each. Cellular flow is shown along path (p). This illustration shows the positioning of posts 115 in a section of the chamber of the microfluidics device. In general, the posts are aligned along lines having a slope as defined by angle (θ) at a spacing interval (dx), which may be fixed or variable, provided that the variation does not lead to cells escaping from the path (p) between the posts.

In some embodiments, the width of the chamber is 1 mm, 2.5 mm, 5 mm, 7.5 mm, 10 mm, 12.5 mm, 15 mm, 17.5 mm, 20 mm, 30 mm, 40 mm, 50 mm, or more, or any size in between. The width of the individual paths (p) controls the characteristics of the streamlines. Any number of paths, e.g., 1, 2, 4, 8, 12, 16, 32, etc., or any range in between, may be employed depending on the width of the chamber. In other embodiments, the flow rate of fluid through the chamber may be 1 mL/hr, 2 mL/hr, 3 mL/hr, 4 mL/hr, 5 mL/hr, 6 mL/hr, 7 mL/hr, 8 mL/hr, 9 mL/hr, 10 mL/hr, 15 mL/hr, 20 mL/hr, 25 mL/hr, 30 mL/hr, 40 mL/hr, 50 mL/hr, and so forth. The chamber is desirably rectangular but may also be circular, semi-circular, V-shaped, or any other appropriate shape.

Angle (θ) is the angle between the horizontal axis with zero slope and a line having a slope along which the posts are distributed. (In this example, the angle provides a measure of the negative slope (tan (θ)=$\Delta y/\Delta x$) of a row of posts.) In this example, it is understood that the posts may have a positive or negative slope, as each row of posts is arranged diagonally. Here, it is understood that diagonal may encompass any orientation that is not parallel or perpendicular to the chamber, e.g., an angle between 1 and 89 degrees, between 91 and 179 degrees, between 181 and 269 degrees, or between 271 and 359 degrees, clockwise or counter clockwise. In general, multiple rows of posts are present in a chamber, and each row has the same slope or substantially the same slope as defined by angle (θ). When cells 100 enter the chamber 105 of the microfluidics device, the cells flow through a plurality of paths (p) between the posts 115 in a lateral manner, towards a side of the chamber 105, until reaching a side of the chamber. For concentrating cells, the cells generally do not cross rows of posts, but rather, the cells typically travel along a particular path (p). The cells then exit the microfluidics chamber via output mechanism 122. In other embodiments, the posts may have a curvilinear component along the length of the chamber 105.

In some embodiments, the posts are arranged at an interval (dx) along a line having a slope, wherein the interval is regularly spaced or fixed. For example, a post may be placed every 5 μm, 10 μm, 15 μm, 20 μm, 25 μm, 30 μm, 35 μm, 40 μm, 45 μm, 50 μm, 55 μm, 60 μm, 65 μm, 70 μm, 75 μm, 85 μm, 90 μm, 95 μm, 100 μm, and so forth, including any value in between these ranges depending upon the size of the cell to be concentrated.

In other embodiments, the posts are distributed along a line having a slope, such that the interval is not fixed but instead varies between any two successive posts. Any interval (dx) is permitted, provided that the interval is small enough to keep the cell from escaping path (p). For example, for a variable interval, a first post may be placed at a particular location, the second post may be placed 5 μm from the first post, a third post may be placed 4 μm from the second post, and so forth. The interval can be selected based on the size of the cell.

In some embodiments, the interval can be selected to be sufficiently large to allow concentration of a particular type of cell, while allowing smaller cells to exit via output mechanism 120. For example, a blood sample may comprise a plurality of different cell types of relatively small size, including red blood cells, neutrophils (e.g., 12-14 μm in diameter), eosinophils (e.g., 12-17 μm in diameter), basophils (e.g., 14-16 μm in diameter), lymphocytes (e.g., 10-14 μm in diameter), and monocytes (e.g., 20 μm in diameter). Other types of cells in the human body are much larger, e.g., ranging from 40 to 100 μm in diameter or more. In such cases, the posts may be spaced to allow red and white blood cells to pass through, while concentrating larger cells (e.g., normal cells, tumor cells, etc.). The configuration of the posts (spacing) is determined based upon the type of cell being isolated. Different sheath-to-sample flow ratios can affect size-based sorting performance.

Figure 2C:
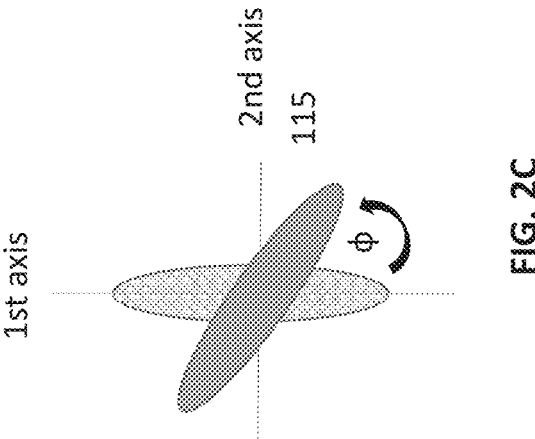
Figure 2B:
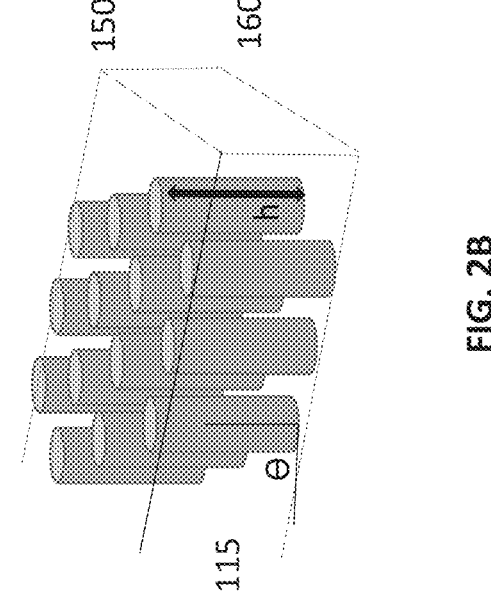

Each post has an associated length (l), width (w), also referred to as in-plane dimensions and a height (h), also referred to as an out of plane dimension (see also FIG. 2B). In some embodiments, the width of the post may be 5 μm, 10 μm, 15 μm, 20 μm, 25 μm, 30 μm, 35 μm, 40 μm, 45 μm, 50 μm, 55 μm, 60 μm, 65 μm, 70 μm, 75 μm, 85 μm, 90 μm, 95 μm, 100 μm, and so forth or any value in between. The length of the post may be 5 μm, 10 μm, 15 μm, 20 μm, 25 μm, 30 μm, 35 μm, 40 μm, 45 μm, 50 μm, 55 μm, 60 μm, 65 μm, 70 μm, 75 μm, 85 μm, 90 μm, 95 μm, 100 μm, and so forth or any value in between. In general, the posts may be of any shape (as viewed from the top-down orientation, and with respect to dimensions w and l), including but not limited to, circular, oval, square, rectangular, etc.

In the examples presented herein, the posts have an oval or rectangular shape. In some embodiments, the length of the post is 1.1 to 10 times greater than the width of the post; 1.1 to 5 times greater than the width of the post; 2 to 4 times greater than the width of the post; 3 to 4 times greater than the width of the post; or 2-3 times greater than the width of the post. In still other embodiments, the length and the width of each post in the matrix are the same. In yet other embodiments, if the posts are circular, the radius of each post in the matrix is the same.

Additional features include the rotation angle (φ) of the post, the height or the out of plane dimension of the post, spacing between the rows (dy), and offset of the rows (xo), which are described in additional detail in FIGS. 2B-2E and throughout the application.

Referring to FIG. 2B, each post has an associated height (h) or out of plane dimension, such that the posts are sufficiently tall to prevent the cells from escaping from path (p) by flowing in an upward path (e.g., over the top of the posts into a different path). For example, in some embodiments, the posts will span the height of the microfluidics chamber, such the posts are in contact with the floor of the chamber 160 and the ceiling of the chamber 150. In other embodiments, the height or out of plane dimension of the post may span a fraction of the total height of the microfluidics device. For example, the posts may have a height of 1 μm, 3 μm, 5 μm, 10 μm, 15 μm, 20 μm, 25 μm, 30 μm, 35

μm, 40 μm, 45 μm, 50 μm, 55 μm, 60 μm, 65 μm, 70 μm, 75 μm, 85 μm, 90 μm, 95 μm, 100 μm, and so forth, or any value in between.

Referring to FIG. 2C, each post has an associated rotation angle (φ) or tilt, as shown from a top down view. In the present example, the rotation of the post is determined, starting with an orientation in which the length of the post is aligned with a first axis perpendicular to the side of the chamber and the width of the post is aligned with a second axis in line with the side of the chamber, by rotating the post in a counterclockwise direction, e.g., in this example, about 35 degrees counterclockwise, until reaching the desired rotation. Any rotation angle that facilitates flow of the cells through path (p) may be utilized, and all such rotation angles are contemplated herein. In some embodiments, the rotation angle is between 1 degree and 179 degrees, between 1 degree and 89 degrees, between 5 degrees and 85 degrees, between 10 degrees and 80 degrees, between 15 degrees and 75 degrees, between 20 degrees and 70 degrees, between 25 degrees and 65 degrees, between 30 degrees and 60 degrees, between 35 degrees and 55 degrees, between 40 degrees and 50 degrees, between 30 degrees and 40 degrees, between 32 degrees and 38 degrees, between 34 degrees and 36 degrees, or 35 degrees. In other embodiments, the rotation angle may be between 91 degrees and 179 degrees, between 95 degrees and 175 degrees, between 100 degrees and 170 degrees, between 105 degrees and 165 degrees, between 110 degrees and 160 degrees, between 115 degrees and 155 degrees, between 120 degrees and 150 degrees, between 125 degrees and 145 degrees, between 130 degrees and 140 degrees, or 135 degrees.

As indicated previously, the posts are distributed along a line having a negative slope. By orienting the cells along this line, the cells flowing through path (p) are directed laterally, towards a side of the chamber, while the solution that the cells are originally suspended in is able to flow in a manner (e.g., near horizontally or horizontally) to exit the microfluidics chamber via output mechanism 120.

Figure 2D:
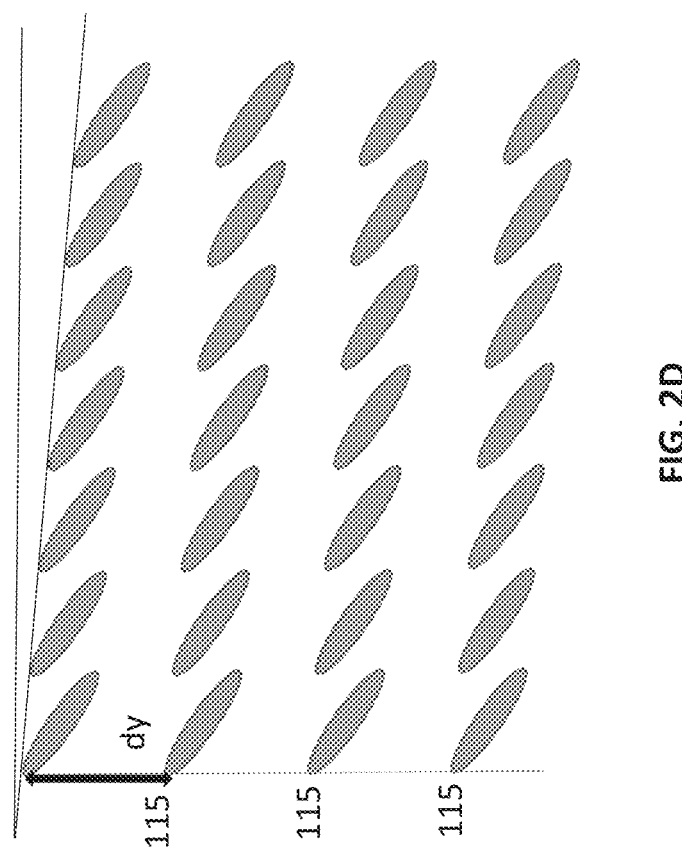

Referring to FIG. 2D, in still other embodiments, the rows of posts are spaced at an interval (dy). In some embodiments, the posts are arranged at an interval (dy) along a vertical line, wherein the interval is regularly spaced or fixed. For example, a post may be placed every 5 μm, 10 μm, 15 μm, 20 μm, 25 μm, 30 μm, 35 μm, 40 μm, 45 μm, 50 μm, 55 μm, 60 μm, 65 μm, 70 μm, 75 μm, 85 μm, 90 μm, 95 μm, 100 μm, and so forth, including any value in between, depending upon the size of the cell to be concentrated.

In other embodiments, the posts are distributed along a vertical line, such that the interval (dy) is not fixed but instead varies between any two successive rows of posts. For example, a first row of posts may be placed at a particular location, the second row of posts may be placed 5 μm from the first row of posts, a third row of posts may be placed 4 μm from the second row of posts, and so forth, aligned with respect to a vertical line. The interval (dy) can be selected based on the size of the cell to be concentrated. Any interval (dy) is permitted, provided that the interval is sufficiently wide to allow flow of the solution through the chamber without requiring high pressures, which could damage the microfluidics device. In some embodiments, successive rows of posts may have a zero offset (xo).

Figure 2E:
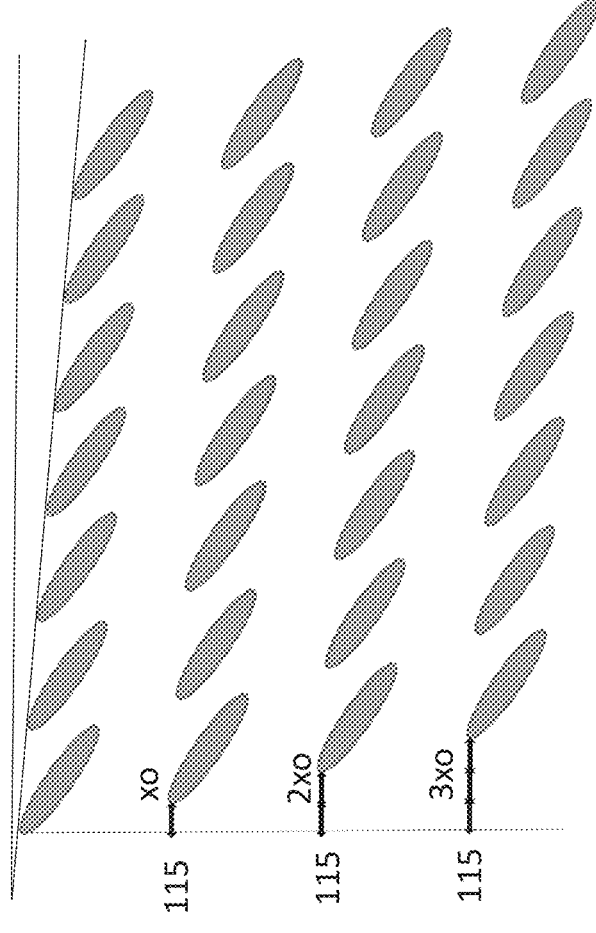

Referring to FIG. 2E, successive rows of posts may have an offset (xo), relative to interval (dx). For example, a row (r) may be established at a particular location (e.g., using the Cartesian coordinate system x, y). The (r+1)th row may be displaced to the right by an amount (xo). The (r+2)th row may be displaced to the right by an amount (2xo). The (r+3)th row may be displaced to the right by an amount (3xo), and so forth up to the interval (dx). Offsets may occur in a fixed manner, such that each successive row is displaced in the same direction by a fixed amount. Alternatively, offsets may occur in a variable manner, such that each successive row is displaced in the same direction by a variable amount (up to the amount of (dx)). In other embodiments, offsets may be applied in an alternating direction, such that with regard to a row (r), the (r+1)th row has a fixed or variable offset in one direction, and the (r+2)th row has a fixed or variable offset in the opposite direction (e.g., one offset is to the right and the next offset is to the left).

The posts may be made out of any suitable material, including poly(dimethylsiloxane) (PDMS), glass, plastic, elastomers, silicon, etc. PDMS in general can be fabricated to have sub-micron resolution (e.g., below 0.1 μm features). In some embodiments, the chamber 105 and/or posts 115 may be made of PDMS. In other embodiments, the chamber may be fabricated of glass and/or silicon and/or plastic, and the posts may be fabricated using PDMS (e.g., the bottom of the chamber may be glass or silicon and the top of the chamber may be glass or plastic). Lithography, which is well known in the art, may be utilized to fabricate the chambers and posts as described herein. Materials having similar properties to PDMS may also be used to construct the microfluidic devices set forth herein.

Additionally, specific embodiments may comprise a number of additional features, including valves (e.g., between an input mechanism and the chamber, between the chamber and an output mechanism, between an output mechanism and another input mechanism or another chamber, etc.), pumps and mixers. In some embodiments, valves can be placed into PDMS during curation.

A variety of techniques can be employed to fabricate a microfluidics device. The microfluidics device may be formed from one or more of the following materials: poly (methylmethacrylate) (PMMA), polycarbonate, polystyrene, polyethylene, polyolefins, silicones (e.g., poly(dimethylsiloxane) PDMS), silicon, and combinations thereof. Other materials are well known in the art.

Methods for fabricating a chamber with posts and a microfluidics device using the materials referenced herein are also known in the art and include but are not limited to embossing, laser micromachining, milling, molding (e.g., thermoplastic injection molding, or compression molding), photolithography (e.g., stereolithography or x-ray photolithography), silicon micromachining, wet or dry chemical etching, etc.

Silicon fabrication techniques using photolithography followed by wet (KOH) or dry etching (reactive ion etching with fluorine or other reactive gas) can be employed for glass materials. For example, a glass master can be formed by conventional photolithography, which serves as a master template for molding techniques to generate a plastic or PDMS-based device.

A microfluidics device may be fabricated in one or more layers that are joined together, e.g., by adhesives, clamps, heat, solvents, etc. Alternatively, the microfluidics device may be fabricated as a single piece, e.g., using stereolithography or other three-dimensional fabrication techniques.

In some embodiments, due to the deformability of cells, a gap distance may be selected that is about 5 μm or less as compared to the size (e.g., a diameter) of the cell being concentrated. In other embodiments, the gap distance may be selected that is about 5 μm or greater as compared to the size (e.g., a diameter) of the cell being sorted. For rigid cells or microspheres having the same or similar diameter as a deformable cell, the gap distance may be different (e.g., larger for rigid cells) as compared to the gap distance for deformable cells of the same diameter.

FIGS. 3A-3B show an illustration (FIG. 3A) and a simulation (FIG. 3B) of an example microfluidics device for cell concentration, representing a portion of a chamber 150. Simulations were performed (FIG. 3B), wherein the spacing of the posts were about 4 μm apart, and the posts were rotated about 35 degrees counterclockwise. Simulations showed that the cell successfully traversed a path and was concentrated using this design, thus confirming that the design successfully concentrated cells.

In some embodiments, additional simulations may be performed to confirm other types of configurations for different cells.

Figure 4:
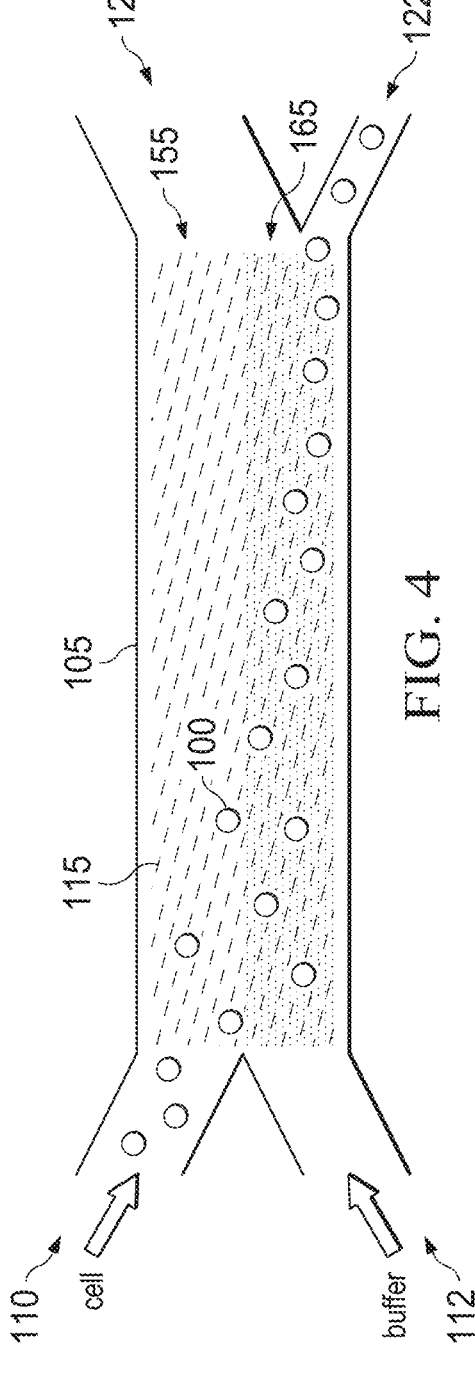
FIG. 4 shows an illustration of an example microfluidics chamber for changing buffers, according to embodiments presented herein.

FIG. 4 is an illustration of another example microfluidics cell concentrator. In this example, a first solution comprising cells 100 enters a chamber 105 at a first input mechanism 110. Cells are illustrated as circles. The cells pass through chamber 105, which comprises a matrix of posts 115, shown here as rectangular structures distributed along lines having a slope. As the cells pass in between the diagonally oriented rows of posts in the chamber, the cells are deflected laterally towards a side of the chamber. Similar to FIG. 1B, the chamber has a floor 160 (not shown) and an optional ceiling 150, which may be of the same material as the posts 115 or a different material.

In this example, a second input mechanism 112 is present in this system. A second solution (e.g., a buffer, which is different from the first solution entering the chamber through the first input mechanism 110) enters the chamber through the second input mechanism 112. In some embodiments, the first solution and the second solution do not substantially mix, and thus, the upper region of the chamber 155 comprises the first solution and has little if any of the second solution, while the lower region of the chamber 165 comprises the second solution and has little if any of the first solution. Thus, as the cells are deflected laterally and exit the chamber through output mechanism 122, the solution that exits the chamber via output mechanism 122 is in the second solution buffer.

Figure 6:
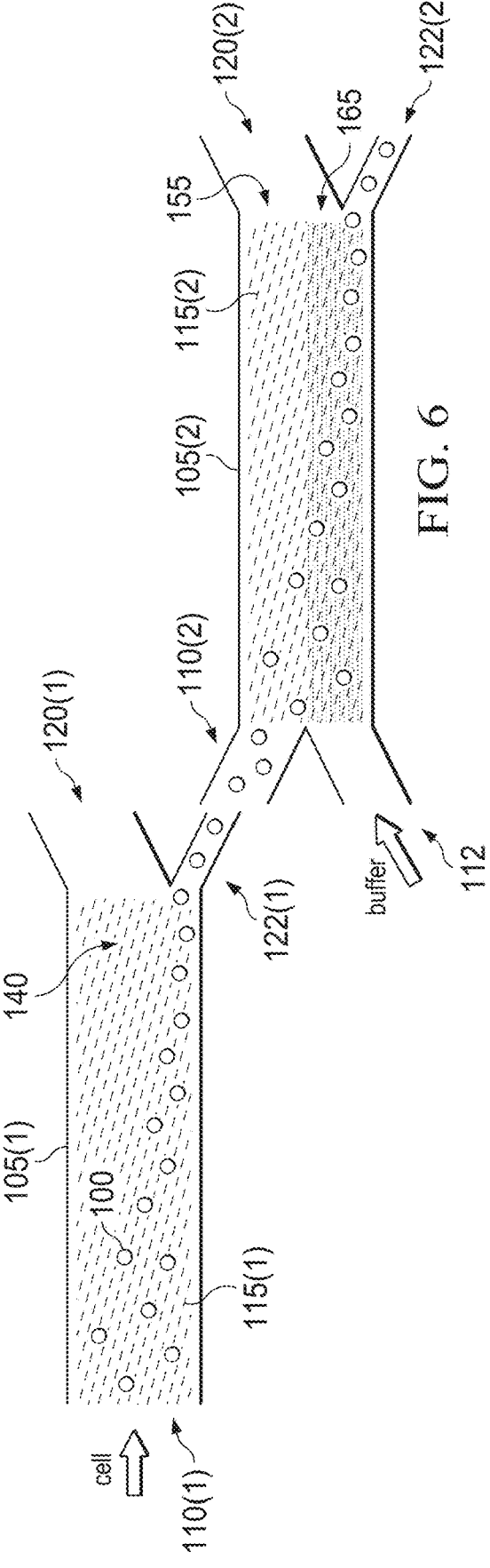
FIG. 6 is an illustration of an example microfluidics device having two separate chambers, one chamber for cell concentration and another chamber for buffer change, according to embodiments presented herein.

In some aspects, buffer changes may occur sequentially, in a cascade design, as shown in FIG. 6. In other aspects, buffer changes may occur in parallel. For example, the flow path may be divided so that the sample flows into multiple chambers, wherein each chamber includes an input mechanism for a buffer. With this configuration, the same buffer may be supplied to each of the parallel chambers, such that the cells are concentrated into the same buffer. Alternatively, each of the parallel chambers may be supplied with a different buffer, such that the cells are concentrated into different buffers, e.g., for different downstream assays.

In general, the input mechanism can be driven by a syringe pump or by manual depression of a syringe. In some aspects, for multiple inputs, one or more syringe pumps can be used to drive each input in an automated manner. In other aspects, for multiple inputs, manual depression of one or more syringes can be used to drive each input manually.

Figure 5:
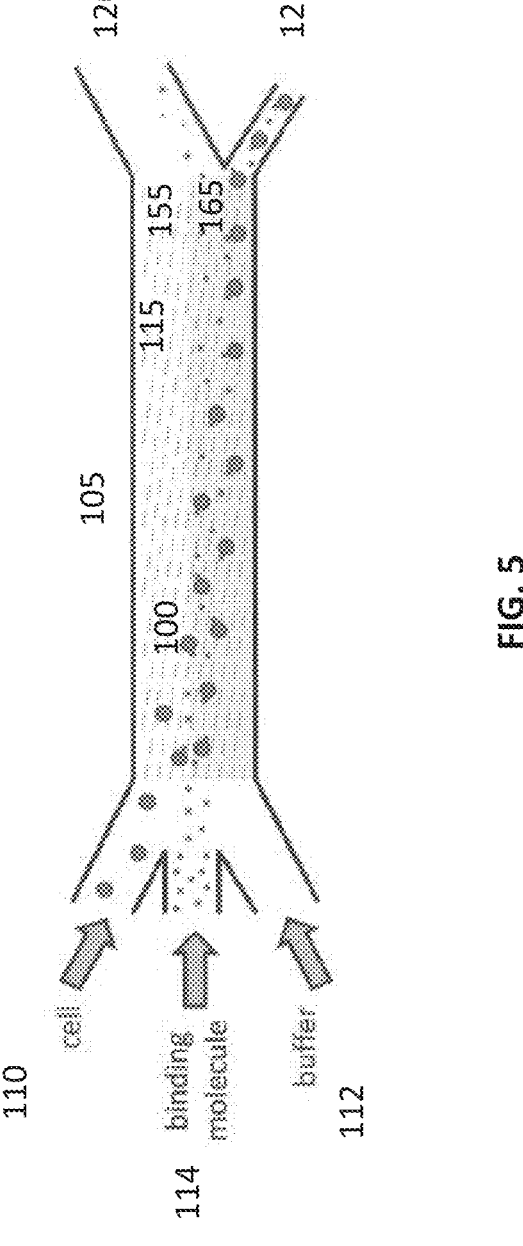
FIG. 5 is an illustration of an example microfluidics chamber for binding of a particular type of cell to a binding molecule and concentrating the type of cell, according to embodiments presented herein.

FIG. 5 is an illustration of another example microfluidics cell concentrator. In this example, a first solution comprising cells 100 enters a chamber 105 at a first input mechanism 110. Cells are illustrated as circles. The cells pass through chamber 105, which comprises a matrix of posts 115, shown here as rectangular structures distributed along lines having a slope. As the cells pass in between the diagonally oriented rows of posts in the chamber, the cells are deflected laterally. Similar to FIG. 1B, the chamber has a floor 160 (not shown)

and an optional ceiling 150, which may be of the same material as the posts 115 or a different material.

In this example, a second input mechanism 114 is present in this system. A second solution (e.g., which may or may not be different from the first solution and comprises molecules capable of binding to the cell surface (binding moieties) of the cells in the first solution, enters the chamber at input mechanism 114. In some embodiments, the binding moieties mix with the cells, and bind to the cells having suitable markers on their cell surface.

Additionally, a third input mechanism 112 is present in this system. A third solution (e.g., a buffer, which may or may not be different from the first solution entering the chamber through the first input mechanism 110 and may or may not be different from the second solution entering the chamber through the second input mechanism 114) enters the chamber through the third input mechanism 112. In some embodiments, the first/second solutions and the third solution do not substantially mix, and thus, the upper region of the chamber 155 comprises the first/second solutions and has little if any of the third solution, while the lower region of the chamber 165 comprises the third solution and has little if any of the first/second solutions. Thus, as the cells exit the chamber through output mechanism 122, the solution that exits the chamber via output mechanism 122 comprises the third buffer, enriched in cells bound to the binding molecule.

In general, the input mechanism can be driven by a syringe pump or by manual depression of a syringe. In some aspects, for multiple inputs, one or more syringe pumps can be used to drive each input in an automated manner. In other aspects, for multiple inputs, manual depression of one or more syringes can be used to drive each input manually.

FIG. 6 is an illustration of another example microfluidics cell concentrator having multiple chambers. In this example, a first solution comprising cells 100 enters a first chamber 105(1) at a first input mechanism 110(1). Cells are illustrated as circles. The cells pass through chamber 105(1), which comprises a matrix of posts 115(1), shown here as rectangular structures distributed along lines having a slope. As the cells pass in between the diagonally oriented rows of posts in the chamber, the cells are deflected laterally. Similar to FIG. 1B, the chamber has a floor (160) (not shown) and an optional ceiling (150), which may be of the same material as the posts 115 or a different material. The cells (enriched) exit the chamber through output 122(1), which flows into input mechanism 110(2), where a second input mechanism 112 enters the system.

A second solution (e.g., a buffer), which is different from the first solution entering the chamber through the first input mechanism 110(1), enters the chamber through the second input mechanism (112). In some embodiments, the first solution and the second solution do not substantially mix, and thus, the upper region of the chamber (155) comprises the first solution and has little if any of the second solution, while the lower region of the chamber (165) comprises the second solution and has little if any of the first solution. The cells (enriched and in the buffer from input mechanism 112) exit chamber 105(2) through output mechanism 122(2).

Figure 7:
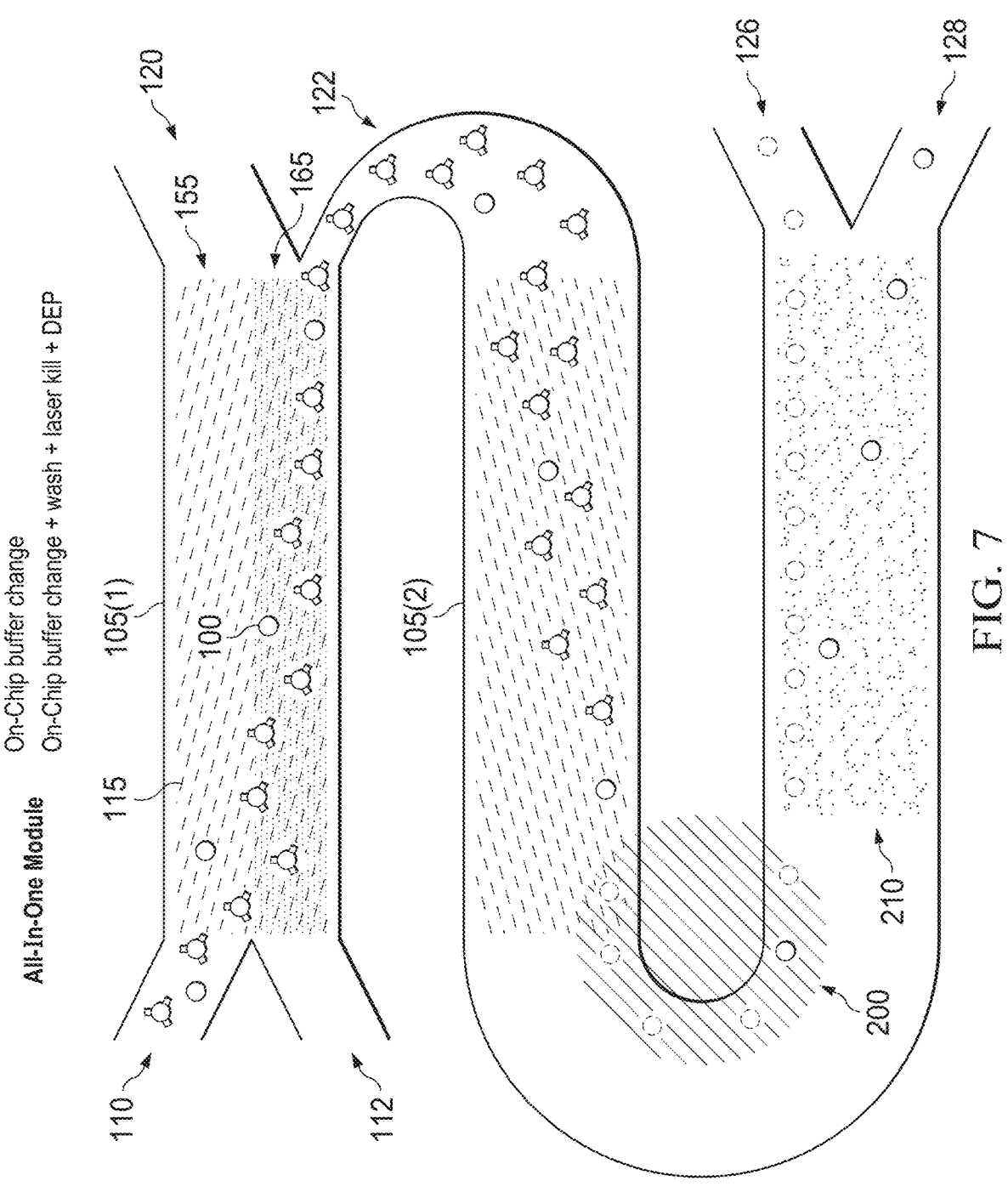
FIG. 7 is an illustration of an all-in-one module, comprising one or more microfluidics chambers as described herein, for cell concentration, buffer exchange, and removal of targeted cells, according to embodiments presented herein.

FIG. 7 shows yet another example configuration in which the system performs a buffer change, cell concentration, laser killing of tagged cells, and dielectrophoresis to obtain only living cells. In this example, a first solution comprising cells 100 enters a first chamber 105(1) at a first input mechanism 110. Cells are illustrated as circles. Some of the cells are tagged with a marker, e.g., a binding molecule that selectively binds to the surface of a particular type of cell. The cells pass through chamber 105(1), which comprises a matrix of posts 115, shown here as rectangular structures distributed along lines having a slope. As the cells pass between the diagonally oriented rows of posts in the chamber, the cells are deflected laterally, from the first buffer 155 into the second buffer 165 flowing from input mechanism 112. Similar to FIG. 1B, the chamber has a floor (160) (not shown) and an optional ceiling (150), which may be of the same material as the posts 115 or a different material. The tagged cells (now enriched) exit the chamber through output mechanism 122, which flows into chamber 105(2).

Once in the second chamber 105(2), the cells are concentrated by the matrix of posts 115 as described herein. Upon exiting chamber 105(2), the cells are directed towards a region that comes into contact with laser 200, where cells bound to the marker are killed upon illumination by the laser (e.g., by 6 mJ, 45 Hz, 6 ml/hr). Any suitable tag that is activated by a laser (e.g., a tag activated into a form capable of killing a cell, such as heat generation, energy dissipation, cleavage into a toxic form, etc.) can be used to kill cells to which the tag is bound. In one embodiment, gold (Au) nanorods, nanocages, or other nanoparticles are adsorbed onto IgG antibodies that are specific to a type of cell in the solution. Once the cells are illuminated by the laser, the Au particles heat up, and kill the cells to which the gold labeled antibodies are attached. The dead cells are separated from living cells, by utilizing dielectrophoresis (see, Pohl H. A. et al., Science (1966), 152(3722): 647). Dead cells exit at output mechanism (126), and the live cells exit at output mechanism (128).

The techniques presented herein can be combined with other protocols to isolate particular cells from a biological sample. For example, in one embodiment, a blood sample is obtained, mixed with one or more gold labeled antibodies that recognize particular cell surface markers (e.g., CD2, CD14, CD19, CD45, CD61 CD66b, Glycoprotein A, etc.) The mixture may be injected into the system of FIG. 7 for processing. For example, the mixture may undergo a buffer change, progress through a second concentration step, be subjected to a laser to kill antibody-labeled (with adsorbed Au nanoparticles) cells. The living cells may be separated at output mechanism 128, which may comprise one or more different types of tumor cells (e.g., circulating tumor cells, metastatic cells, etc.). Many different configurations are possible, and all such configurations fall within the scope of the devices disclosed herein.

Figures 8A, 8B:
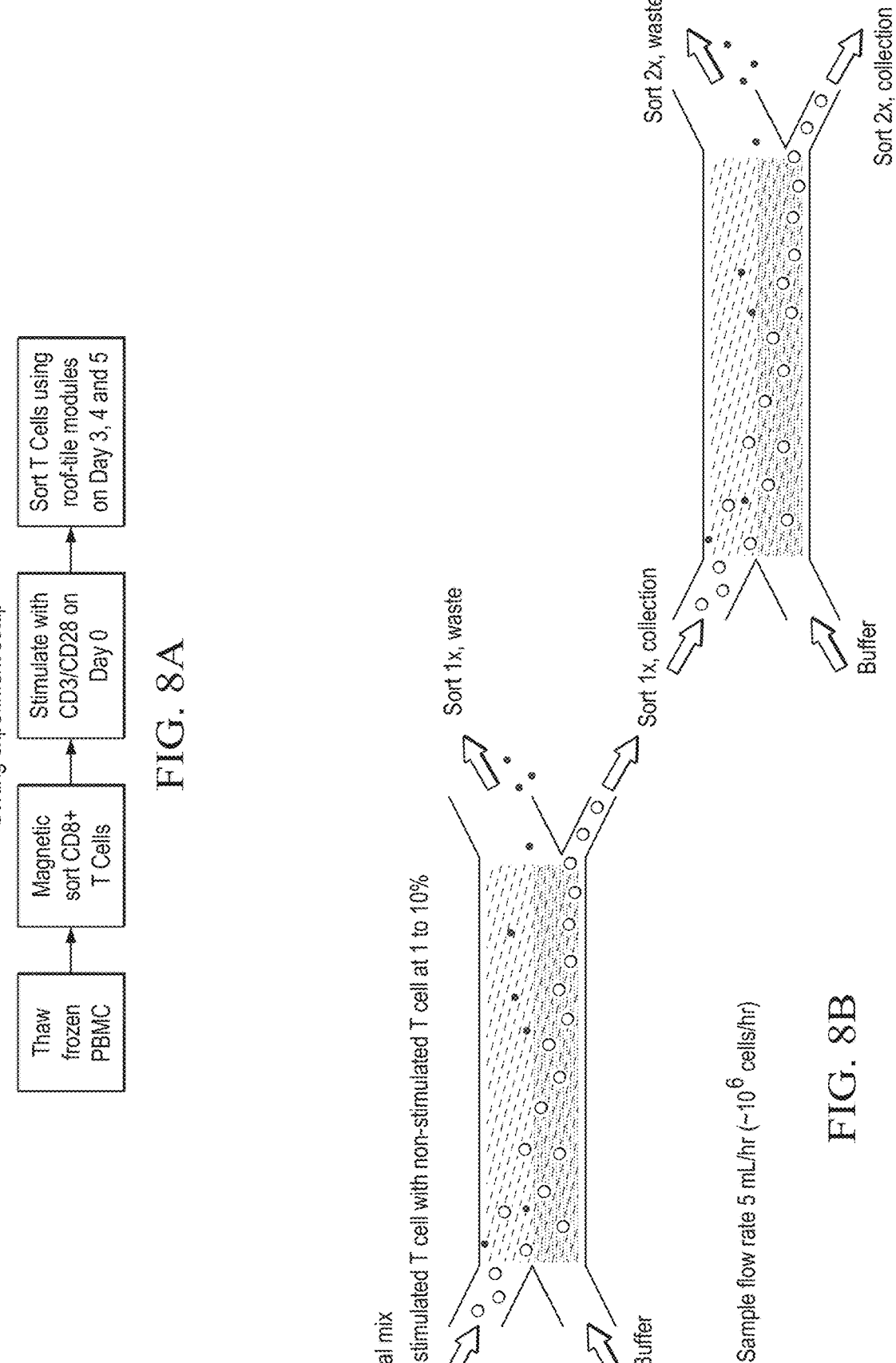
FIGS. 8A-8B show a flowchart and an illustration of separating cells based on size using a microfluidic chamber, according to embodiments presented herein.

FIGS. 8A-8B show a flowchart and an illustration of preparing and sorting cells based on size using a microfluidic chamber, according to embodiments presented herein. The microfluidic devices presented herein may be used to separate cells based on size, e.g., by separating larger cells from smaller cells. According to an example, cells may be prepared for separation according to the protocol shown in FIG. 8A. Here, peripheral blood mononuclear cells (PBMCs) are thawed from a frozen stock. It is understood that blood samples that have not been frozen are also suitable for injection into the microfluidics device. CD8+ T cells may be obtained by magnetic sorting. Protocols for magnetic sorting are known in the art (see, Stanciu L. A., Djukanović R. (2000) Isolation of T-Cell Subsets by Magnetic Cell Sorting (MACS). In: Kearse K. P. (eds) T Cell Protocols. Methods in Molecular Biology™, vol 134. Humana Press). Once the T cells are isolated, the cells are stimulated with CD3/CD28, which leads to an increase in cell size. The cells are then sorted (separated based on size), as shown in FIG. 8B, in which the larger activated T cells are laterally deflected towards a side of the chamber, and the smaller unactivated T cells pass into the waste collection. In some embodiments, the cells may pass through the same chamber at least twice, or through two sequentially arranged chambers, such that the sorting occurs in two steps.

The techniques presented herein may also be used with cells that are stimulated by an antigen. Antigens include but are not limited to CMV pp65, OKT3, etc. The techniques presented herein may also be used with any cell type that underdoes an increase in size upon stimulation, e.g., by an antigen, by an overexpressed protein, or other growth/size enhancing factor.

A chart providing approximate ranges of gap distances and flow rates for separating cells of various sizes is presented. It will be appreciated that cell diameters typically vary within a population of cells. Accordingly, gap distances similar to the values provided below may also be used to separate cells of a given size.

| Cell Type | Range of Gap Distances | Range of Total Flow Rates | Average Cell Diameter |
|---|---|---|---|
| Monocyte | About 9 μm (sorted into collection) | From about 5 to about 60 ml/hr | About 11 μm |
| Activated lymphocyte (T cell, B cell, NK cell) | About 9 μm (sorted into collection) | From about 5 to about 60 ml/hr | About 10 μm |
| Non-activated lymphocyte | About 9 μm (sorted into waste) | From about 5 to about 60 ml/hr | About 6-8 μm |
| Red blood cell | From about 3 to about 9 μm (sorted into waste) | From about 5 to about 60 ml/hr | About 6 μm |

In another aspect, the cell sorting and concentrating device can be additionally configured to have chambers in the floor of the device, positioned between the sorting mechanism and the chamber exit. This configuration traps cells in the floor of the device. In other embodiments, the flow rate is adjusted to trap cells in the gap between posts, allowing smaller cells to pass through. For cells that become trapped, the flow rate may be increased to dislodge the trapped cells.

In still other aspects of the techniques presented herein, the chamber may be used to concentrate cells appearing in urine. For example, bladder cancer cells frequently are shed, and therefore, may be present in urine. The chambers described herein may concentrate such cells.

In other aspects, the techniques presented herein may utilize capture antibodies bound to the posts to remove specific cells (e.g., CTCs) from the sample, or alternatively, may be used to remove populations of cells that are to be excluded from processing.

It is understood that the device may perform any of the functions described herein, including cell concentration, cell sorting, buffer changes, etc.

In another aspect, the device can be used as a preprocessing step to select cells for transfection, e.g., to improve transfection yields. In this example, larger active cells, e.g., undergoing cell division, are selected based on larger size, and the collected larger cells are used for transfection.

In another aspect the device can be used to identify metastatic cells. Some metastatic cells become softer than their non-cancerous counterparts, and therefore, are able to deform through smaller gap distances. By adjusting the gap distance and the flow rate, conditions can be established to allow metastatic cells to become separated from normal cells. Normal cells that are more rigid are not able to pass through smaller gap distances are not collected.

It is noted that other types of cancers, such as breast cancer, may lead to an increase in cell stiffness or viscoelasticity. In this case, the flow rate may be established to allow normal cells to deform through a smaller gap distance, while more rigid cells would not be able to pass through.

In yet another aspect, the present techniques may be used to collect cells while harvesting supernatant. For instance, during large scale protein production processes, cells may be cultivated to express a therapeutic monoclonal antibody or other biologic. The techniques disclosed herein provide a way in which to quickly collect these cells, while collecting supernatant containing the expressed antibody, without a centrifugation or filtration step.

In other aspect, one or more microfluidics chambers may be configured to isolate cells having a range of sizes. For example, by configuring two chambers in a serial orientation, such that the first chamber has a cut off target of 8 μm, and the second chamber has a cutoff target of 10 μm, cells having sizes in between these ranges can be targeted for collection.

Figures 17E, 17F:
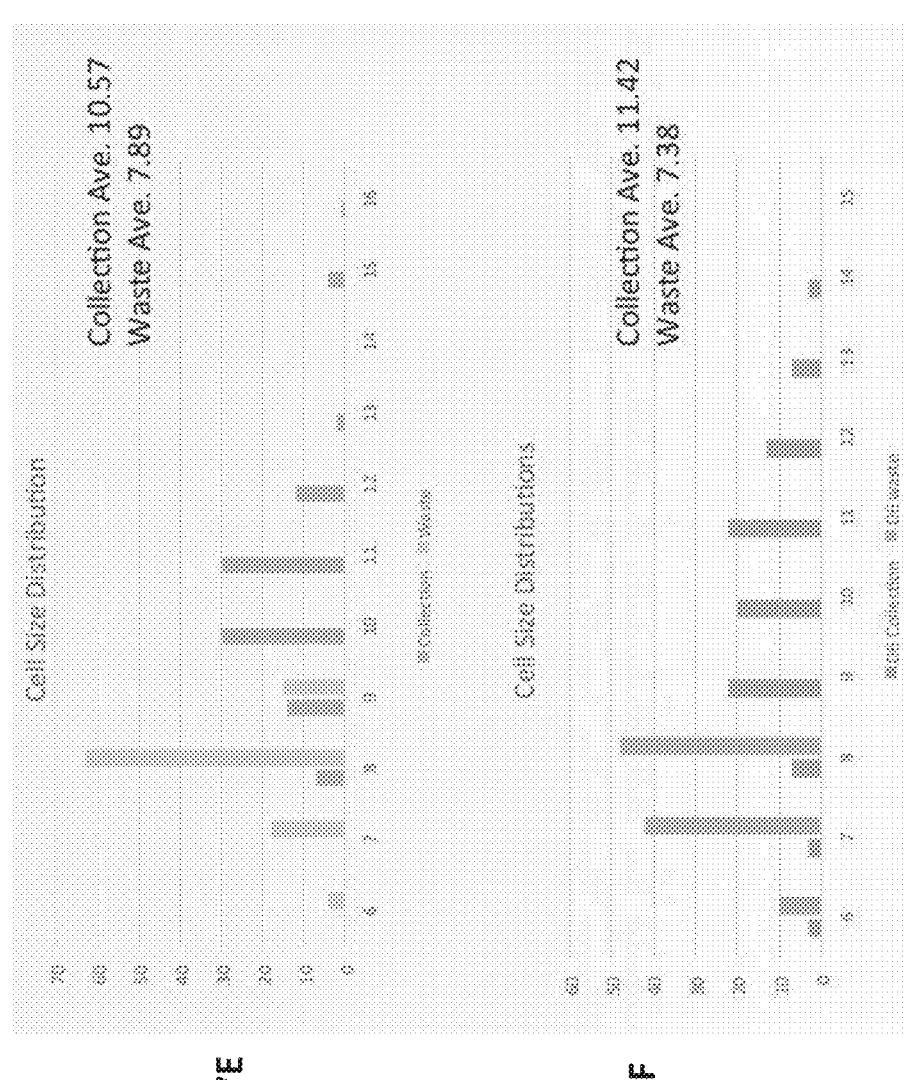

In another aspect, the optimal cutoff size for a particular type of cell can be determined by generating a probability cutoff curve, as shown in FIGS. 17E and 17F. Gaps can be varied to find suitable cutoffs for various cell sizes.

In another aspect, PDMS or any material sufficiently similar to PDMS may be used to construct part or all of the chamber as described herein.

The methods described herein may employ only one of the above steps or any combination of the above steps, in any order, to concentrate and/or separate cells. The methods described herein may recover at least 75%, 80%, 90%, 95%, 98%, or 99% of the desired cells in the sample.

In another aspect, the microfluidics chambers described herein may be used to isolate, perform buffer changes, and/or concentrate cancer cells that are larger than other types of cells within a sample. In other embodiments, the microfluidics chambers described herein may be used to concentrate or perform buffer changes of cancer cells within a population of noncancerous cells of about the same size. The cancer cells may be isolated in a subsequent (secondary) sorting step, e.g., using staining specific to cancer cells, antibodies specific to cancer cells, etc.

It should be apparent to those skilled in the art that many more modifications besides those already described are possible. The systems, methods and devices disclosed herein are not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

EXAMPLES

Example 1. Isolation of Cells

Cells may be obtained from a biopsy, surgical resection, or from a blood draw. Cells may be collected and stored according to standard techniques known in the art.

In some embodiments, fine needle aspiration is performed using a sharp 25-gauge long needle (e.g., from Becton Dickinson). The length of the needle is selected based upon the location of the tumor within the patient. The needle is attached to flexible plastic tubing, which is connected to an aspirating syringe. The tip of the needle is advanced into the tumor, and aspiration is used to collect a sample of tumor cells. The procedure is monitored using imaging, e.g., sonography, or any other suitable technology.

Each sample is placed into a tube or flask with suitable cell culture media for mammalian cells (e.g., 5% fetal bovine serum (FBS); a fungicide and/or bacteriocide/antibiotic). Cells are cultured as a monolayer, e.g., in 6 well plates, grown to confluence, e.g., for 2 weeks or until reaching a suitable cell density. The cultured cells are then collected, optionally undergo a wash, and are centrifuged into a pellet. The cells are resuspended and stored in liquid nitrogen for future use.

In other embodiments, a blood sample may be obtained from a patient and mixed with an isotonic saline solution, according to known techniques in the art.

Example 2. Lithography to Produce Chambers

Unless indicated otherwise, devices were fabricated using standard soft lithography techniques known in the art.

Soft lithography may be used to generate polydimethylsiloxane (PDMS) structures described herein. In general, a mold (master) is produced by photolithography, wherein the mold represents the empty spaces of the microfluidic chamber. In this example, the master is solid for regions in which fluid will flow, and is empty in regions where posts are present. For example, photolithography techniques may be found in, e.g., U.S. Pat. No. 8,372,579.

PDMS is formed by mixing a component containing silicon hydride with another component containing a vinyl group. This mixture is poured into the master mold, and is allowed to cure, e.g., for an hour or two at 70° C. Once solidified, the PDMS structure can be peeled from the master mold (while remaining intact), and the master mold can be used again for making additional PDMS molds.

After removing the PDMS structure from the master, the PDMS structure is sealed to another surface, e.g., glass, silicon, or PDMS, in a reversible or irreversible manner. In some embodiments, adhesive silicon and/or cellophane tape can be used in conjunction with PDMS to create reversible seals, suitable for lower pressures. Higher pressures may necessitate an irreversible seal, formed by exposing PDMS to oxygen plasma. Alternatively, PDMS can be sealed with the aid of polar solvents, wherein a thin film of a polar solvent is placed between PDMS layers and then heated, evaporating the solvent and sealing the layers.

In other embodiments, more complex structures can be created by "sandwiching" or stacking multiple layers of PDMS. In such embodiments, micro-stages are utilized to ensure perfect alignment after oxidation. These techniques are known in the art.

Example 3. Three Dimensional Printing of Chambers

Alternatively, 3D printing techniques can also be used to generate a master mold. This technology prints small amounts of a material (e.g., silicon, etc.), as multiple layers in an additive manner (as represented by a CAD file) to generate a three dimensional structure.

3D printing permits rapid prototyping, and can achieve a resolution suitable for some microfluidic devices. In this example, the master would then be used in the same way as in the previous example to create PDMS chambers.

Alternatively, a CAD file could be utilized to directly print the chamber structure (instead of the inverse structure). The structure could then be coated with PDMS to have desired surface properties. (Waheed, et al., Lab Chip (2016) 16:1993-2013.)

These examples are purely intended to be exemplary and are not intended to be limiting, as numerous different embodiments are understood to fall within the scope of the systems, methods, and devices disclosed herein.

Example 4. Cell Concentration

In one embodiment, a biological sample comprising cells was obtained. The sample was loaded into a syringe, which was connected by tubing to an input mechanism 110 of the microfluidics device (see, e.g., FIGS. 3, 9A-9B). Once the plunger of the syringe was manually depressed, fluid flowed through tubing into the input mechanism, and through the chamber comprising a matrix of posts. The cells were laterally deflected towards a side of the microfluidics chamber, and exited the chamber via the output mechanism 122. The cells, now concentrated, were collected upon exit.

Figure 9A:
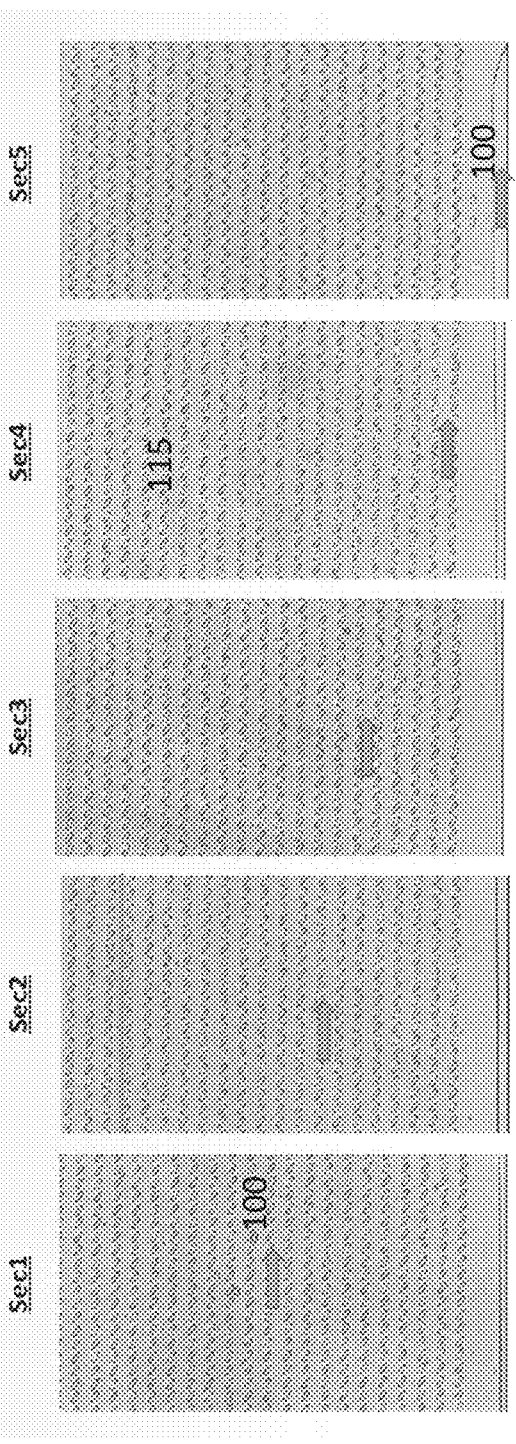
FIGS. 9A-9B show experimental data of example microfluidics chambers concentrating cells, using the devices and methods presented herein.

FIG. 9A shows experimental results of an example microfluidics device for cell concentration. Images of different sections of the chamber 115 were taken, wherein Sec1 shows a portion of a chamber closest to the input mechanism and Sec5 shows a portion of the chamber closest to the output mechanism. The solid arrows show the position of cells 100 flowing through the chamber. As the cells passed through the chamber, the cells were directed laterally, and exited the matrix of posts (Sec 5).

Figure 9B:
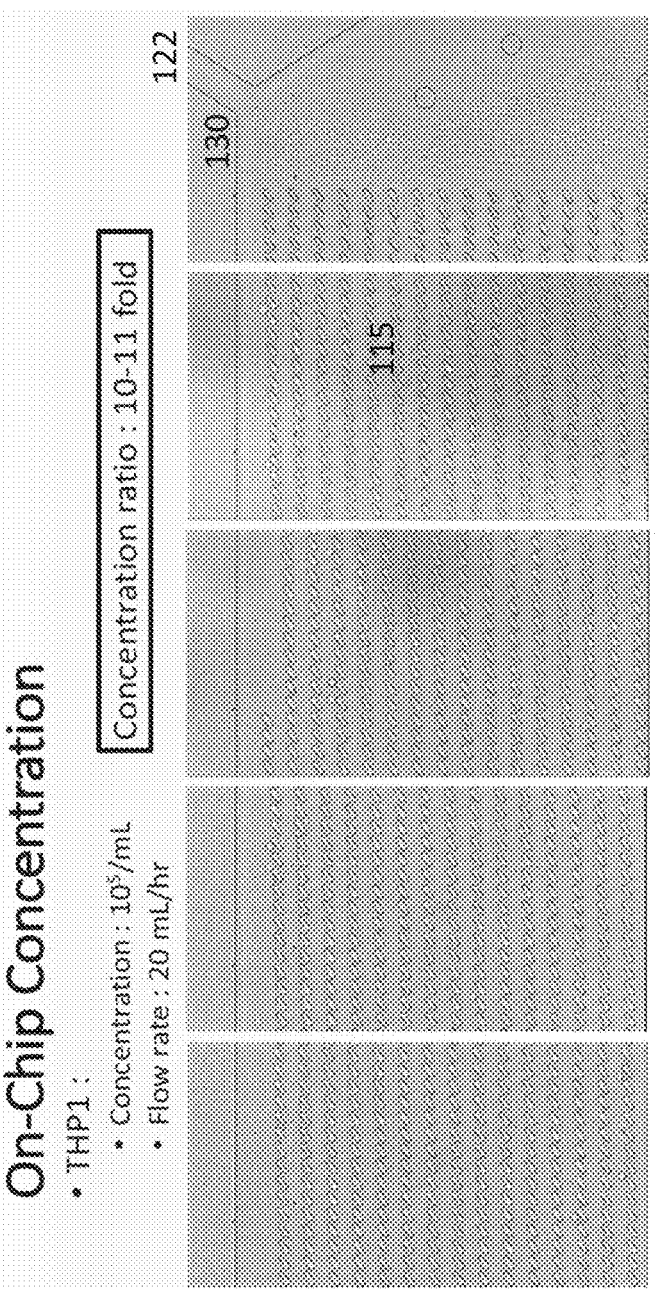

FIG. 9B shows experimental results of an example microfluidics device for cell concentration, wherein the flow rate was 20 mL/hr and the cellular concentration achieved was $10^5$/mL, an improvement of 10-11× over the input concentration. The cells exited the chamber via output mechanism 122.

Example 5. Buffer Change

In another embodiment, a biological sample was obtained. The sample was loaded into a syringe, which was connected by tubing to an input mechanism of the microfluidics device (e.g., an input port in fluid communication with a chamber) (see, e.g., FIGS. 6, 10A-10D). A second solution containing a buffer (different from the solution containing the biological sample) was connected to a second input mechanism, and a manual syringe provided a suitable amount of pressure to flow the second solution through the chamber at a constant rate. A user manually depressed the syringe, and fluid flowed from the syringe into the chamber comprising a matrix of posts. The cells were deflected towards a side of the microfluidics chamber, and exited via the output mechanism 122. The cells, now concentrated and in a new buffer (the second solution), are collected upon exit.

Figure 10C:
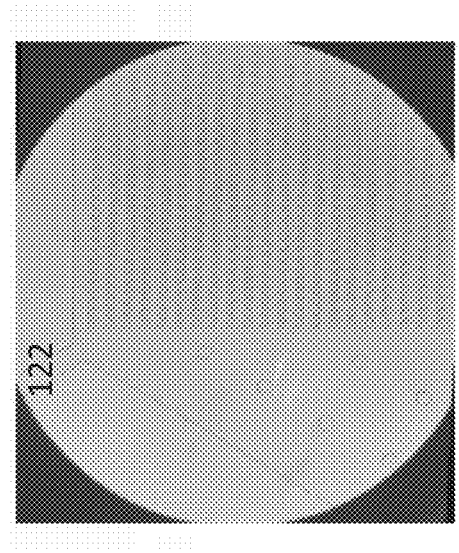
Figure 10B:
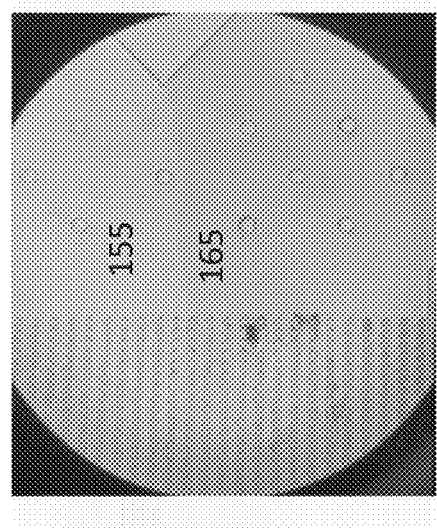

FIGS. 10A-10D show experimental results of an example microfluidics device for cell concentration, including a buffer change. FIG. 10A shows two input mechanisms (in this case, connected to tubing) into a microfluidics device having a chamber with two output mechanisms (also connected to tubing). FIG. 10B shows that Allura Red AC food dye entered the chamber, wherein the portion of the chamber 155 retained the solution from input mechanism 110, and the portion of the chamber 165 retained the solution from input mechanism 112. FIG. 10C shows an output mechanism 122. FIG. 10D shows experimental results of an example microfluidics device for cell concentration, wherein the flow rate was 20 mL/hr and the concentration achieved was $10^5$/mL, an improvement of 5-6× over the input concentration. In this example, a complete buffer (medium) change occurred rapidly, and without utilizing time consuming processes such as ion diffusion. In this example, $Q_{sheath}$ is 0.01 ml/hr~100 ml/hr while $Q_{sample}$ is 0.01 ml/hr~100 ml/hr.

In general, the input mechanism can be driven by a syringe pump or by manual depression of a syringe. In some aspects, for multiple inputs, one or more syringe pumps can be used to drive each input. In other aspects, for multiple inputs, manual depression of one or more syringes can be used to drive each input.

Example 6. Binding Molecule

In still another embodiment, a biological sample (e.g., a blood sample) is obtained from a patient. The sample is diluted with sodium chloride isotonic saline and loaded into a syringe, which is connected by tubing to an input mechanism of the microfluidics device (e.g., an input port in fluid communication with a chamber) (see, FIG. 5). A user manually depresses the syringe, and fluid flows from the syringe into the chamber comprising a matrix of posts. A second solution containing a binding molecule (a molecule which binds to a particular type of marker on a cell) is connected to a second input mechanism, and another syringe provides a suitable amount of pressure to flow the solution comprising the binding molecule through the chamber at a constant rate. The cells mix with the binding molecule in the chamber, and labeled cells are deflected towards a side of the microfluidics chamber. A third solution containing a different buffer (165) than the solution comprising cells and the solution containing binding molecules is connected to a third input mechanism. The cells (both labeled and unlabeled) are deflected towards a side of the fluidics chamber and exit via the output mechanism (122). The cells, now concentrated and labeled (and in the third solution), are collected upon exit. In other embodiments, the third input is optional, and the process may be limited to labeling and concentrating cells.

In general, the input mechanism can be driven by a syringe pump or by manual depression of a syringe. In some aspects, for multiple inputs, one or more syringe pumps can be used to drive each input. In other aspects, for multiple inputs, manual depression of one or more syringes can be used to drive each input.

Example 7. Concentrator and Buffer Switch

In another embodiment, a biological sample (e.g., a blood sample) is obtained from a patient. The sample is diluted with sodium chloride isotonic saline and loaded into a syringe, which is connected by tubing to an input mechanism of the microfluidics device (e.g., an input port in fluid communication with a chamber) (FIG. 6). Once the syringe is manually depressed, fluid flows from the syringe through the input port, and then into the chamber 105(1) comprising a matrix of posts. The cells are deflected towards the side of the microfluidics chamber, and exit via the output mechanism (122(1)). The cells, now concentrated, flow into a second chamber, wherein the second chamber also has as an input, a second solution containing a buffer (different from the first solution containing the blood sample) flowing into a second chamber 105(2) via a second input mechanism 110(2). A pump provides a suitable amount of pressure to flow the second solution through the chamber at a constant rate. A user manually depresses the syringe, and fluid flows from the syringe through the first chamber, into the second chamber comprising a matrix of posts. The cells are deflected towards the side of the microfluidics chamber, and exit via the output mechanism (122(2)). The cells, now concentrated and in a new buffer (the second solution), are collected upon exit.

Example 8. All in One

In another embodiment, a biological sample (e.g., a blood sample) is obtained from a patient. The sample is diluted with sodium chloride isotonic saline and loaded into a syringe, which is connected by tubing to an input mechanism of the microfluidics device (e.g., an input port in fluid communication with a chamber) (FIG. 7). This example shows yet another example configuration in which the system performs a buffer change, cell concentration, laser killing of tagged cells, and dielectrophoresis to obtain only living cells. In this example, a first solution comprising cells 100 enters a first chamber 105(1) at a first input mechanism 110. Cells are illustrated as circles. Some of the cells are tagged with a marker, e.g., a binding molecule that selectively binds to the surface of a particular type of cell. The cells pass through chamber 105(1), which comprises a matrix of posts 115, shown here as rectangular structures distributed along lines having slope. As the cells pass between the diagonally oriented rows of posts in the chamber, the cells are deflected laterally, from the first buffer 155 into the second buffer 165 flowing from input mechanism 112. Similar to FIG. 1B, the chamber has a floor (160) (not shown) and an optional ceiling (150), which may be of the same material as the posts 115 or a different material. The tagged cells (now enriched) exit the chamber through output mechanism 122, which flows into chamber 105(2).

Once in the second chamber 105(2), the cells are concentrated by the matrix of posts 115 as described herein. Upon exiting chamber 105(2), the cells are directed towards a region that comes into contact with laser 200, where cells bound to the marker are killed upon illumination by the laser (e.g., by 6 mJ, 45 Hz, 6 ml/hr). Any suitable tag that is activated by a laser (e.g., a tag activated into a form capable of killing a cell, such as heat generation, energy dissipation, cleavage into a toxic form, etc.) can be used to kill cells to which the tag is bound. In one embodiment, gold (Au) nanorods, nanocages, or other nanoparticles are adsorbed onto IgG antibodies that are specific to a type of cell in the solution. Once the cells are illuminated by the laser, the Au particles heat up, and kill the cells to which the gold labeled antibodies are attached. The dead cells are separated from living cells, by utilizing dielectrophoresis (see, Pohl H. A. et al., Science (1966), 152(3722): 647). Dead cells exit at output mechanism (126), and the live cells exit at output mechanism (128).

Example 9. Sorting Cells Based on Size

For the following examples and figures involving cell sorting by FACS, bounding boxes (e.g., black polygons) may be determined empirically.

FIGS. 11A-11D show images and experimental results of cell sorting and separation based on size according to embodiments presented herein.

Figures 11A, 11B:
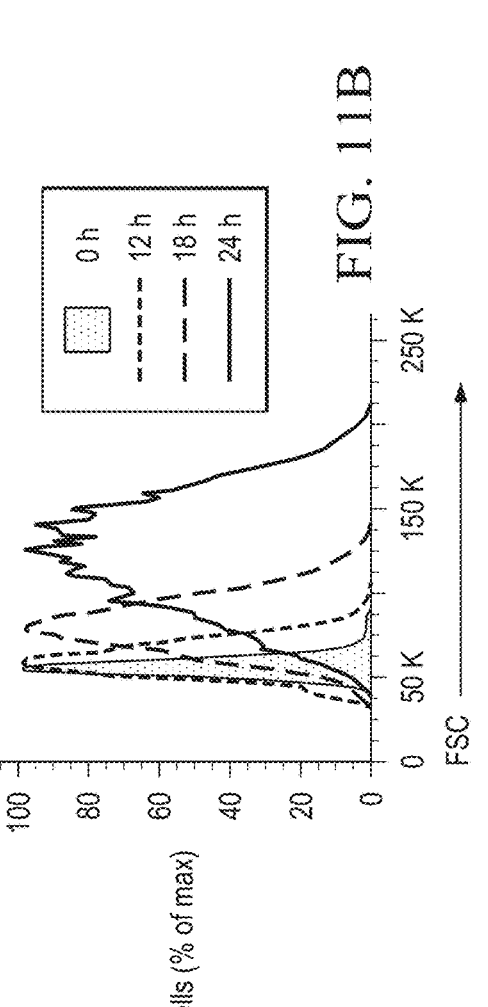
FIGS. 11A-11D show aspects of activating T cells and determining the characteristics of activated T cells, using the devices and methods presented herein.

According to aspects presented herein, the microfluidics device can also be used for cell sorting, e.g., to enrich T-cells that have been activated from binding to a specific antigen or from addition of a substance that causes activation of the T cells. FIGS. 11A and 11B show that T cells increase in size when activated, and that the increase in size occurs about 24 hours after activation (see, Guo et al., Nature Communication (2016) 7:10307).

Figure 11C:
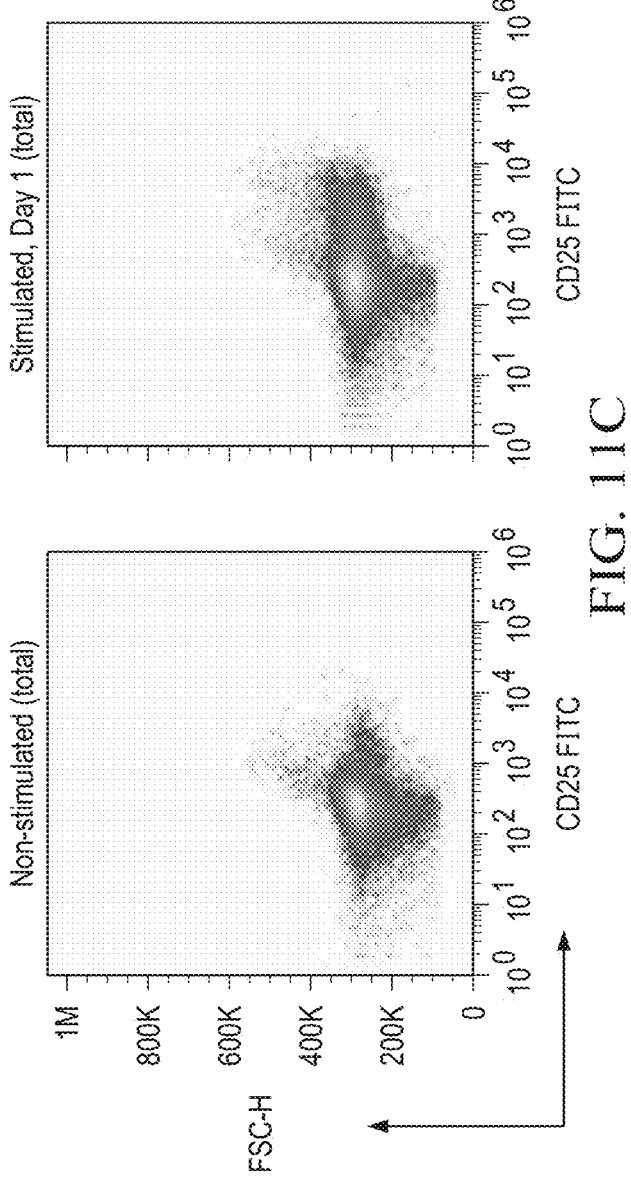
Figure 11D:
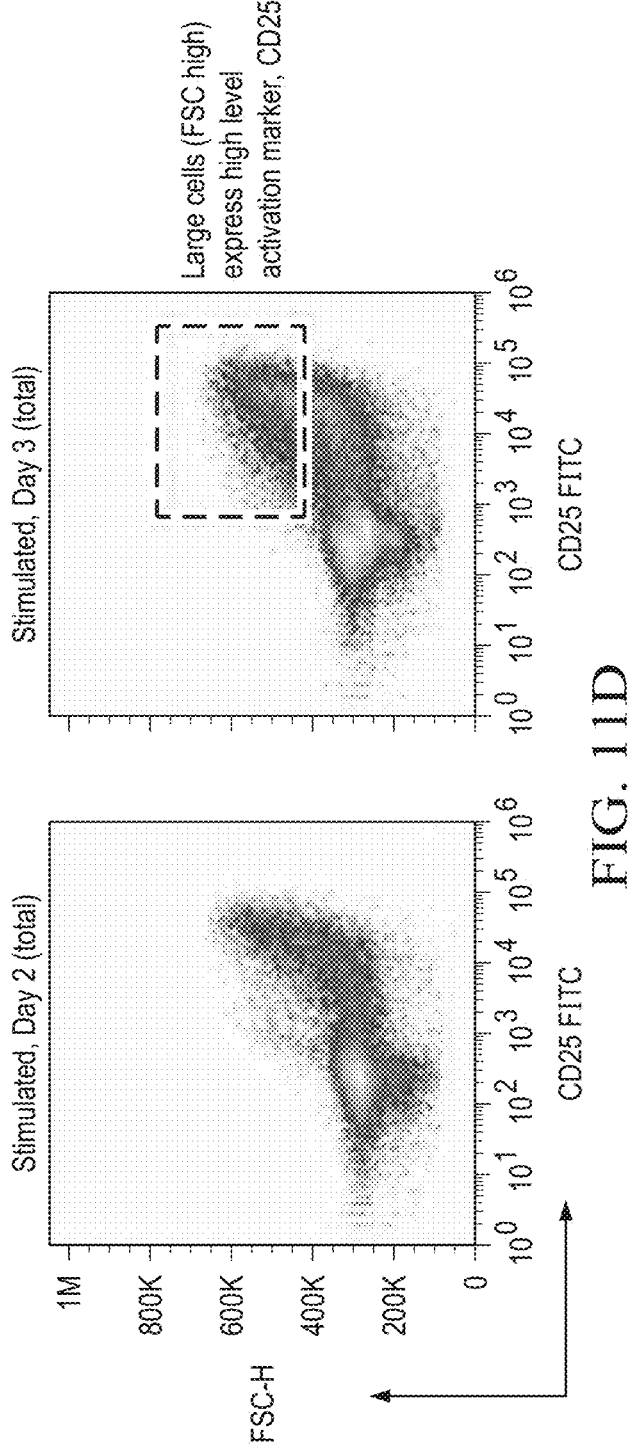

In present studies, as shown in FIGS. 11C and 11D, cell activation was quantified based on cell size, as measured by forward scatter (FSC) and as a function of CD25 expression. Cells that were not stimulated, resided in the lower left quadrant, and had a smaller size with reduced CD25 expression. In this study, it was shown that as early as two days after stimulation and continuing through three days after stimulation, a population of cells having a larger size and increased expression of the activation marker CD25 was observed.

Figures 12A, 12B:
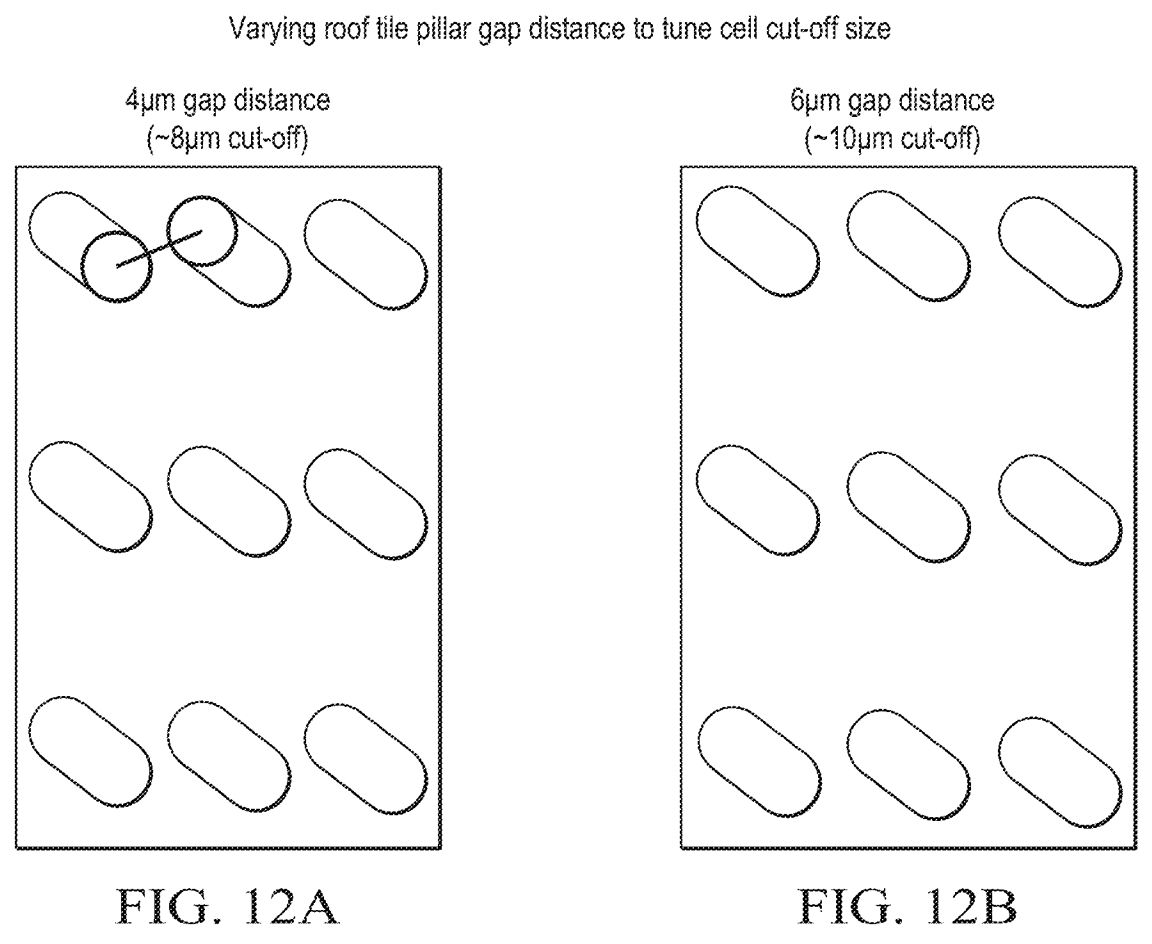
Figures 12C, 12D:
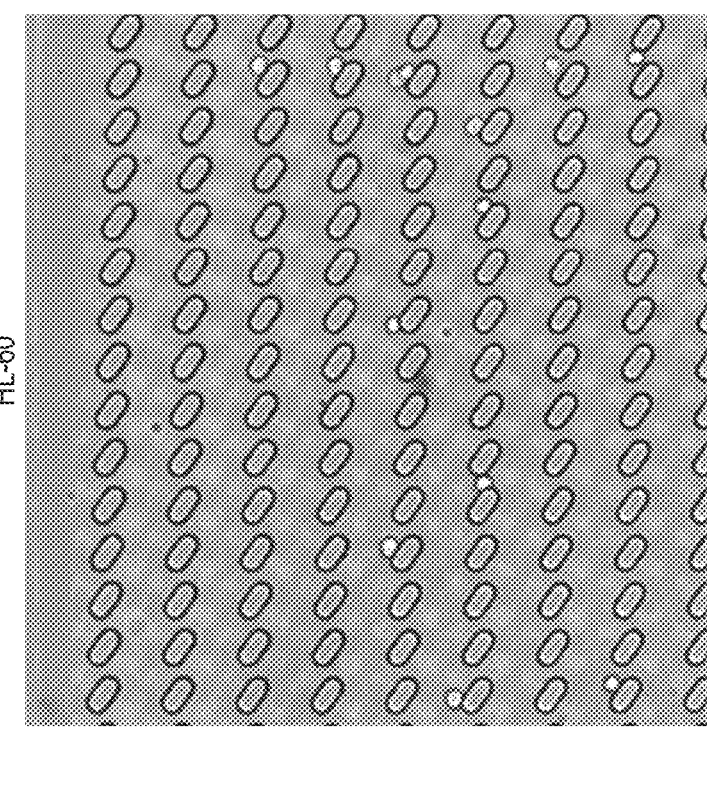

FIGS. 12A-12D show various configurations for the cell sorting device. With reference to FIG. 12A, each post has an associated tilting angle or rotation (see also FIG. 2C) and shape. To determine the gap distance, circles may be drawn in the lower portion of a first post and an upper portion of an adjacent post, and a line connecting the centers of each circle may be formed between the two adjacent posts. As shown in FIG. 12A, the gap distance is the smallest distance between the two adjacent posts along this line, in this case, which is about 4 μm. FIGS. 12B and 12C show gap distances of 6 μm and 9 μm, with FIG. 12D showing an experimental image of HL-60 cells that underwent size separation in the microfluidics chambers as described herein. HL-60 cells, a cancer cell line, range in size from about 10 to 15 μm, and cell separation was performed using a 9 μm gap distance. In this case, cells having a diameter of about 11 μm were collected, while smaller cells flowed through the chamber into a waste receptacle. Thus, a variety of factors impact cell separation, including gap distance and tilting/rotation angle of the posts of the microfluidics device.

In some aspects, gap distances can be selected based upon the size and the viscoelastic nature of the cell. In general, cells are deformable, and can deform about 2-3 μm on each side. Thus, to select for an 8 μm cell, which deforms about 2 μm on each side, a 4 μm gap distance may be used. This same trend may hold for cells of larger sizes, e.g., a 6 μm cut off for a 10 μm cell, and a 9 μm cutoff for a 13 μm cell. In some instances, larger cells can deform through smaller gaps, and in this case, the flow rate can be adjusted upwards to reduce this occurrence.

In some aspects, the posts may be coated with reagents that cause the cells to bind to the posts, e.g., antibodies, antigens, etc. In this example, the antigen or antibody inhibits cell movement through the chamber, and the cells can be separated based on size and speed of migration through the chamber.

Example 10. Stimulating and Sorting T Cells with CD3 and CD28 mAbs

For the following examples and figures involving cell sorting by FACS, bounding boxes (e.g., black polygons shown in FIG. 13A, etc.) may be determined empirically.

Figure 13A:
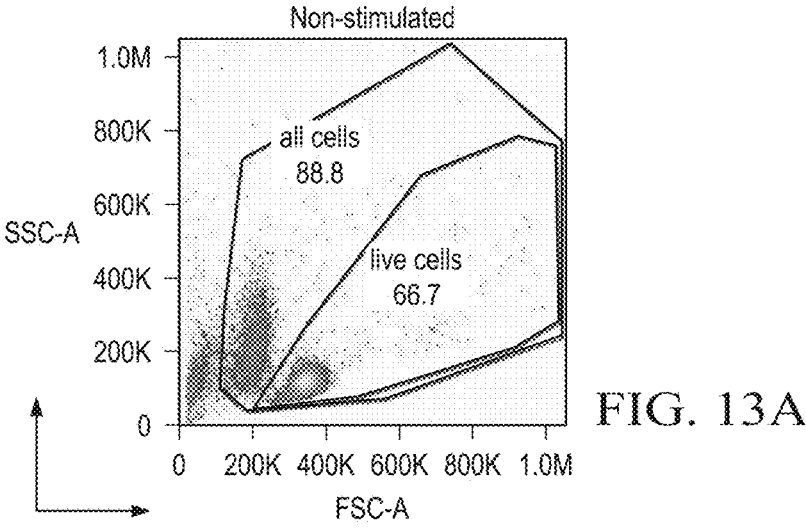
FIGS. 13A-13F show experimental results of characterizing activated versus non-activated T cells, using the devices and methods presented herein.
Figure 13B:
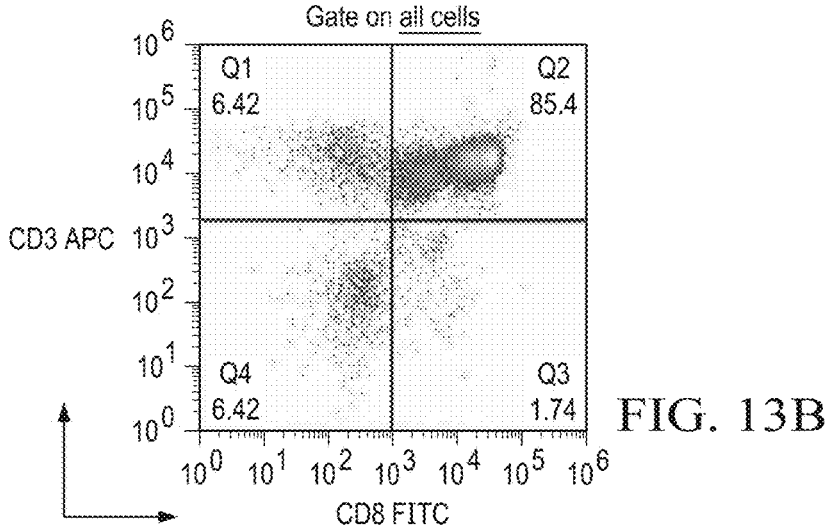
Figure 13C:
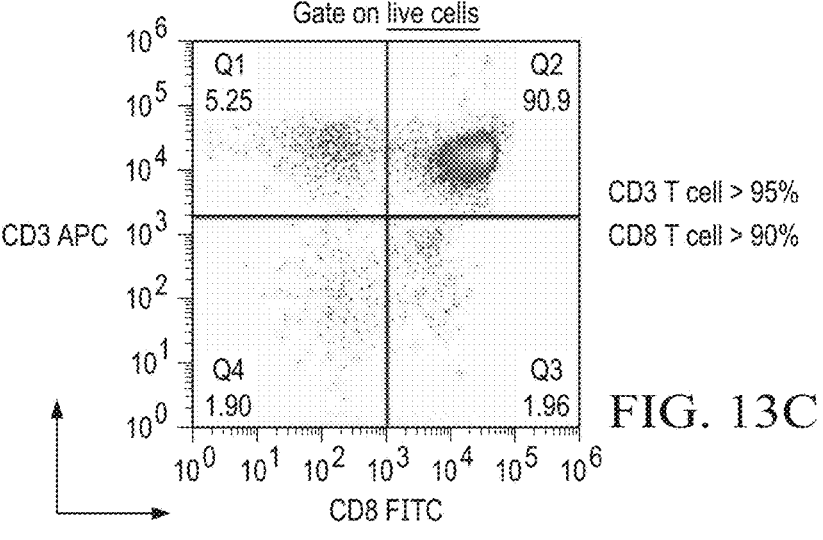
Figure 13D:
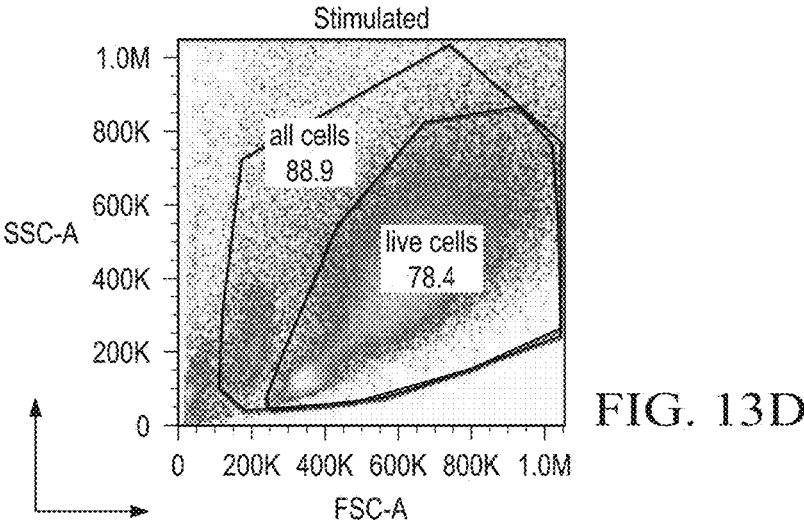
Figure 13E:
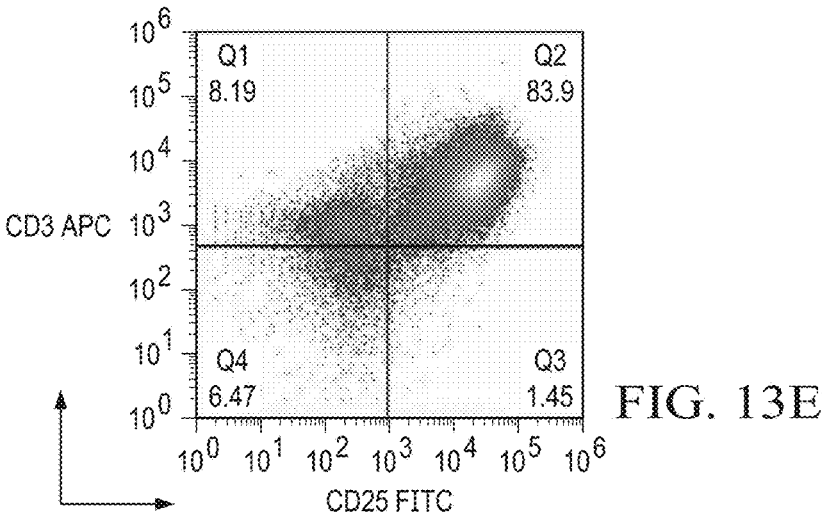
Figure 13F:
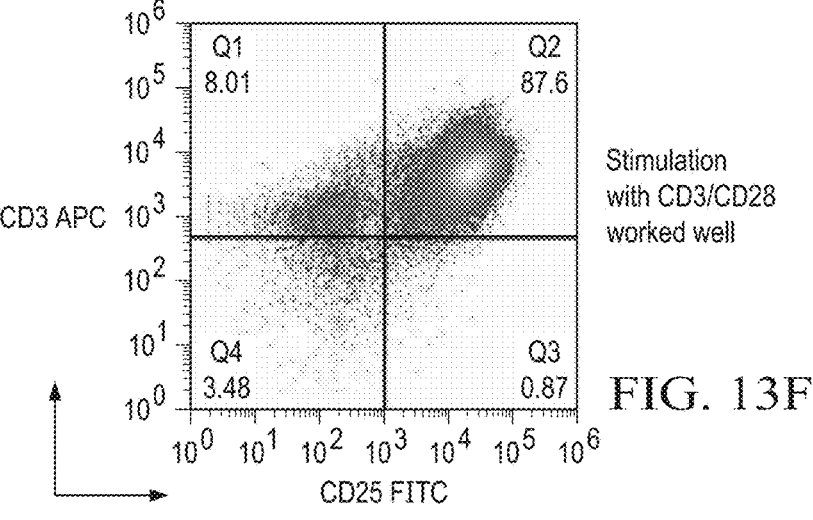

Referring to FIGS. 13A-13F, cells from a PBMC mixture were stimulated using a CD3 antibody and a CD28 antibody combination. This technique may be used to broadly stimulate T cells, and is not antigen-specific. FIGS. 13A and 13D show side scatter (SSC-A) versus forward scatter (FSC-A) of non-stimulated and stimulated cells. The stimulated cells were shown to increase in size. FIGS. 13B-13F show for cells of reasonably high purity (90% CD8 T cells and 95% CD3 T cells) stimulation with the CD3 antibody and the CD28 antibody was successful in stimulating large numbers of cells, which appeared in the upper left quadrant, reflecting increased size and expression of activation markers.

FIG. 14 shows a table of cell sorting results based on varying gap widths (4 μm, 9 μm and 6 μm), cell types (CD4 and CD8), stimulation times, and one or two rounds of sorting. For two rounds of sorting, the output of the first round was fed back into the cell chamber to undergo a second round of sorting.

In this example, a solution comprising CD25+ cells (activated T cells) was fed into the chamber after being spiked with between 1 and 10% CD25+ activated T cells. The largest gap, the 9 μm gap, provided the highest enrichment percentage after sorting. For the 9 μm gap, the results showed about 90% after 1 round of sorting and 94% after 2 rounds of sorting. The enrichment factor was determined by quantifying the % of cells expressing the activation marker CD25+ divided by initial mix of CD25+.

Figures 15D, 15E, 15F:
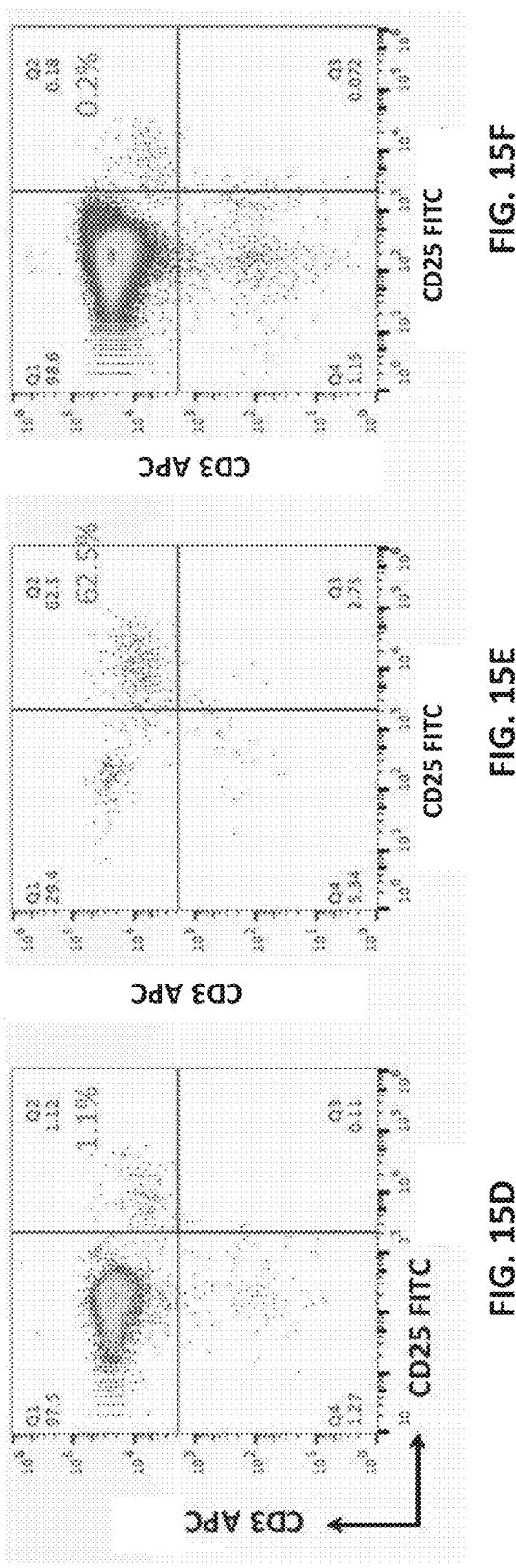
Figure 15G:
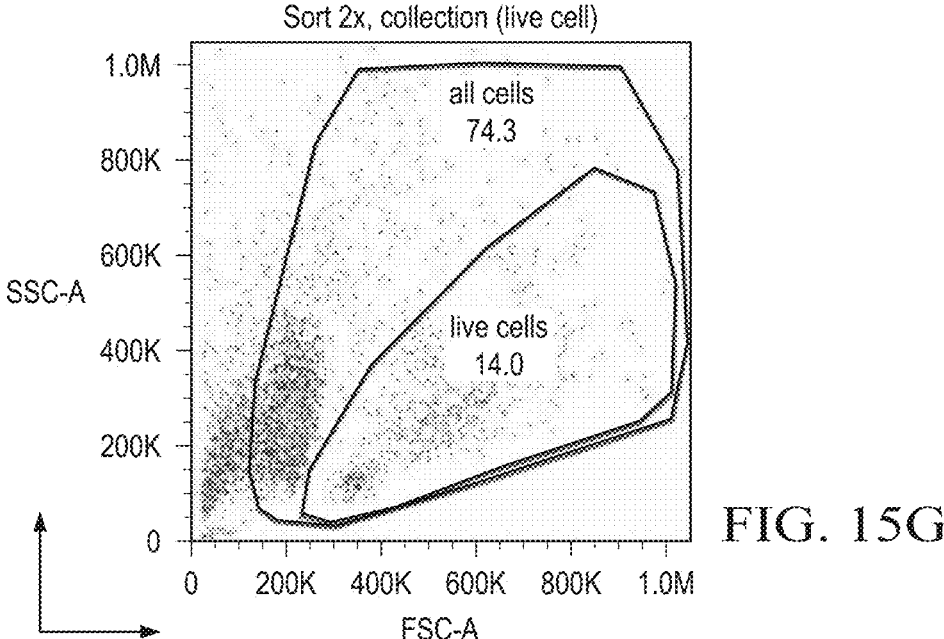
Figure 15H:
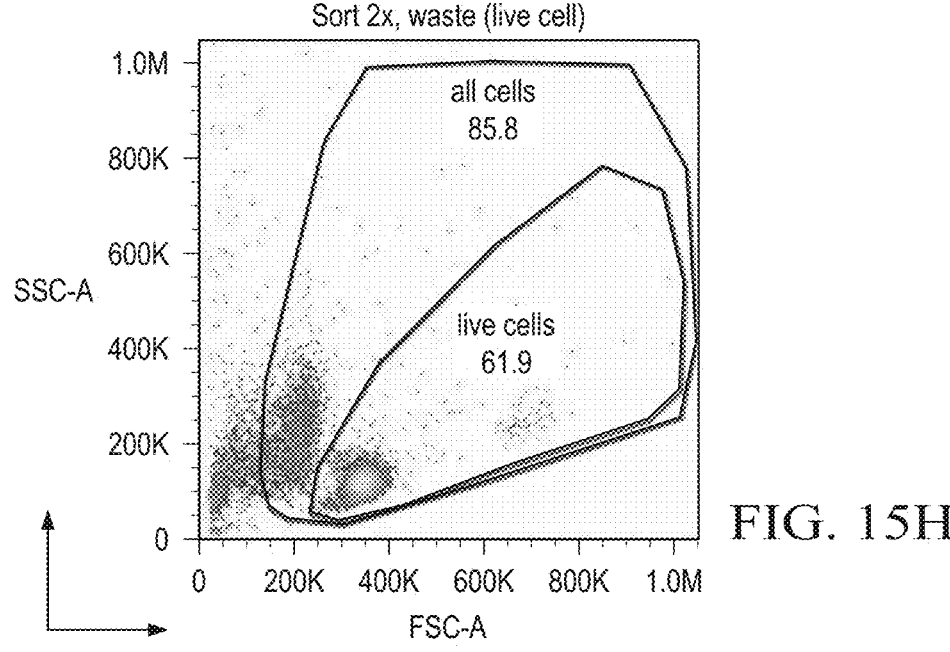
Figure 15I:
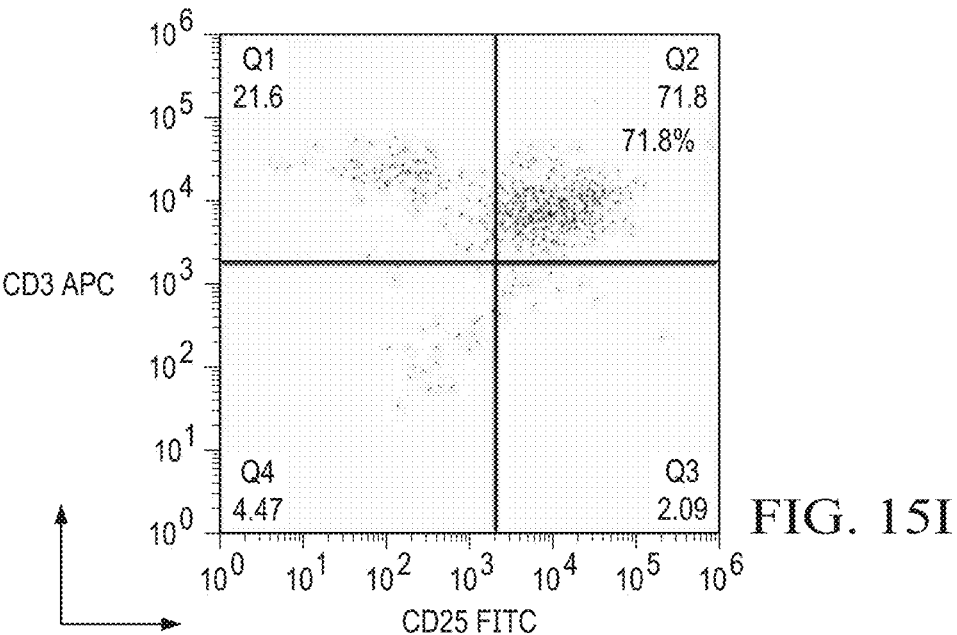
Figure 15J:
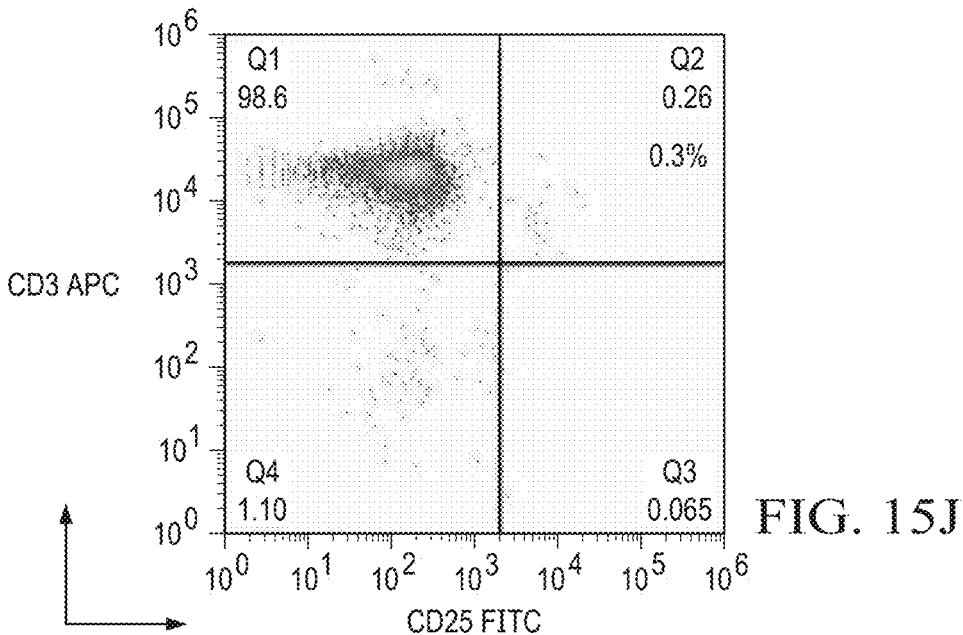

Referring to FIGS. 15A-15J, enrichment of cells using a 9 μm gap is shown. For a 1.1% spike (FIG. 15D) during the first round of enrichment, 62.5% of cells expressed activation marker CD25 (FIG. 15E), while only 0.2% of waste cells expressed CD25 (FIG. 15F). During the second round of enrichment, 71.8% of cells expressed activation marker CD25 (FIG. 15I), while only 0.3% of waste cells expressed CD25 (FIG. 15J).

Figure 16A:
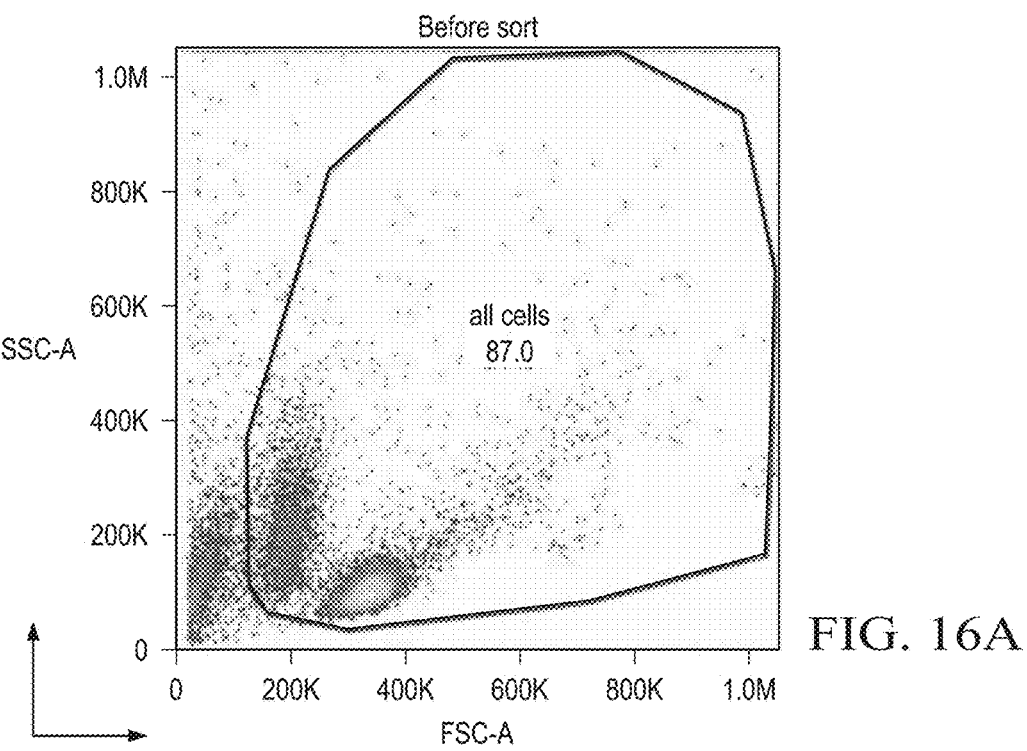
FIGS. 16A-16C show experimental results of sorting activated T cells by varying the distance between the posts, using the devices and methods presented herein.
Figure 16B:
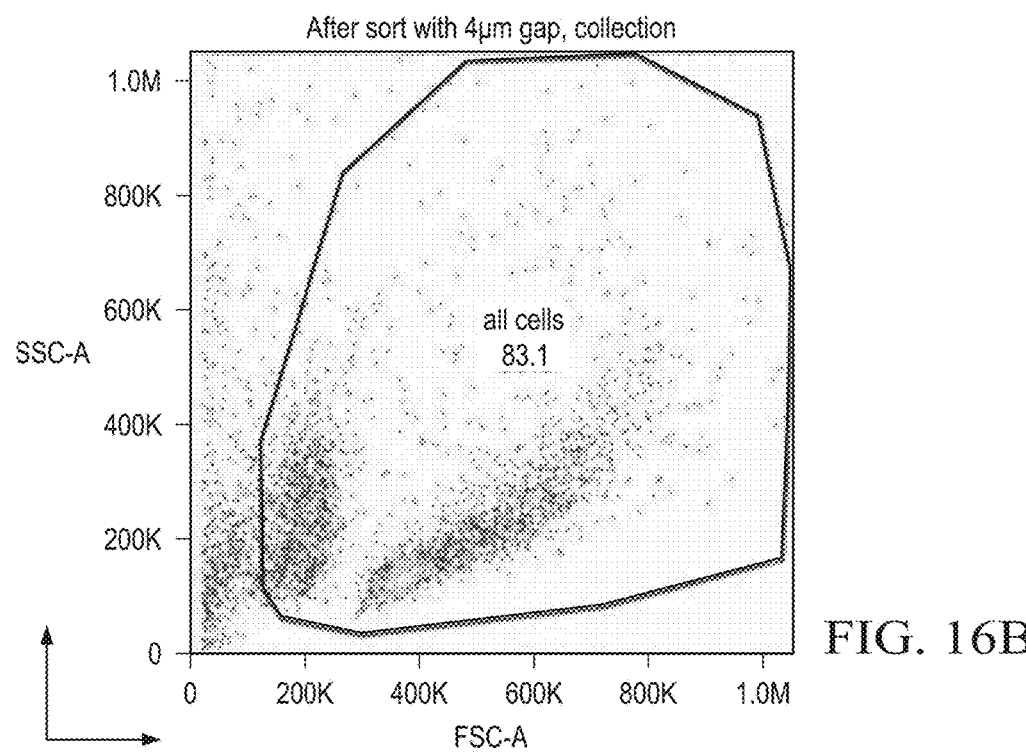
Figure 16C:
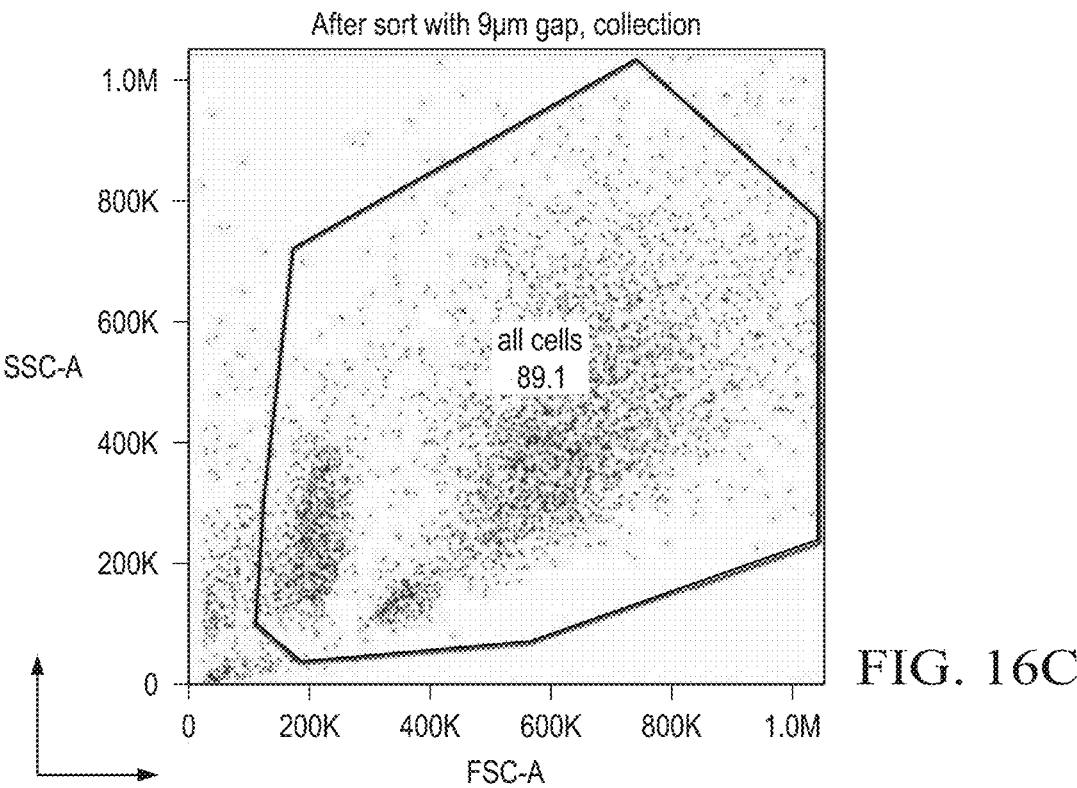

FIGS. 16A-16C show a scattering plot of cells passing through posts (also referred to as pillars) of different gaps. Sorting with a 4 μm gap, produced a cell population mostly in the left lower quadrant, indicating a smaller size. Sorting with a 9 μm gap, produced a cell population more dispersed throughout multiple quadrants.

Referring to FIG. 17A-F, pictures of the cells were taken after sorting, and the diameter of the cells was measured. FIGS. 17A and 17B show images of collection cells and waste cells from a sorting performed with a 4 μm gap. A corresponding histogram is shown in FIG. 17E, showing cell size distributions of collection and waste cells. FIGS. 17C and 17D show images of collection cells and waste cells from a sorting performed with a 9 μm gap. A corresponding histogram is shown in FIG. 17F, showing cell size distributions of collection and waste cells.

Example 11. Stimulating and Sorting T Cells with Antigens

In this series of examples, T cells were stimulated in an antigen-specific manner prior to cell sorting. OKT3, which broadly stimulates T cells, was used as a positive control. Antigen-specific stimulation was performed using pp65. In some embodiments, a pp65 peptide pool, e.g., comprising a plurality of overlapping peptides spanning the full length pp65 protein sequence, was used to stimulate T cells. In other embodiments, a specific antigen corresponding to residues 495-503 of the pp65 protein, pp65$_{495\text{-}503}$, was used to stimulate T cells.

In general, the pp65 peptide pool resulted in a higher frequency of stimulated T cells as compared to the pp65$_{495\text{-}503}$ antigen, as the pp65 peptide pool comprises a plurality of different types of antigens capable of stimulating a range of T cells. In contrast, a single type of antigen, pp65$_{495\text{-}503}$, stimulates T cells specific to this antigen, leading to a lower frequency of simulated T cells.

PBMC cells, a mixture of T cells, B cells, and monocytes, were obtained from a donor reactive to the pp65 antigen. In particular, PBMC cells, e.g., from a HLA-A2, CMV-seropositive donor LP381 (a normal response), were thawed. Cells were divided into aliquots containing about 8×10$^6$ cells. The aliquots were cultured under various conditions including: (1) in the presence of media only (no stimulation); (2) in the presence of OKT3 (stimulation); (3) in the presence of pp65 peptide pool (stimulation); and (4) in the presence of pp65$_{495\text{-}503}$ (stimulation). On the third day after stimulation, cells from each condition were sorted based on size using a 9 μm gap distance and a Q$_{total}$=10 ml/hr and a sample:sheath ratio of about 1:1. On the fourth day after stimulation, the third and fourth conditions were sorted based on size using a 9 μm gap distance and a Q$_{total}$=10 ml/hr with a sample:sheath ratio of 1:1 or Q$_{total}$=20 ml/hr with a sample:sheath ratio of 4:1. After sorting, the samples were analyzed by flow cytometry (FACS) to record cell counts including FSC, SSC, CD3, CD25, and CMV dextramer (pp65$_{495\text{-}503}$) for the following three time points: before sorting, after sorting (collection), and after sorting (waste).

FIG. 18 is a table summarizing collection of CD25+ T cells under the above conditions.

Monocytes and activated T cells (CD3+CD25+ cells) were frequently isolated together, as monocytes are typically larger than lymphocytes (B cells and T cells). When activated T cells (based on CD25+) were gated (sorted) on all live cells, the percentage of collected activated T cells (purity) was lower due to the presence of monocytes. When activated T cells were gated on CD3+ cells, the percentage of collected activated T cells (purity) was higher, in some cases reaching greater than 90% for peptide pool stimulation.

The percentage of CD25+ activated T cells among live cells (composed of all live PBMC cells including T cells (majority), B cells, monocytes, CD3– lymphocytes, etc.) was calculated. The percentage of CD25+ cells among T cells composed of CD3+ cells (e.g., CD3+CD25– and CD3+CD25+ cells) was also calculated. The percentage of CD25+ cells when gated only on CD3+ T cells was higher (as other cell types were excluded) as compared to gating on live cells.

Figures 24A, 24B:
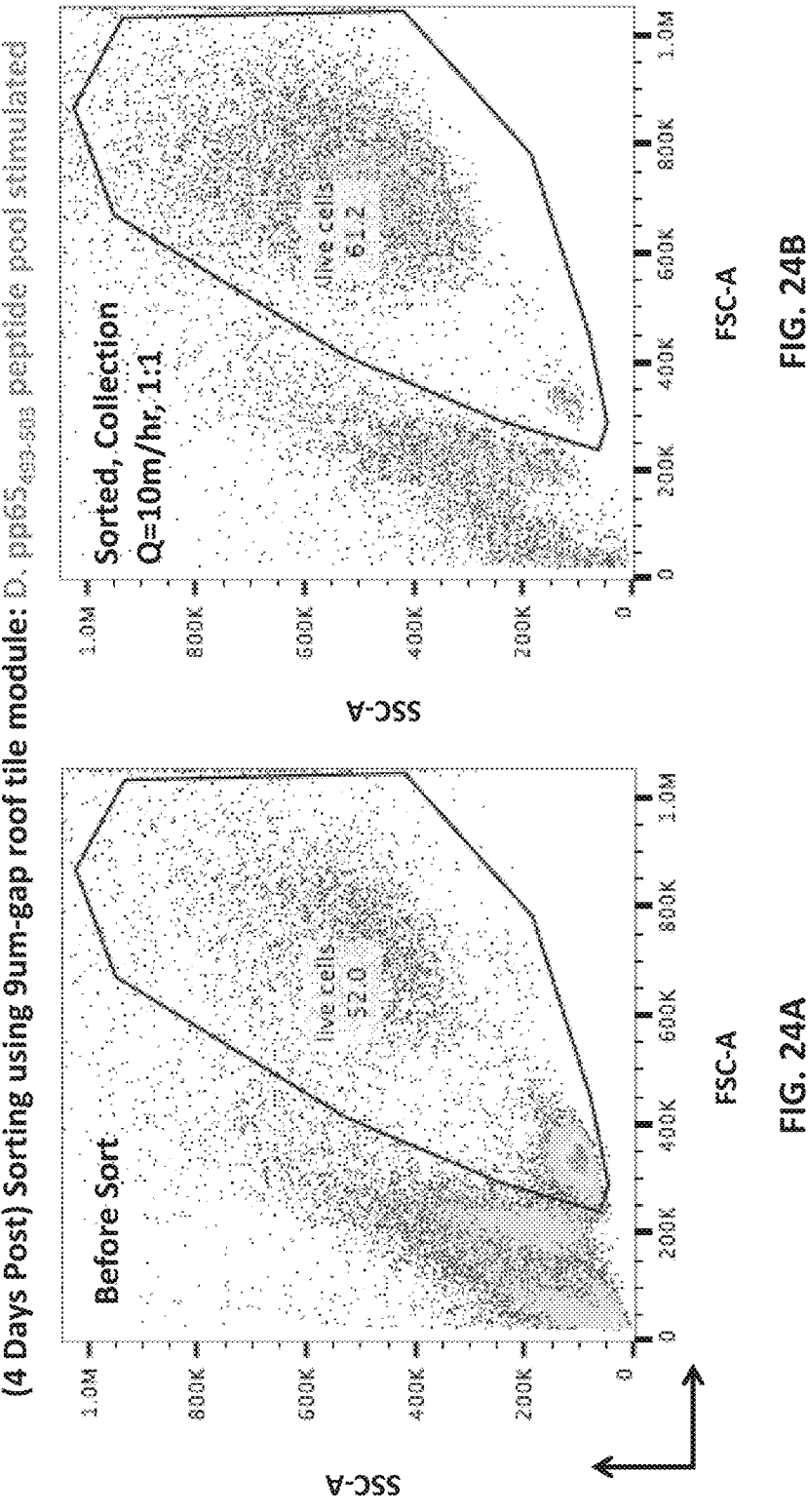
FIGS. 24A-24F show experimental results of sorting antigen stimulated (pp65$_{495-503}$) T cells, using the devices and methods presented herein.
Figures 24C, 24D:
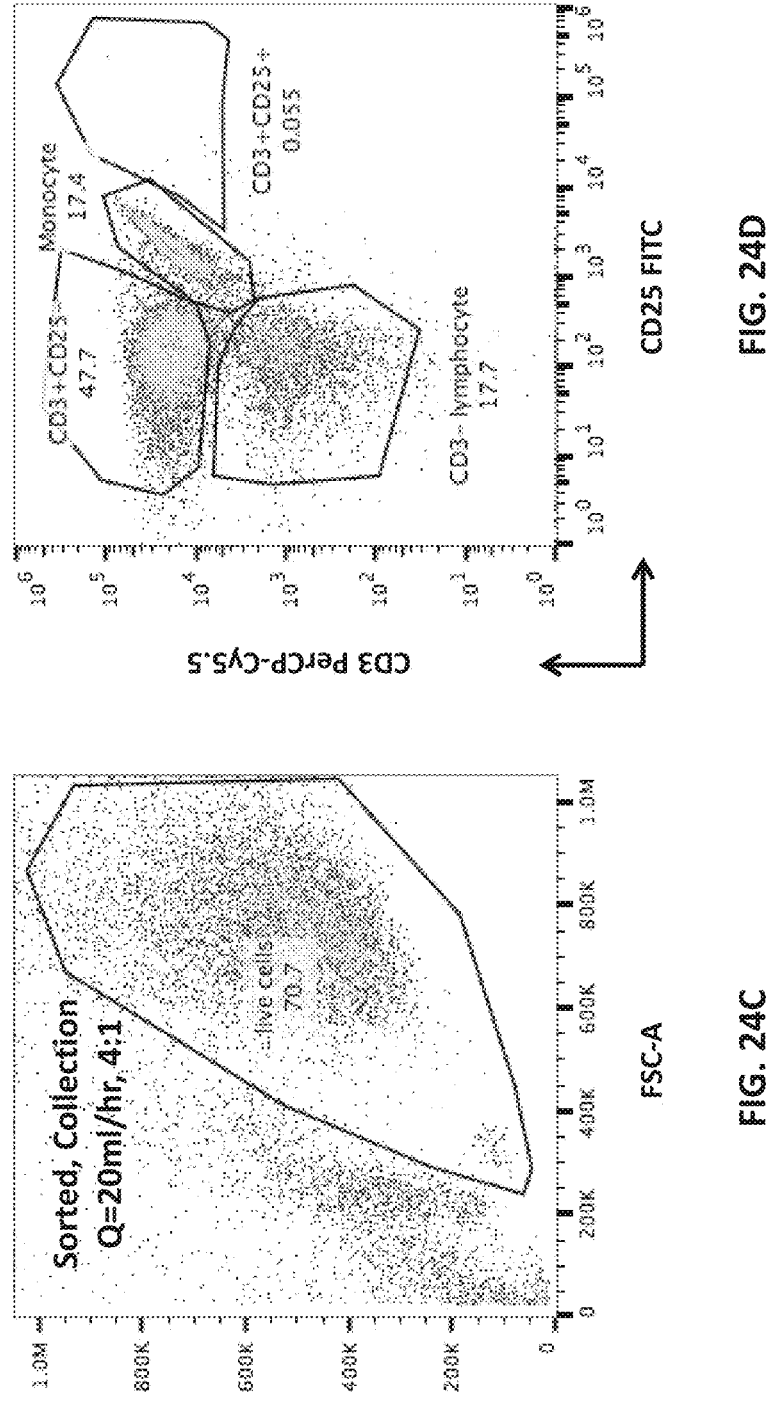
Figure 24F:
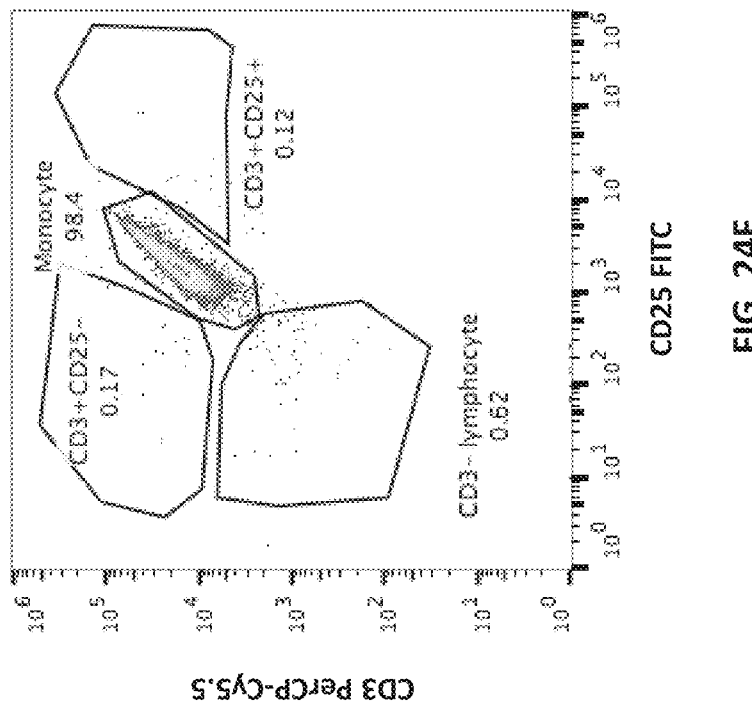
Figure 24E:
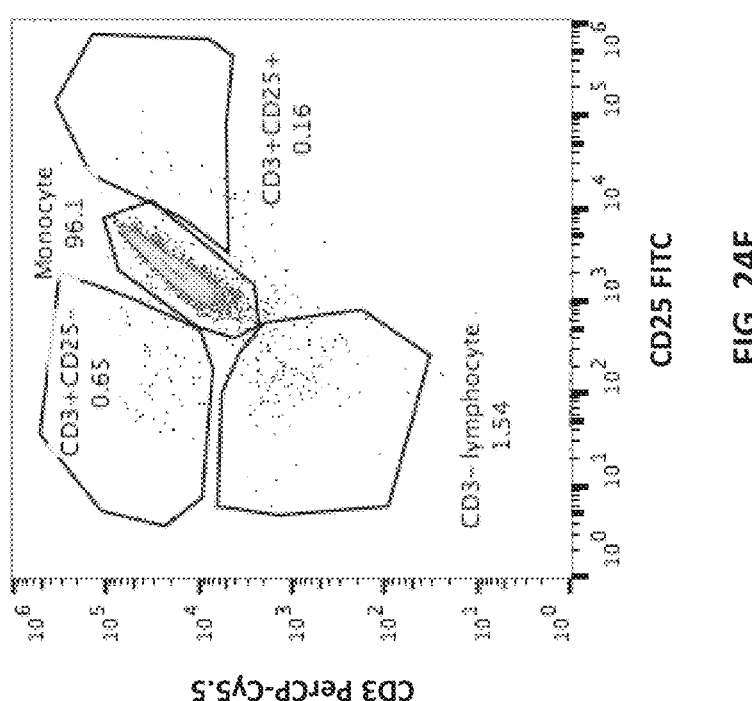

The enrichment factor is the fold increase in CD25+ percentage (%) after sorting, and was calculated by dividing the percentage of collected CD25+ cells by unsorted cells. For example, and with reference to FIG. 24D, the CD25+ percentage before sorting was 0.055/(0.055+47.4)=0.1%. After sorting, the CD25+ percentage was 0.16/(0.16+0.65)=19.7%.

FIGS. 19A-24F show the results of various cell sorting assays along with controls. In some aspects, cells may be stained to detect CD25+ and CD3+, prior to FACs sorting. In some embodiments, activated T cells (CD3+CD25+) may comprise about 1% (or less) of the total PMBC cell population undergoing sorting.

The cell sorting assays provided herein may be combined with one or more other assays to isolate cells of interest, e.g., using staining, antibodies, etc. After sorting, the antigen stimulated T cells (CD25$^+$CD3$^+$) were shown to be enriched as compared to their non-sorted counterparts.

Monocytes, which are about the same size as activated T cells, may also appear in the collected fraction, while smaller cells, e.g., CD3$^+$CD25$^-$ cells and CD3$^-$ lymphocytes are typically excluded.

Figures 19A, 19B:
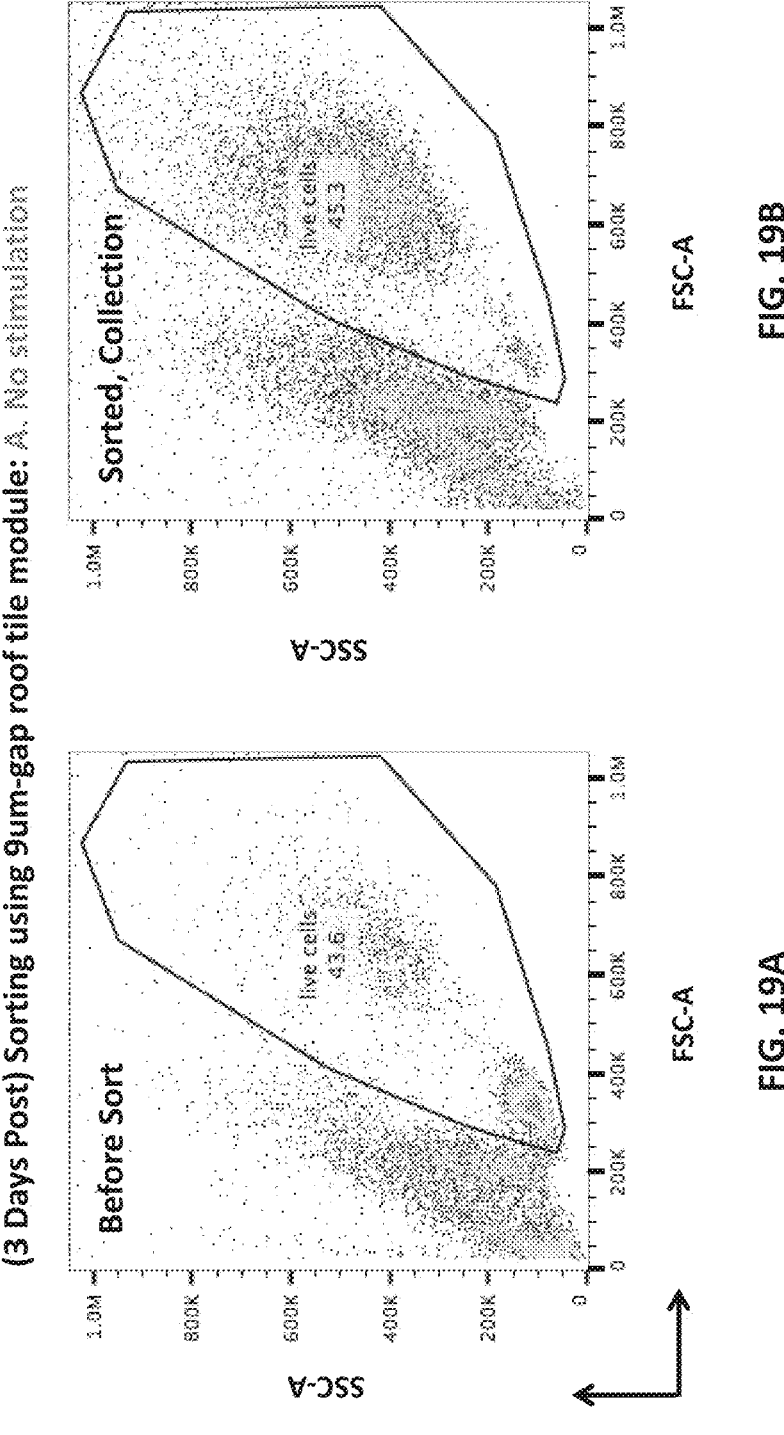
FIGS. 19A-19F show experimental results of sorting unstimulated T cells, using the devices and methods presented herein.
Figures 19C, 19D:
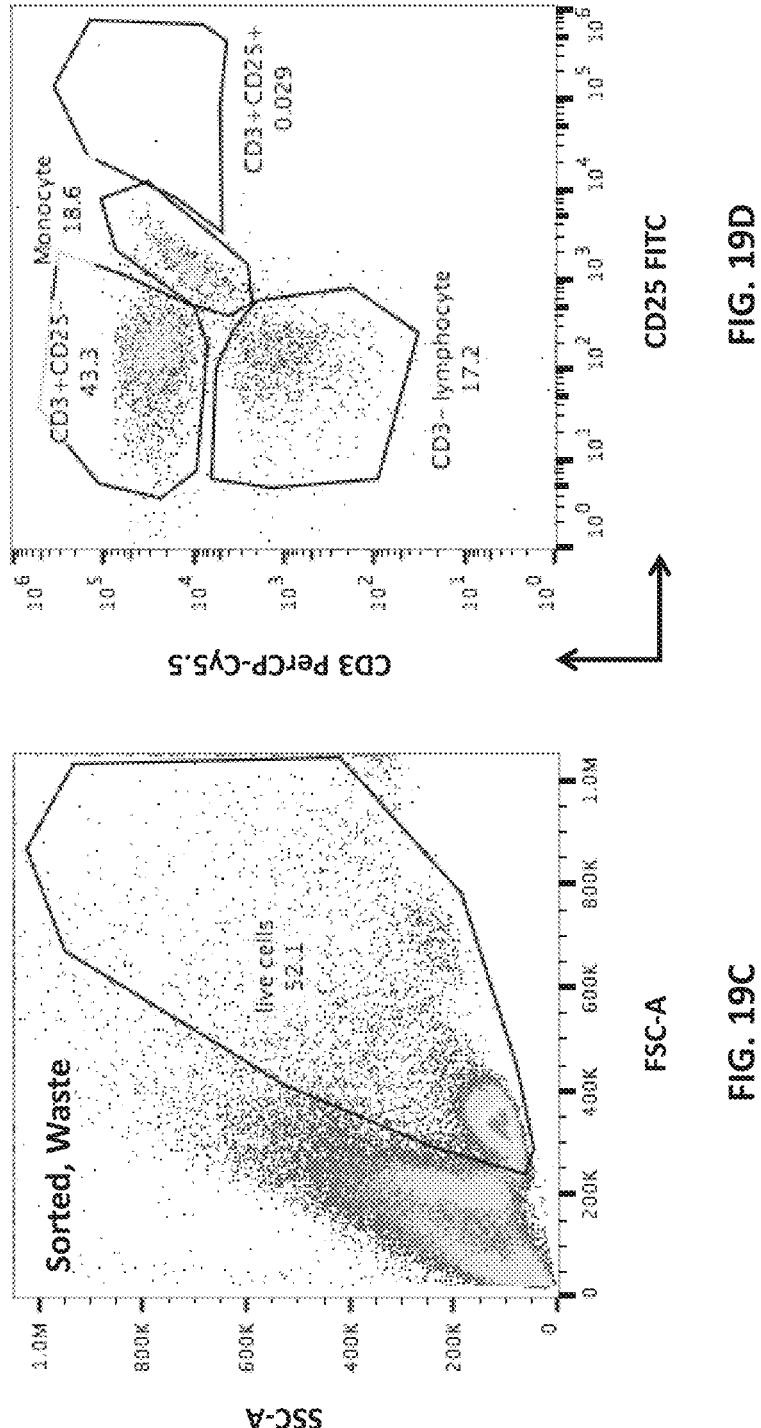
Figure 19F:
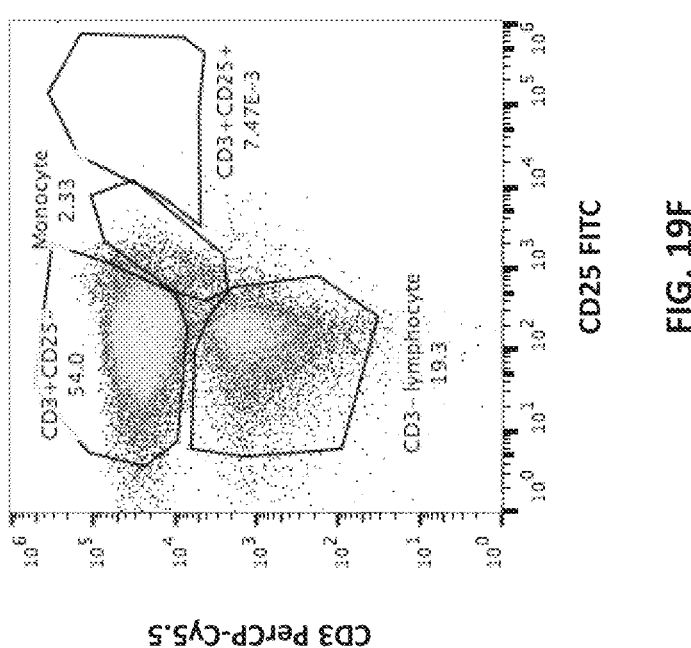
Figure 19E:
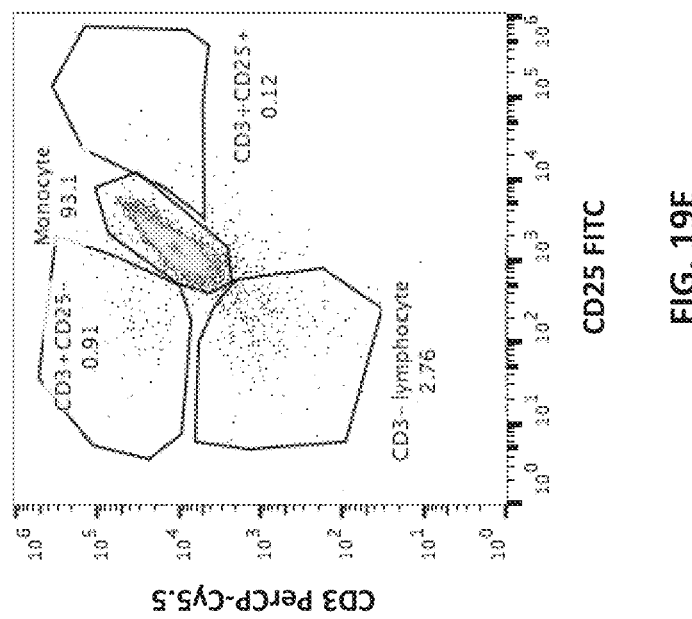

FIGS. 19A-19C show FSC-A versus SSC-A for unstimulated cells before sorting and after sorting (collection and waste) three days post stimulation. Live cells are enclosed within the black polygon. FIGS. 19D-19F show various cell populations (CD3$^+$CD25$^-$ cells, monocytes, CD3$^-$ lymphocytes, and CD3$^+$CD25$^+$ cells) before and after sorting (collection and waste).

Figures 20A, 20B:
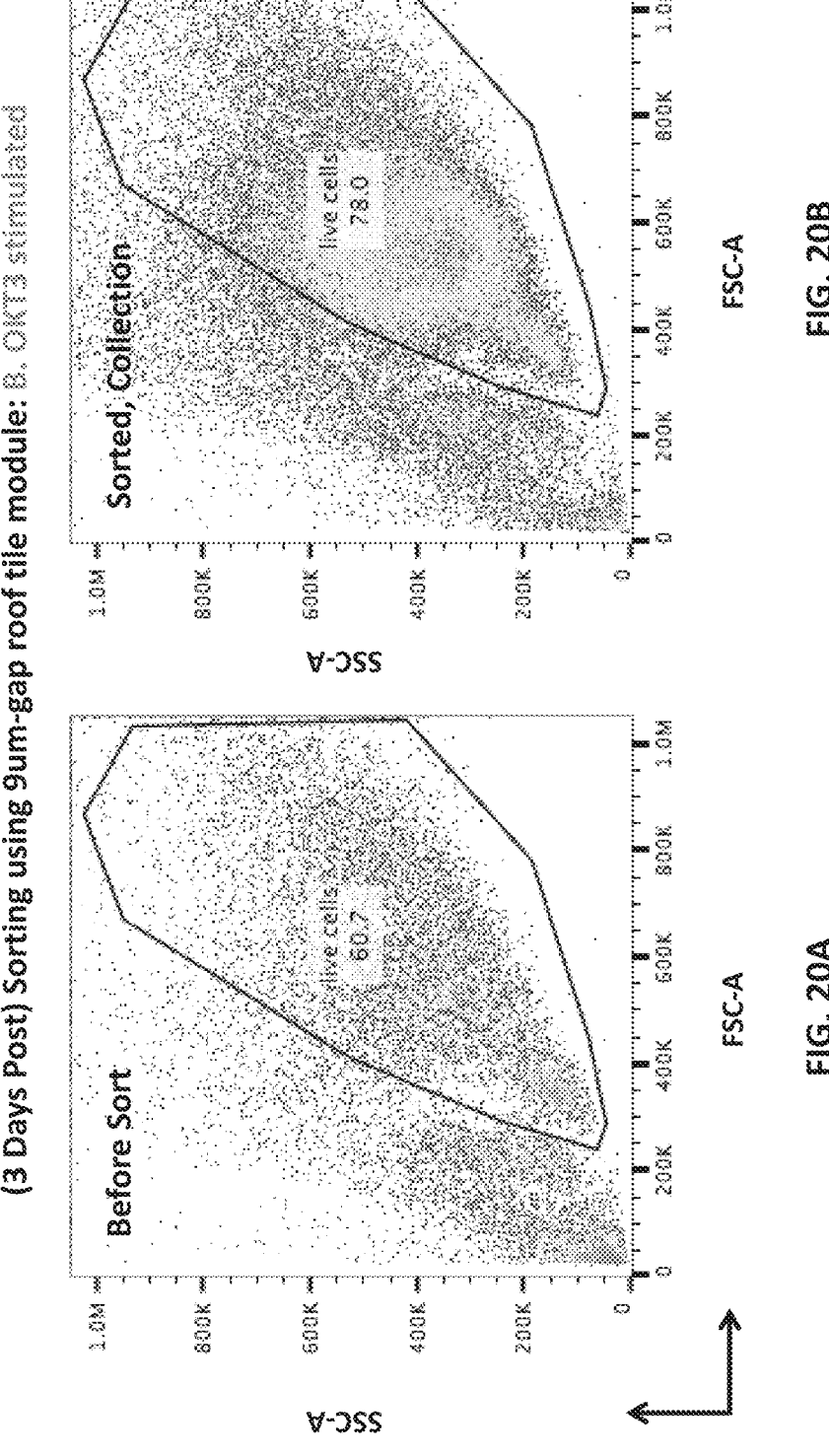
FIGS. 20A-20F show experimental results of sorting OKT3 stimulated T cells, using the devices and methods presented herein.
Figure 20D:
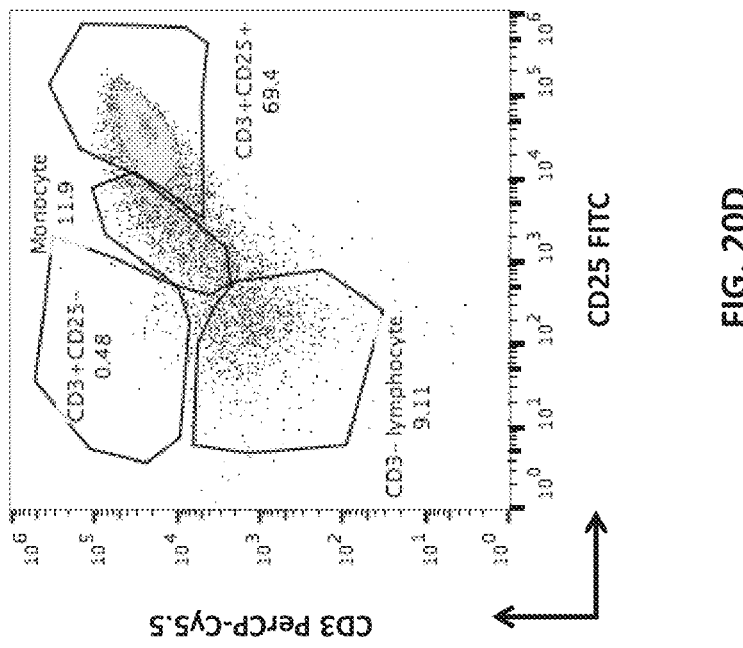
Figure 20C:
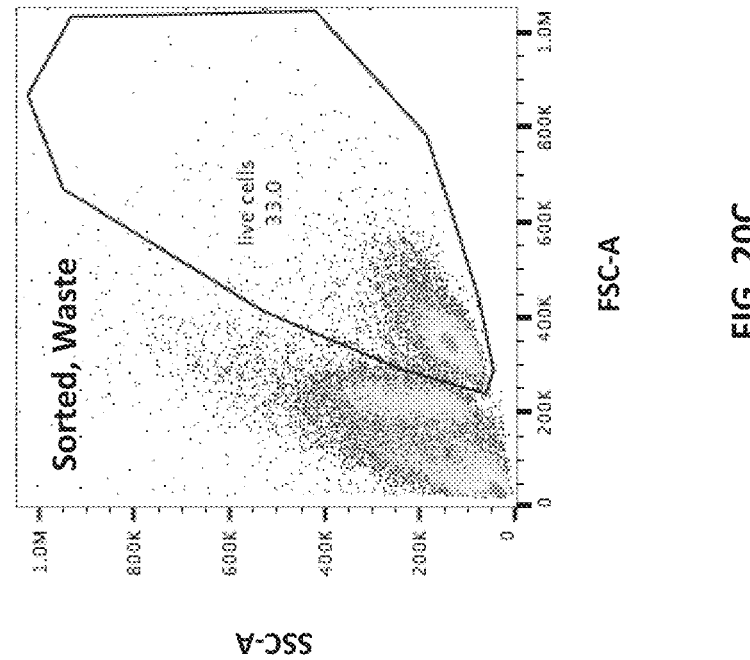
Figure 20F:
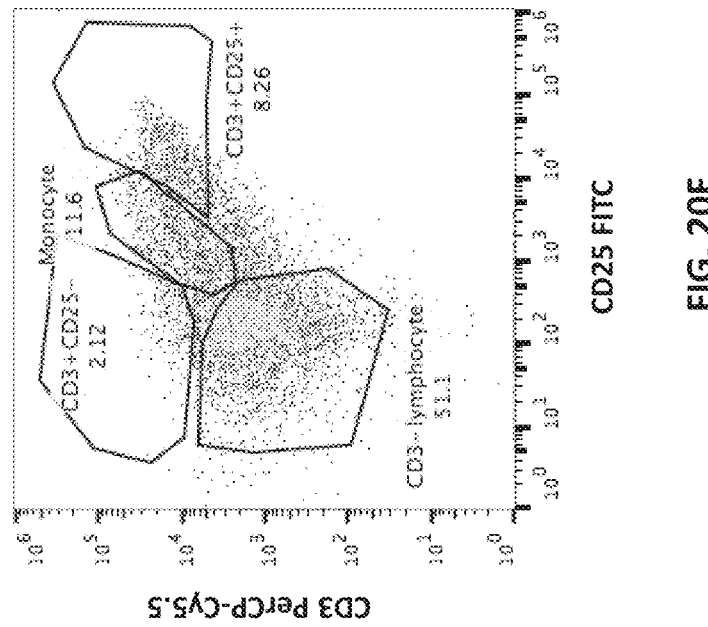
Figure 20E:
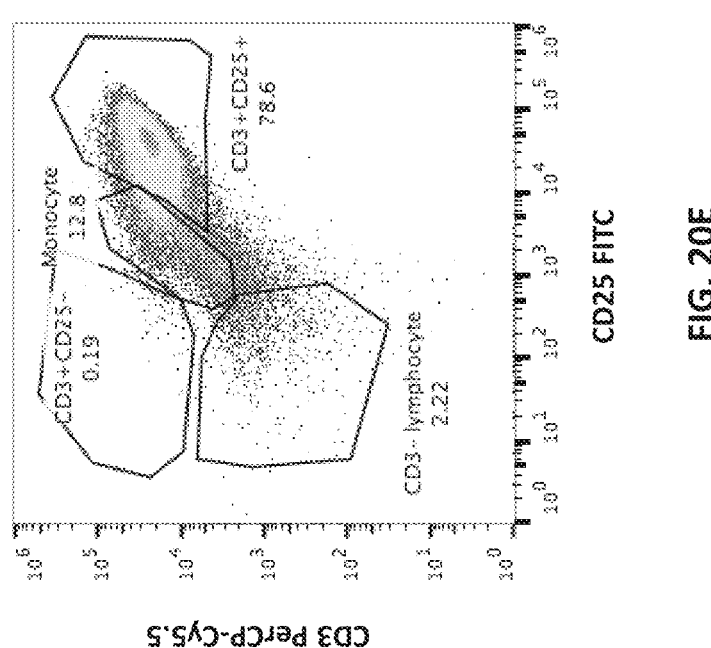

FIGS. 20A-20C show FSC-A versus SSC-A for stimulated cells (with OKT3) before sorting and after sorting (collection and waste) three days post stimulation. Live cells are enclosed within the black polygon. FIGS. 20D-20F show various cell populations (CD3$^+$CD25$^-$ cells, monocytes, CD3$^-$ lymphocytes, and CD3$^+$CD25$^+$ cells) before and after sorting (collection and waste). Under conditions of OKT3 stimulation, about a 1× enrichment factor was observed when gating on CD25$^+$ live cells and about a 1× enrichment factor was observed when gating on CD25$^+$CD3$^+$ cells.

Figures 21A, 21B:
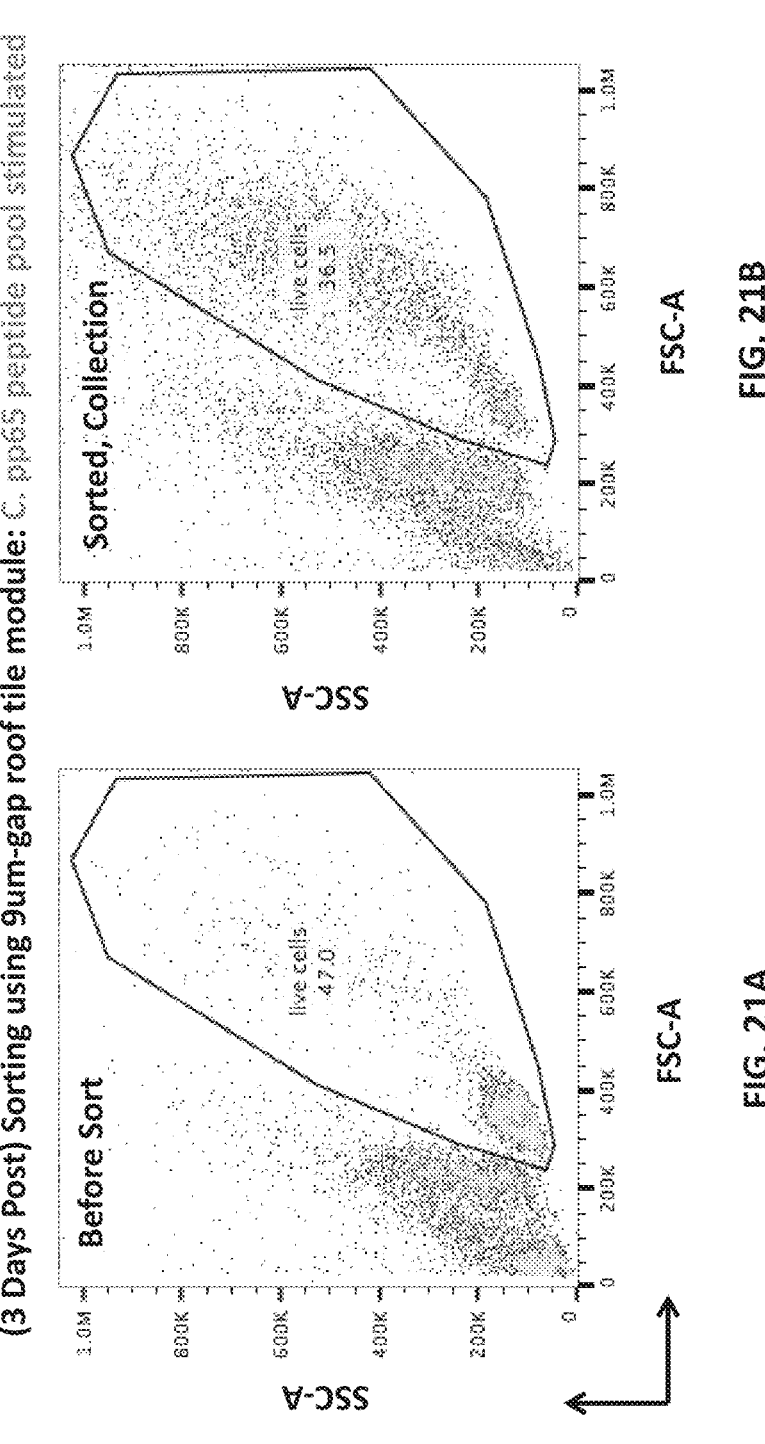
FIGS. 21A-21F show experimental results of sorting antigen stimulated (pp65 peptide pool) T cells, using the devices and methods presented herein.
Figures 21C, 21D:
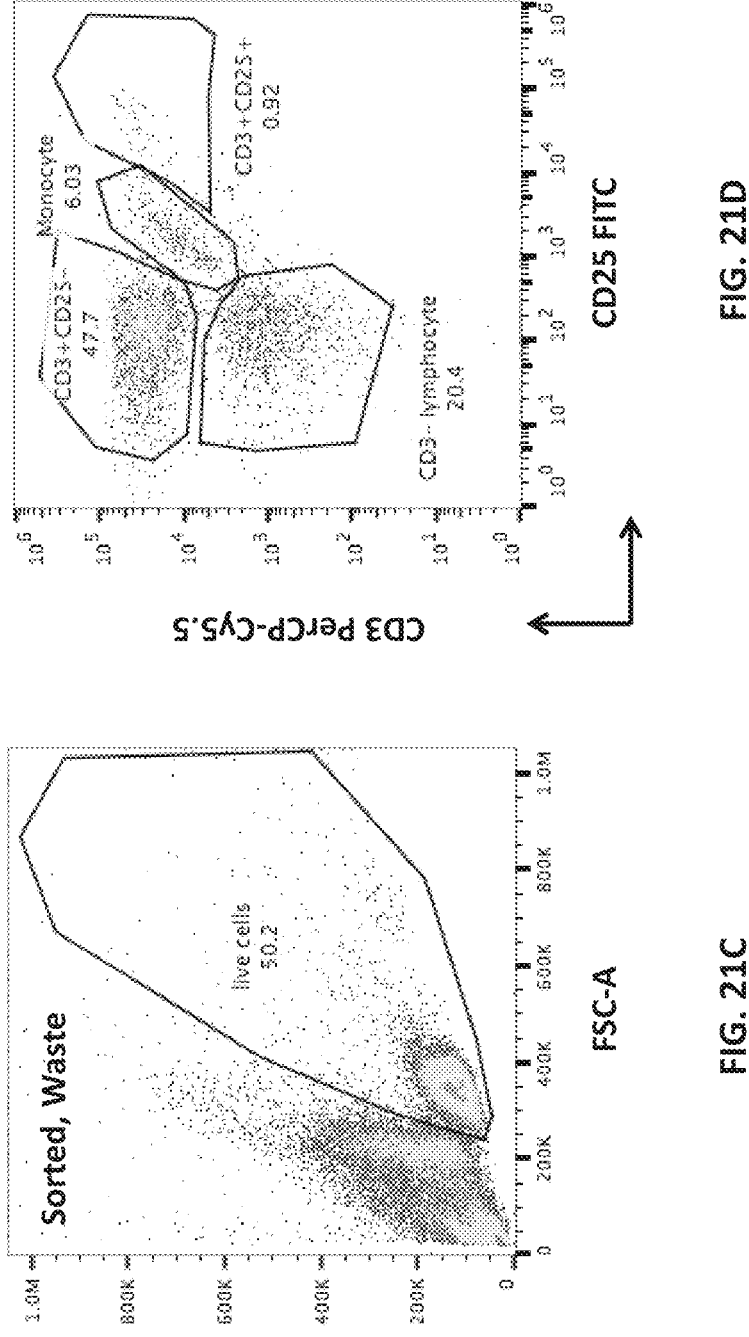
Figure 21F:
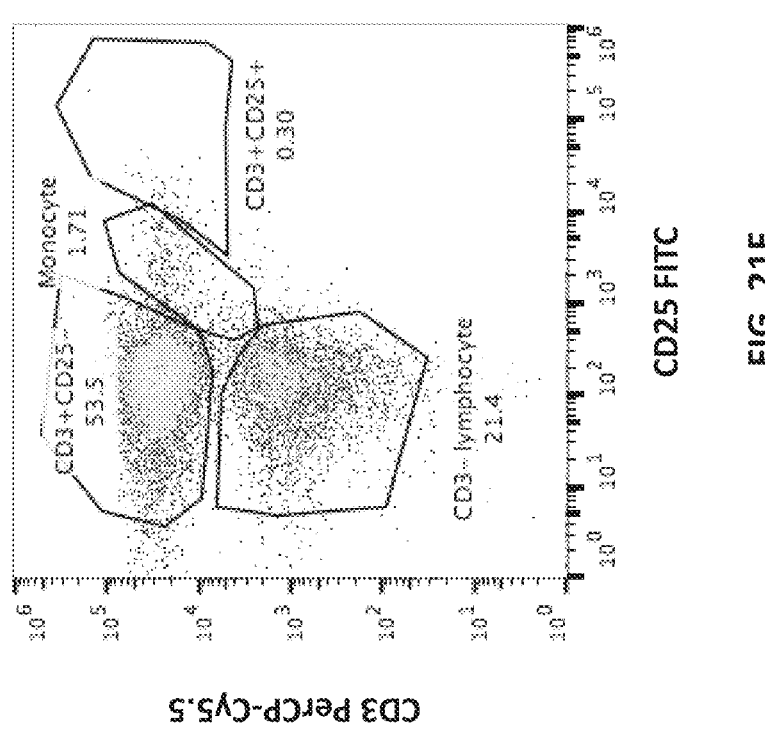
Figure 21E:
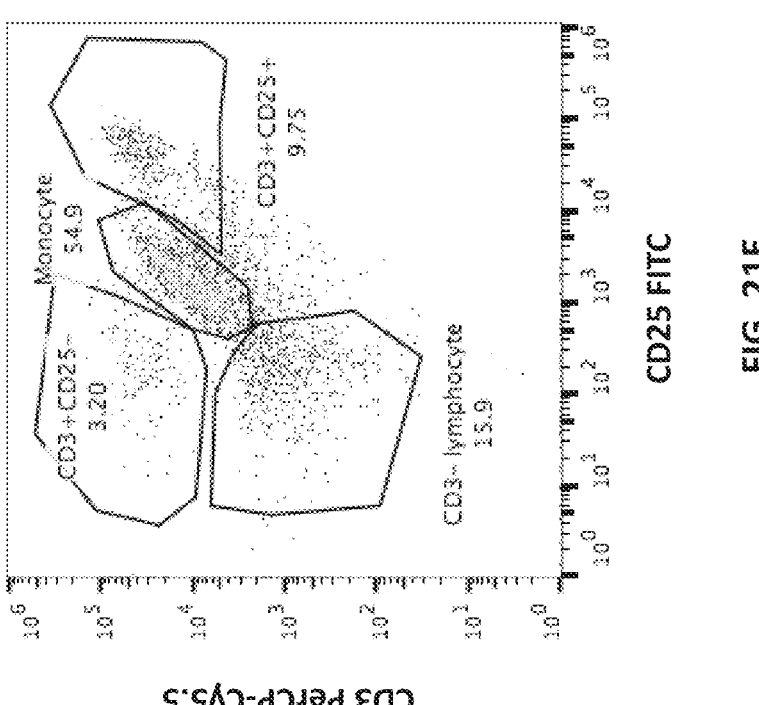

FIGS. 21A-21C show FSC-A versus SSC-A for stimulated cells (with pp65 peptide pool) before sorting and after sorting (collection and waste) three days post stimulation. Live cells are enclosed within the black polygon. FIGS. 21D-21F show various cell populations (CD3$^+$CD25$^-$ cells, monocytes, CD3$^-$ lymphocytes, and CD3$^+$CD25$^+$ cells) before and after sorting (collection and waste). Under conditions of pp65 peptide pool stimulation, about a 11× enrichment factor was observed when gating on CD25$^+$ live cells and about a 40× enrichment factors was observed when gating on CD25$^+$CD3$^+$ cells.

Figures 22A, 22B:
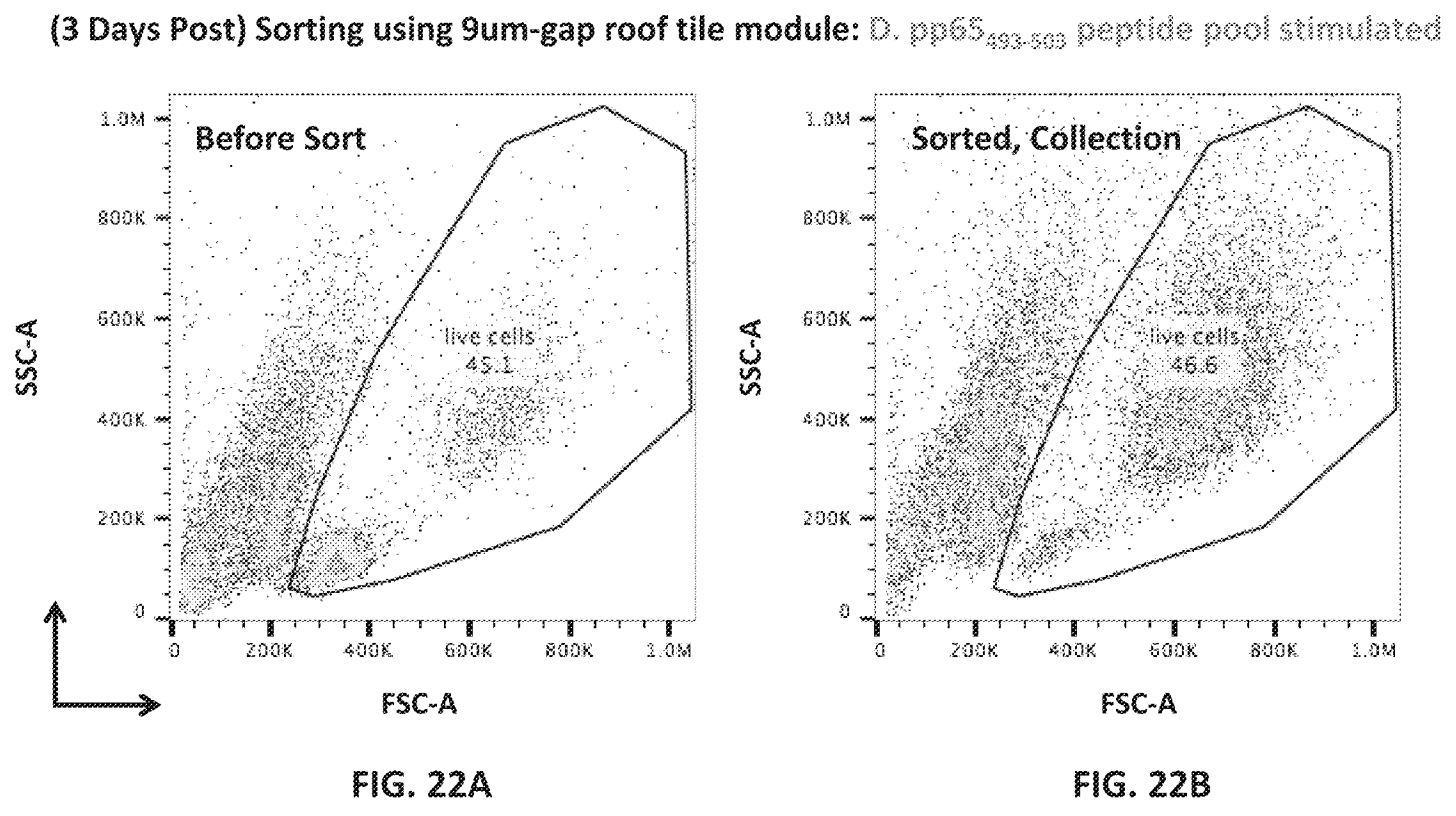
Figure 22D:
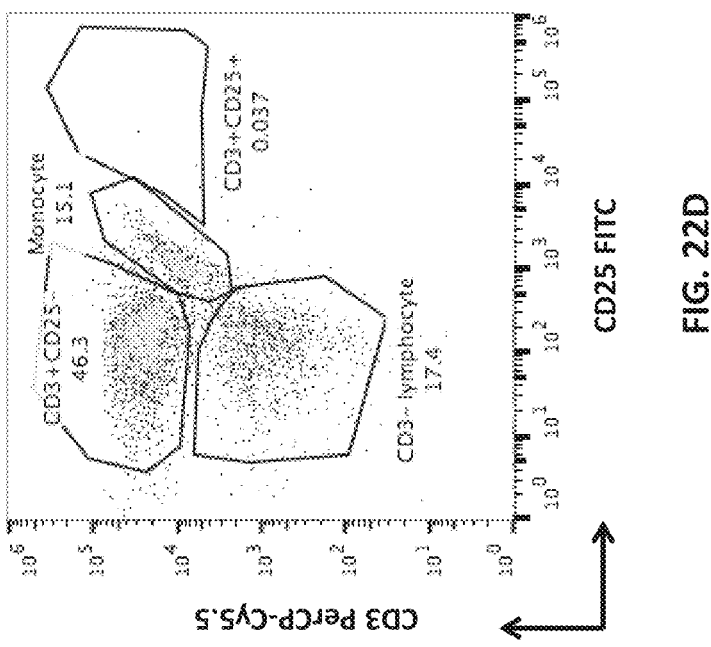
Figure 22C:
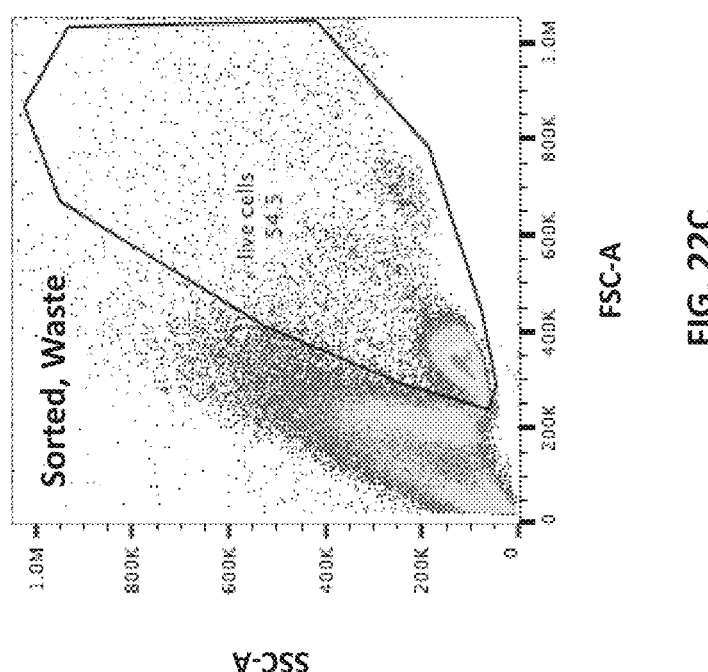
Figure 22F:
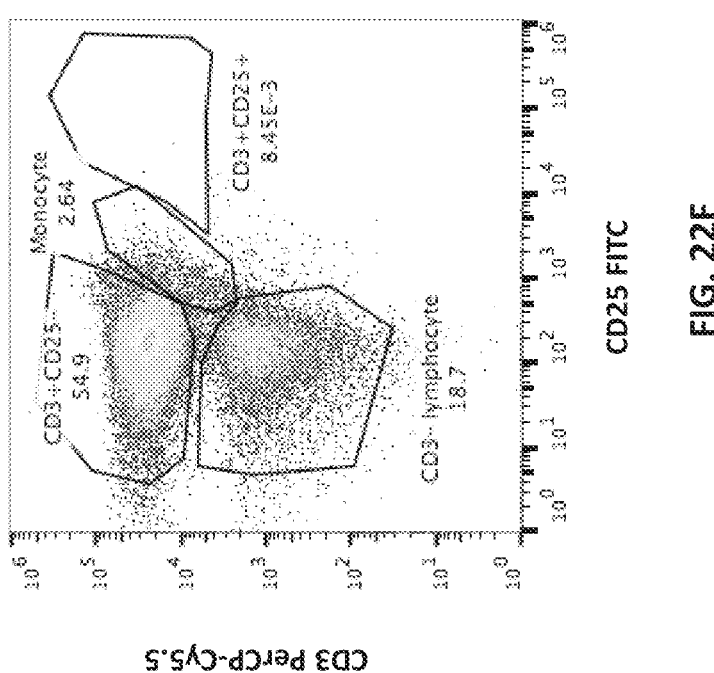
Figure 22E:
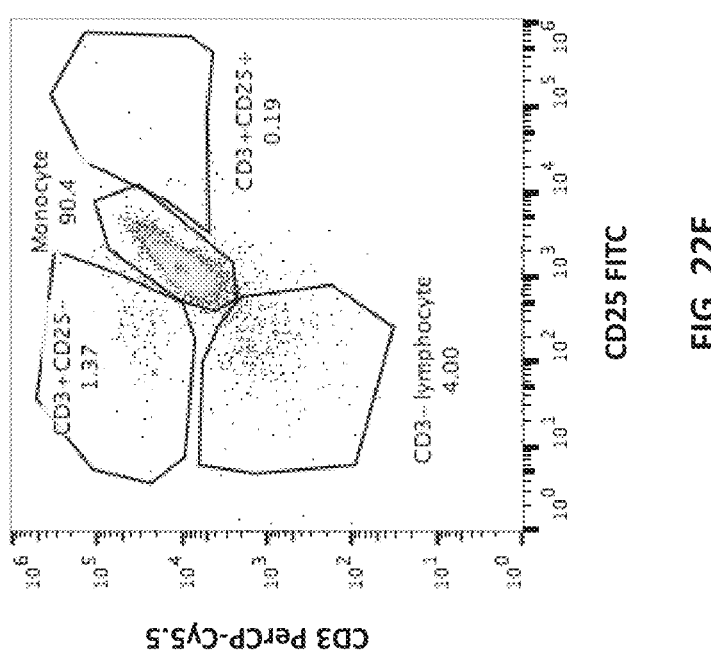
Figures 23A, 23B:
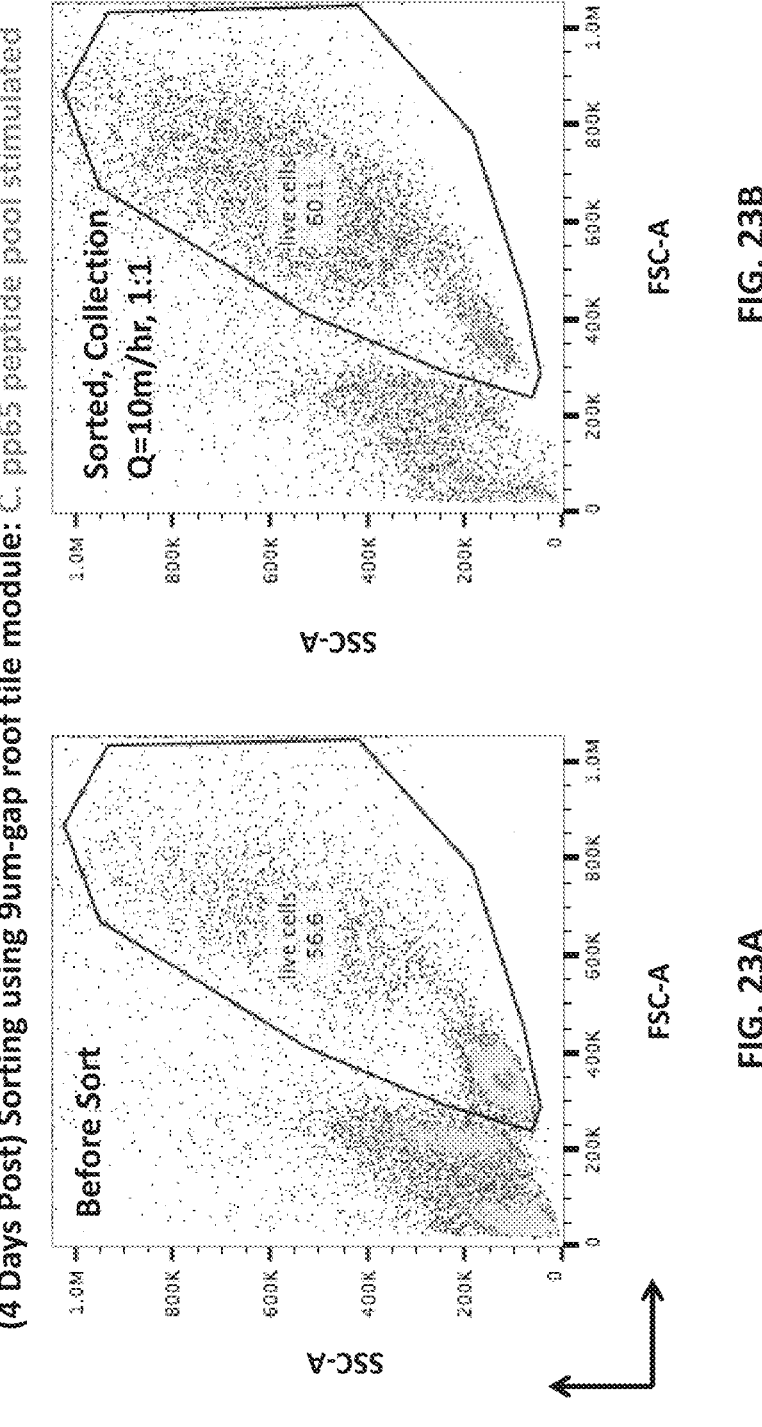
FIGS. 23A-23F show experimental results of sorting antigen stimulated (pp65 peptide pool) T cells, using the devices and methods presented herein.
Figure 23D:
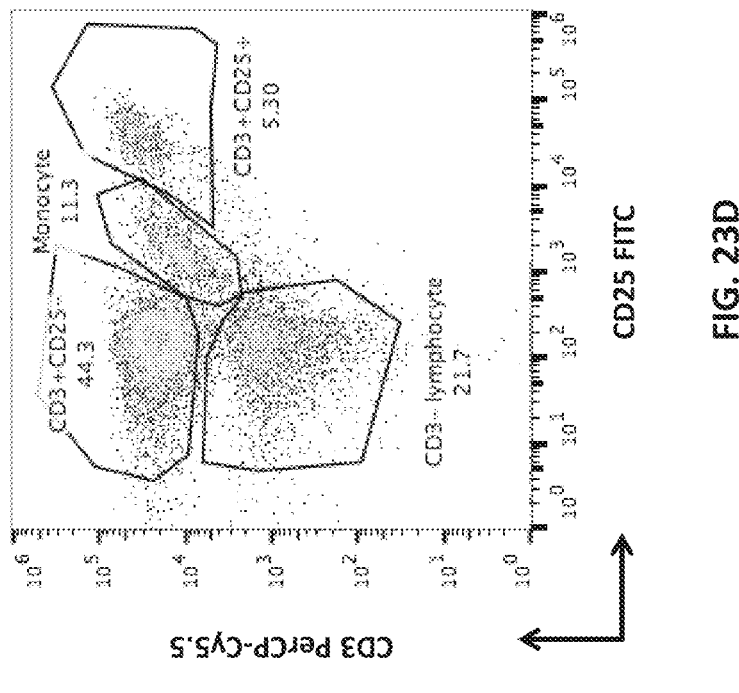
Figure 23C:
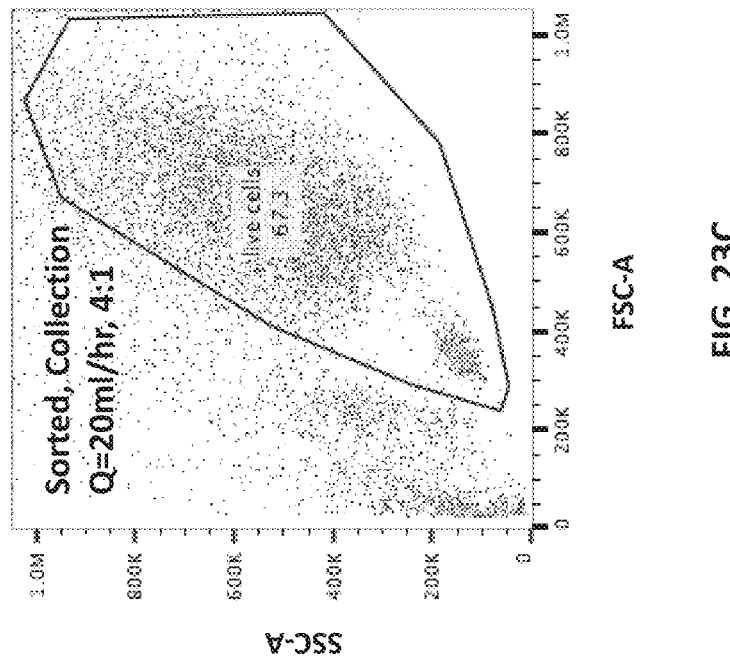
Figure 23F:
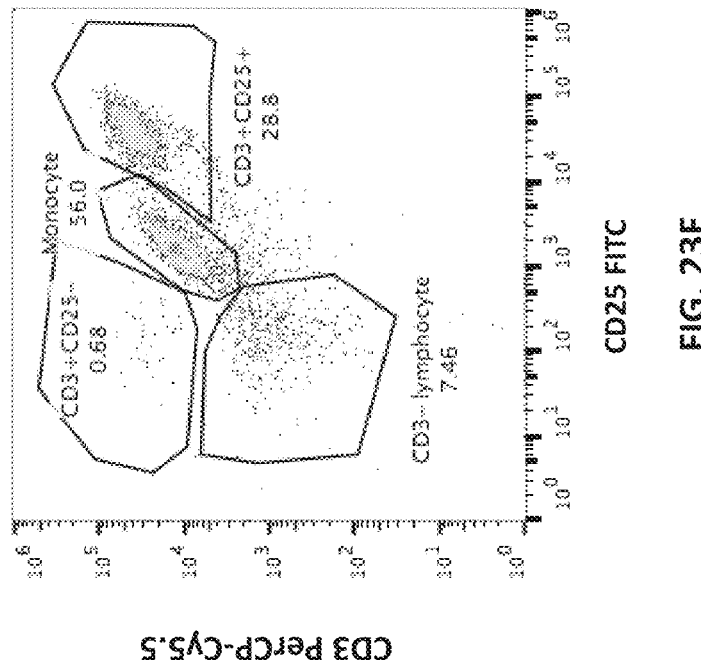
Figure 23E:
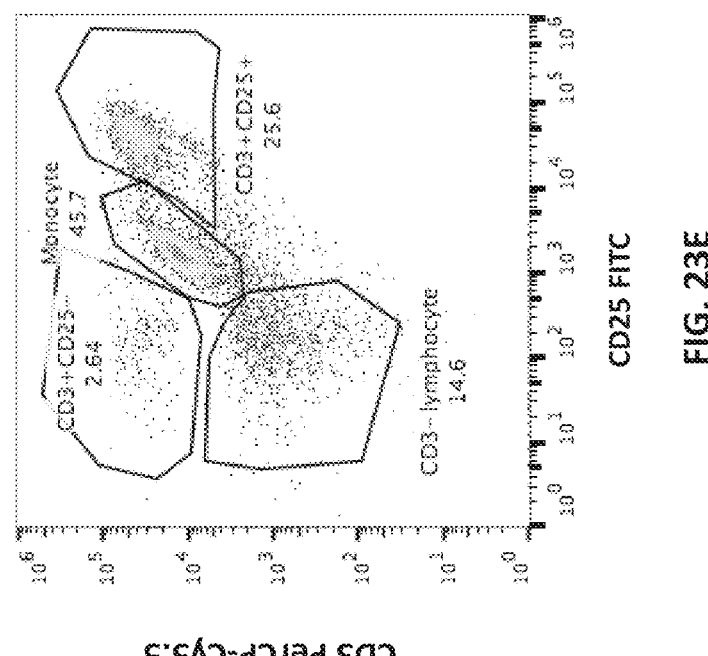

FIGS. 22A-22C show FSC-A versus SSC-A for stimulated cells (with pp65$_{495\text{-}503}$) before sorting and after sorting (collection and waste) three days post stimulation. Live cells are enclosed within the black polygon. FIGS. 22D-22F show various cell populations (CD3$^+$CD25$^-$ cells, monocytes, CD3$^-$ lymphocytes, and CD3$^+$CD25$^+$ cells) before and after sorting (collection and waste). Under conditions of pp65$_{495\text{-}503}$ stimulation, about a 5× enrichment factor was observed when gating on CD25$^+$ live cells, and about a 150× enrichment factor was observed when gating on CD25$^+$CD3$^+$ cells.

FIGS. 23A-23F show antigen specific stimulation using pp65 peptide pool under different flow conditions four days post stimulation. In some embodiments, cells sorted at a higher flow rate (e.g., Q=20 ml/hr, 4:1) resulted in the same or slightly improved purity as compared to cells sorted at a lower flow rate (e.g., Q=10 ml/hr, 1:1), at a constant gap distance (e.g., 9 μm).

Referring to FIGS. 24A-24F, antigen specific stimulation using pp65$_{495\text{-}503}$ under different flow conditions four days post stimulation was performed. Recovery of activated T cells (CD3$^+$CD25$^+$) under fast flow conditions (20 ml/hr, 4:1) was about the same or better as compared to slow flow conditions (10 ml/hr, 1:1).

Figure 2G:
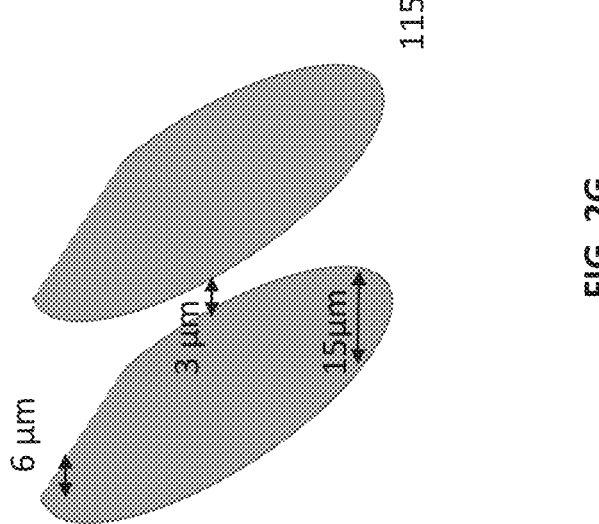
Figure 2F:
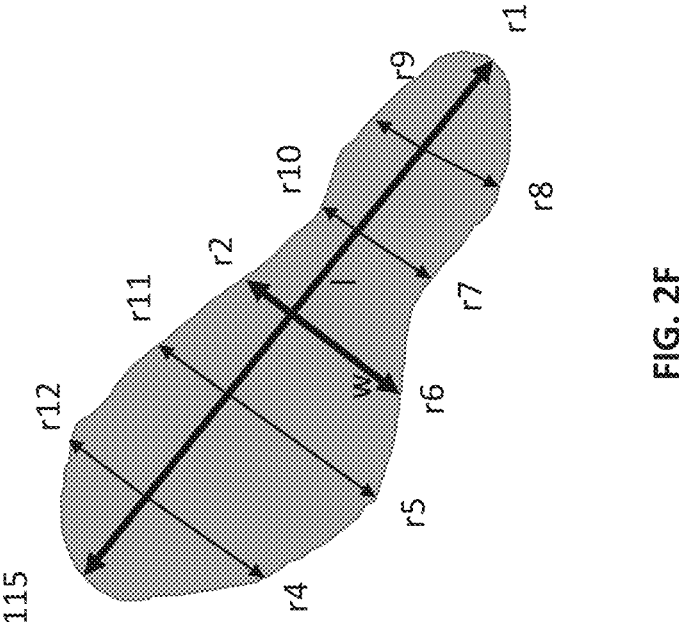
Figure 25:
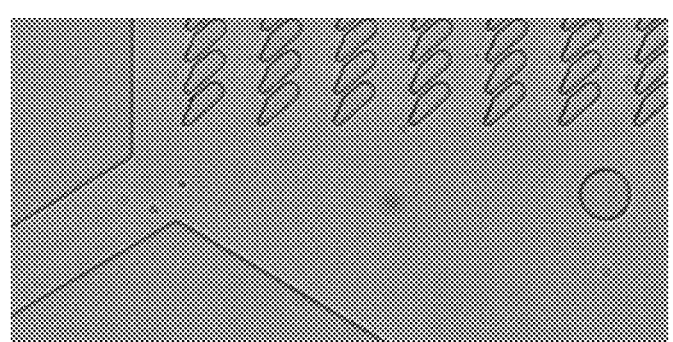
FIG. 25 shows another post geometric configuration for concentrating cells, using the devices and methods presented herein.

FIG. 25 shows another embodiment of a microfluidics chamber configured to concentrate cells in a size independent manner (see also, FIG. 2G). In this example, the posts are densely packed together. Additionally, the overlapping area between the posts has been increased (e.g., by removal of part of the tip of the post) to facilitate flow of cells through the channel, instead of trapping cells between posts.

Example 12. Priming of Microfluidics Channel

In general, any suitable material may be used to form the posts within the microchannel. Preferably, the material will be gas permeable, e.g., PDMS, to allow trapped gas to escape from the microfluidics channel, and to prevent trapped air bubbles from affecting the flow dynamics within the microfluidics channel. The microfluidics channel and associated tubing may be filled with a suitable buffer and flushed with excess buffer, to allow trapped air bubbles to become dislodged and diffuse through the PDMS out of the microfluidics channel or to exit via tubing connected to the microfluidics channel. In some embodiments, surfactants may be added to the buffer to reduce the occurrence of gas bubbles.

What is claimed is:

1. A microfluidics device comprising:
an input mechanism for introducing a first solution comprising cells;
a microfluidics chamber in fluid communication with the input mechanism, wherein the microfluidics chamber comprises a plurality of rows of posts, wherein at least one row comprises a plurality of posts distributed along a line oriented in a diagonal manner with respect to the microfluidics chamber;
wherein each post spans a height of the microfluidics chamber and is in contact with a ceiling and a floor of the microfluidics chamber, wherein each post has a length and a width and each post is shaped as a rectangle or an oval, and wherein the axis along the length of each post has a rotational angle ($\phi$) defined in a counter clockwise or clockwise direction with respect to a side of the microfluidics chamber, wherein the rotational angle is between 1 and 89 degrees; and
at least a first output mechanism and a second output mechanism, wherein the first output mechanism and the second output mechanism are in fluid communication with the microfluidics chamber.

2. The microfluidics device of claim 1, wherein the first output mechanism has a larger cross sectional area than the second output mechanism.

3. The microfluidics device of claim 1, wherein, for the at least one row, each post of the plurality of posts is arranged at an interval along the line to deflect the cells laterally towards a side of the microfluidics chamber, or wherein, for the at least one row, each post of the plurality of posts is arranged at an interval along the line to retain the cells larger than a threshold size value within a path and to allow cells smaller than the threshold size value to cross one or more rows of posts thereby entering two or more paths.

4. The microfluidics device of claim 1, wherein each post has a length and a width, and wherein the length is greater than the width.

5. The microfluidics device of claim 1, wherein for the at least one row, each post of the plurality of posts is positioned along the line at a uniformly spaced interval.

6. The microfluidics device of claim 1, wherein each row of the plurality of rows each comprise the plurality of posts distributed along a line oriented in a diagonal manner with respect to the microfluidics chamber and each row is positioned at a regularly spaced interval along an axis perpendicular to the side of the chamber.

7. The microfluidics device of claim 6, wherein adjacent rows of the plurality of posts are configured for the cells flow in a path between the adjacent rows of the plurality of posts.

8. The microfluidics device of claim 1, wherein the rotational angle is:

(a) between 15 and 55 degrees;
(b) between 25 and 45 degrees;
(c) between 30 and 40 degrees; or
(d) 35 degrees.

9. The microfluidics device of claim 1, wherein the length of each post of the plurality of posts is:
(a) 1.1 to 10 times greater than the width of the post;
(b) 1.1 to 5 times greater than the width of the post;
(c) 2 to 4 times greater than the width of the post; or
(d) 3 to 4 times greater than the width of the post.

10. The microfluidics device of claim 1, wherein the input mechanism is coupled to a syringe via tubing, and wherein the first solution comprising the cells is driven through the microfluidic device via applied pressure from depression of a plunger of the syringe, or wherein the input mechanism is coupled to a pump via tubing, and wherein the first solution comprising the cells is driven through the microfluidic device via applied pressure from the pump.

11. A method for concentrating cells with a microfluidics device comprising a microfluidics chamber, an input mechanism, a first output mechanism, and a second output mechanism, the method comprising:
introducing a first solution comprising cells into the microfluidics chamber via the input mechanism, wherein the microfluidics chamber is in fluid communication with the input mechanism;
applying pressure to cause the solution comprising the cells to flow through the microfluidics chamber, wherein the microfluidics chamber comprises a plurality of rows of posts, wherein each row comprises a plurality of posts distributed along a line oriented in a diagonal manner with respect to the microfluidics chamber;
wherein each post spans the height of the microfluidics chamber and is in contact with a ceiling and a floor of the microfluidics chamber, wherein each post has a length and a width and each post is shaped as a rectangle or an oval, and wherein the axis along the length of each post has a rotational angle ($\phi$) defined in a counter clockwise or clockwise direction with respect to a side of the microfluidics chamber, wherein the rotational angle is between 1 and 89 degrees; and
deflecting the cells to a side of the microfluidics chamber by the rows of posts to deplete cells from the solution exiting the first output mechanism and enrich cells in the solution exiting the second output mechanism.

12. The method of claim 11, wherein the second output mechanism has a smaller cross sectional area than the first output mechanism.

13. The method of claim 11, wherein the rotational angle is:
(a) between 15 and 55 degrees;
(b) between 25 and 45 degrees;
(c) between 30 and 40 degrees; or
(d) 35 degrees.

14. The method of claim 11, wherein for each row, each post of the plurality of posts is positioned along the line at a uniformly spaced interval.

15. The method of claim 11, wherein each row is positioned at a regularly spaced interval along an axis perpendicular to a side of the chamber.

16. The method of claim 11, wherein the cells flow along a path between adjacent rows of posts.

17. The method of claim 11, wherein the length of each post of the plurality of posts is:
(a) 1.1 to 10 times greater than the width of the post;
(b) 1.1 to 5 times greater than the width of the post;

(c) 2 to 4 times greater than the width of the post; or (d) 3 to 4 times greater than the width of the post.

18. The method of claim 11, further comprising coupling the input mechanism to a syringe via tubing, and applying pressure from depression of a plunger of the syringe to drive flow of the first solution comprising the cells through the microfluidics device; or coupling the input mechanism to a pump via tubing, and applying pressure from the pump to drive flow of the first solution comprising the cells through the microfluidics device.

19. The method of claim 11, further comprising:

introducing one or more of:

(i) a binding molecule in a second solution into the microfluidics chamber via a second input mechanism; and (ii) a third solution into the microfluidics chamber via a third input mechanism;

deflecting the cells:

(i) laterally across the rows of posts into the third solution; or (ii) laterally across the rows of posts towards the binding molecules, wherein the binding molecules attach to surfaces of the cells; and deflecting the cells attached to the binding molecules laterally across the rows of posts, optionally into the third solution; and collecting:

(i) the cells, bound to the binding molecules, optionally suspended in the third solution, that exits the microfluidics chamber via the second output mechanism; or (ii) the cells suspended in the third solution that exit the chamber via the second output mechanism.

20. The method of claim 11, wherein a gap distance between adjacent posts is configured to allow passage of cells smaller than a threshold size value into an adjacent path and to retain cells larger than the threshold size value within a path and to allow cells smaller than the threshold size value to cross one or more rows of posts thereby entering two or more paths.

21. The method of claim 20, wherein the gap distance is configured to retain activated T cells.

22. The method of claim 21, wherein the activated T cells are activated by exposure to antibodies specific to CD3, CD25, or CD28 or wherein the activated T cells are activated by exposure to a viral antigen or a tumor antigen.

23. The method of claim 22, wherein the activated T cells are generated by exposing T cells to the antibodies specific for CD3, CD25, or CD28 for at least a period of two days.

24. The method of claim 22, wherein the viral antigen is CMV pp65 or the tumor antigen is a neoepitope peptide.

25. The method of claim 20, wherein the gap distance is configured to retain active cells for transfection.

26. The method of claim 11, wherein a gap distance between adjacent posts is configured to retain cells producing a biologic as part of a manufacturing scale biologic process.

27. The method of claim 11, wherein a flow rate of the first solution through the microfluidics device is up to 10 mL/hr, 20 mL/hr, 30 mL/hr, or 40 mL/hr.

28. The method of claim 11, wherein a concentration of cells exiting the microfluidics device through the second output mechanism is at least a 10 fold increase as compared to a concentration of cells entering the microfluidics device through the input mechanism.

29. The method of claim 11, wherein a concentration of cells exiting the microfluidics device through the second output mechanism is greater than or equal to $10^5$ cells/mL.

30. A method for sorting activated T cells with a first microfluidics device comprising a first microfluidics chamber, a first input mechanism, a first output mechanism, and a second output mechanism, the method comprising:

a first sorting comprising:

introducing a first solution comprising activated T cells into the first microfluidics chamber via the first input mechanism, wherein the first microfluidics chamber is in fluid communication with the first input mechanism;

applying pressure to cause the first solution to flow through the first microfluidics chamber, wherein the first microfluidics chamber comprises a plurality of rows of posts, wherein each row comprises a plurality of posts distributed along a line oriented in a diagonal manner with respect to the first microfluidics chamber, wherein a gap distance between adjacent posts is configured to retain activated T cells and wherein each post spans a height of the microfluidics chamber and is in contact with a ceiling and a floor of the microfluidics chamber, and wherein each post has a length and a width and each post is shaped as a rectangle or an oval, and wherein the axis along the length of each post has a rotational angle ($\phi$) defined in a counter clockwise or clockwise direction with respect to a side of the microfluidics chamber, wherein the rotational angle is between 1 and 89 degrees; and deflecting the activated T cells to a side of the first microfluidics chamber by the plurality of rows of posts to deplete activated T cells from a first waste solution exiting the first output mechanism and to enrich activated T cells in a first collection solution exiting the second output mechanism.

31. The method of claim 30, wherein the first solution further comprises non-activated T cells and the waste solution comprises the non-activated T cells.

32. The method of claim 31, wherein the gap distance between adjacent posts is configured to allow passage of the non-activated T cells into an adjacent path.

33. The method of claim 30, wherein the gap distance is about 3 μm to about 9 μm.

34. The method of claim 33, wherein the gap distance is about 9 μm.

35. The method of claim 30, wherein a distance (dx) between each post in a row is less than or equal to about 10 μm and a distance (dy) between each row is greater than or equal to about 30 μm.

36. The method of claim 30, wherein a flow rate of the first solution through the first microfluidics device is about 5 ml/hr to about 60 ml/hr.

37. The method of claim 36, wherein the flow rate of the first solution through the first microfluidics device is about 20 ml/hr.

38. The method of claim 30, wherein the activated T cells are activated by exposure to antibodies specific to CD3, CD25, or CD28 or by using a viral antigen or a tumor antigen.

39. The method of claim 38, wherein the activated T cells are generated by exposing T cells to the antibodies specific for CD3, CD25, or CD28 for at least a period of two days.

40. The method of claim 38, wherein the viral antigen is CMV pp65 or the tumor antigen is a neoepitope peptide.

41. The method of claim 30, further comprising a second sorting comprising:

introducing the first collection solution into the first microfluidics chamber via the first input mechanism;

applying pressure to cause the first collection solution to flow through the first microfluidics chamber; and deflecting the activated T cells to a side of the first microfluidics chamber by the plurality of rows of posts to deplete activated T cells from a second waste solution exiting the first output mechanism and enrich activated T cells in a second collection solution exiting the second output mechanism, wherein the second collection solution has a higher enrichment percentage of activated T cells compared to the first collection solution.

42. The method of claim 30, further comprising a second sorting comprising:

introducing the first collection solution cells into a second microfluidics chamber via a second input mechanism, wherein the second microfluidics chamber is in fluid communication with the second input mechanism and in fluid communication with the first microfluidics chamber;

applying pressure to cause the first collection solution to flow through the second microfluidics chamber, wherein the second microfluidics chamber comprises a plurality of rows of posts, wherein each row comprises a plurality of posts distributed along a line oriented in a diagonal manner with respect to the second microfluidics chamber, wherein a gap distance between adjacent posts is configured to retain activated T cells; and deflecting the activated T cells to a side of the second microfluidics chamber by the plurality of rows of posts to deplete activated T cells from a second waste solution exiting a third output mechanism and enrich activated T cells in a second collection solution exiting a fourth output mechanism, wherein the second collection solution has a higher enrichment percentage of activated T cells compared to the first collection solution.

43. A method for concentrating cells with a microfluidics device comprising a microfluidics chamber, an input mechanism, a first output mechanism, and a second output mechanism, the method comprising:

introducing a first solution comprising cells into the microfluidics chamber via the input mechanism, wherein the chamber is in fluid communication with the input mechanism;

applying pressure to cause the first solution comprising the cells to flow through the microfluidics chamber, wherein the microfluidics chamber comprises a plurality of rows of posts, wherein each row comprises a plurality of posts distributed along a line oriented in a diagonal manner with respect to the microfluidics chamber, wherein each post spans a height of the microfluidics chamber and is in contact with a ceiling and a floor of the microfluidics chamber, and wherein each post has a length and a width and each post is shaped as a rectangle or an oval, and wherein the axis along the length of each post has a rotational angle ($\phi$) defined in a counter clockwise or clockwise direction with respect to a side of the microfluidics chamber, wherein the rotational angle is between 1 and 89 degrees; and deflecting the cells to a side of the microfluidics chamber by the plurality of rows of posts to deplete cells from the solution exiting the first output mechanism and enrich cells in the solution exiting the second output mechanism, wherein a flow rate of the first solution through the microfluidics device is greater than 10 mL/hr and a sample: sheath flow ratio is about 1:1 to about 4:1.

* * * * *